(12) United States Patent
Chemel et al.

(10) Patent No.: US 11,674,668 B2
(45) Date of Patent: Jun. 13, 2023

(54) LIGHTING FIXTURES AND METHODS OF COMMISSIONING LIGHTING FIXTURES

(71) Applicant: OSRAM SYLVANIA Inc., Wilmington, MA (US)

(72) Inventors: Brian J. Chemel, Marblehead, MA (US); Colin Piepgras, Swampscott, MA (US); Steve T. Kondo, Quincy, MA (US); Scott D. Johnston, Boston, MA (US)

(73) Assignee: OSRAM SYLVANIA Inc., Hillsboro, NH (US)

( * ) Notice: Subject to any disclaimer, the term of this patent is extended or adjusted under 35 U.S.C. 154(b) by 0 days.

(21) Appl. No.: 17/537,756

(22) Filed: Nov. 30, 2021

(65) Prior Publication Data

US 2022/0299190 A1    Sep. 22, 2022

Related U.S. Application Data

(60) Continuation of application No. 16/447,151, filed on Jun. 20, 2019, now Pat. No. 11,193,652, which is a
(Continued)

(51) Int. Cl.
| | |
|---|---|
| *F21V 23/04* | (2006.01) |
| *F21V 14/02* | (2006.01) |
| *F21V 21/15* | (2006.01) |
| *F21V 21/30* | (2006.01) |
| *H05B 45/20* | (2020.01) |
| *H05B 47/10* | (2020.01) |
| *H05B 47/11* | (2020.01) |
| *H05B 47/12* | (2020.01) |
| *H05B 47/19* | (2020.01) |
| *H05B 47/105* | (2020.01) |
| *H05B 47/155* | (2020.01) |

(Continued)

(52) U.S. Cl.
CPC .............. *F21V 14/02* (2013.01); *F21S 2/005* (2013.01); *F21S 4/28* (2016.01); *F21S 9/02* (2013.01); *F21V 15/01* (2013.01); *F21V 21/00* (2013.01); *F21V 21/15* (2013.01); *F21V 21/30* (2013.01); *F21V 23/0442* (2013.01); *F21V 29/56* (2015.01); *F21V 29/763* (2015.01); *H05B 45/20* (2020.01); *H05B 47/10* (2020.01); *H05B 47/105* (2020.01); *H05B 47/11* (2020.01); *H05B 47/12* (2020.01); *H05B 47/155* (2020.01); *H05B 47/19* (2020.01); *F21K 9/20* (2016.08); *F21S 9/04* (2013.01); *F21Y 2103/10* (2016.08); *F21Y 2113/00* (2013.01); *F21Y 2115/10* (2016.08); *H05B 47/115* (2020.01); *Y02B 20/40* (2013.01)

(58) Field of Classification Search
CPC ............ H05B 47/155; H05B 45/00–48; H05B 47/00–195
See application file for complete search history.

(56) References Cited

U.S. PATENT DOCUMENTS

2010/0141153 A1* 6/2010 Recker ................ H05B 45/357
315/149

\* cited by examiner

*Primary Examiner* — Sean P Gramling
(74) *Attorney, Agent, or Firm* — Shaun P. Montana

(57) ABSTRACT

In embodiments of the present invention, a method and system is provided for commissioning improved intelligent, LED-based lighting systems. The LED based lighting systems may include fixtures with one or more LED light bars, integrated sensors, onboard intelligence to send and receive signals and control the LED light bars, and network connectivity to other fixtures.

5 Claims, 53 Drawing Sheets

Related U.S. Application Data continuation of application No. 15/367,125, filed on Dec. 1, 2016, now Pat. No. 10,362,658, which is a division of application No. 14/518,831, filed on Oct. 20, 2014, now Pat. No. 9,860,961, which is a continuation of application No. 12/817,425, filed on Jun. 17, 2010, now Pat. No. 10,539,311, which is a continuation-in-part of application No. 12/423,361, filed on Apr. 14, 2009, now abandoned, and a continuation-in-part of application No. 12/423,543, filed on Apr. 14, 2009, now Pat. No. 8,232,745.

(60) Provisional application No. 61/303,608, filed on Feb. 11, 2010, provisional application No. 61/303,278, filed on Feb. 10, 2010, provisional application No. 61/109,009, filed on Oct. 28, 2008, provisional application No. 61/108,698, filed on Oct. 27, 2008, provisional application No. 61/102,159, filed on Oct. 2, 2008, provisional application No. 61/084,367, filed on Jul. 29, 2008, provisional application No. 61/055,727, filed on May 23, 2008, provisional application No. 61/044,591, filed on Apr. 14, 2008.

(51) Int. Cl.

| | |
|---|---|
| *F21S 2/00* | (2016.01) |
| *F21V 21/00* | (2006.01) |
| *F21V 29/56* | (2015.01) |
| *F21V 29/76* | (2015.01) |
| *F21S 4/28* | (2016.01) |
| *F21S 9/02* | (2006.01) |
| *F21V 15/01* | (2006.01) |
| *F21S 9/04* | (2006.01) |
| *F21Y 113/00* | (2016.01) |
| *F21K 9/20* | (2016.01) |
| *F21Y 103/10* | (2016.01) |
| *F21Y 115/10* | (2016.01) |
| *H05B 47/115* | (2020.01) |

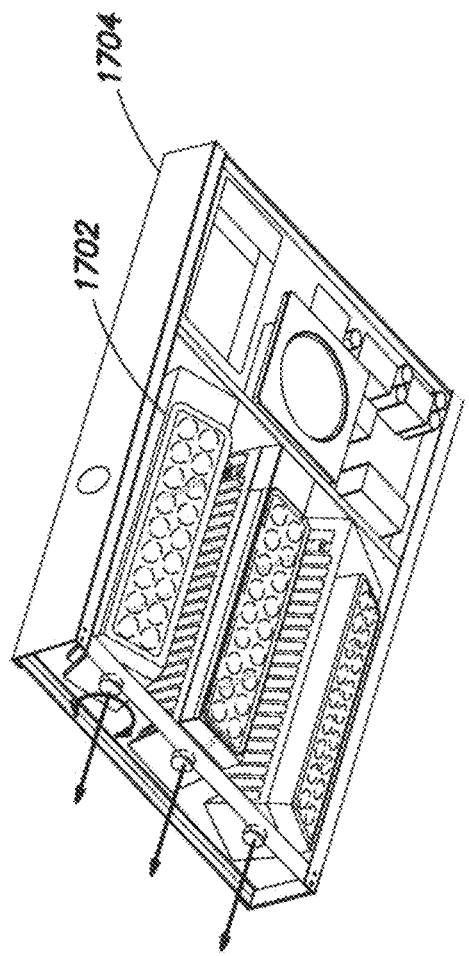
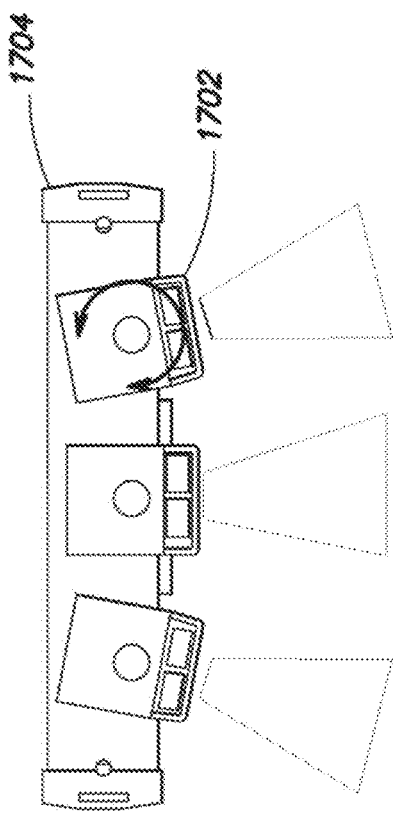
FIG. 17A
FIG. 17B

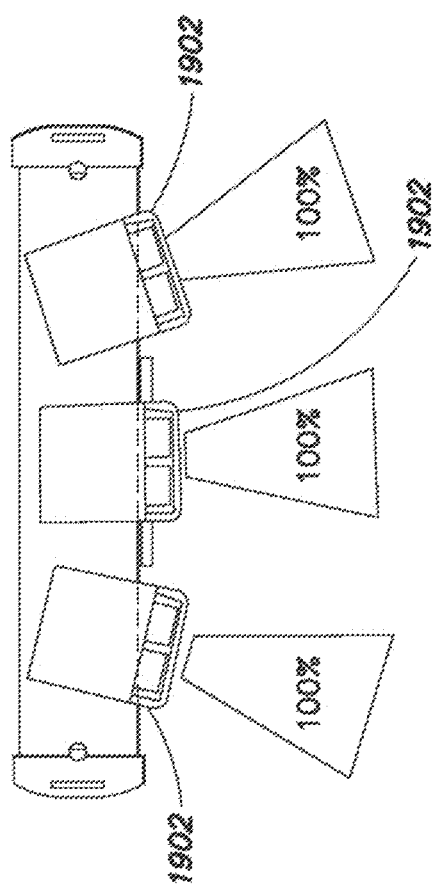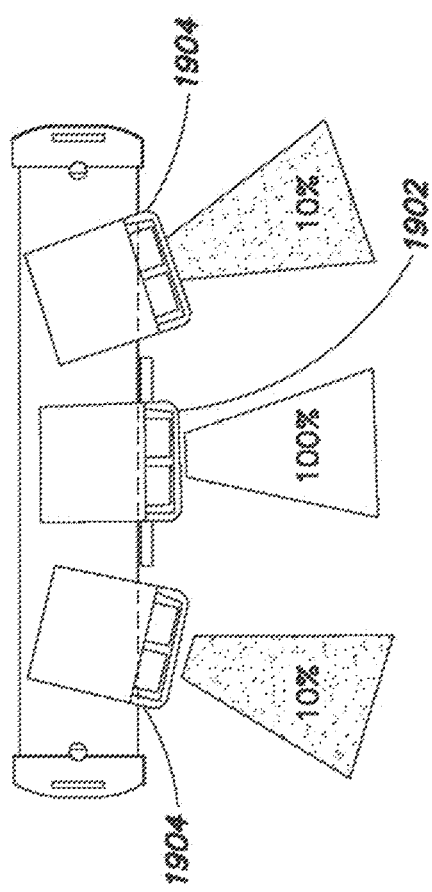

LIGHTING FIXTURES AND METHODS OF COMMISSIONING LIGHTING FIXTURES

CROSS-REFERENCE TO RELATED APPLICATIONS

This application is a continuation of U.S. application Ser. No. 16/447,151, filed Jun. 20, 2019, which is a continuation of U.S. application Ser. No. 15/367,125, filed Dec. 1, 2016, which is a division of and claims the benefit of U.S. patent application Ser. No. 14/518,831, filed Oct. 20, 2014, which is a continuation of and claims the benefit of U.S. patent application Ser. No. 12/817,425, filed Jun. 17, 2010, which claims priority to and the benefit of U.S. Provisional Patent Application No. 61/303,608, filed Feb. 11, 2010; and U.S. Provisional Patent Application No. 61/303,278, filed Feb. 10, 2010, the contents of each of which are hereby incorporated herein by reference in their entirety.

U.S. patent application Ser. No. 12/817,425, filed Jun. 17, 2010, is also a continuation-in-part of and claims the benefit of U.S. patent application Ser. No. 12/423,543, filed Apr. 14, 2009, now U.S. Pat. No. 8,232,745, issued Jul. 31, 2012, and U.S. patent application Ser. No. 12/423,361, also filed Apr. 14, 2009, now abandoned, each of which claims the benefit of U.S. Provisional Patent Application No. 61/044,591, filed Apr. 14, 2008; U.S. Provisional Patent Application No. 61/055,727, filed May 23, 2008; U.S. Provisional Patent Application No. 61/084,367 filed Jul. 29, 2008; U.S. Provisional Patent Application No. 61/102,159, filed Oct. 2, 2008; U.S. Provisional Patent Application No. 61/108,698, filed Oct. 27, 2008; and U.S. Provisional Patent Application No. 61/109,009, filed Oct. 28, 2008, the contents of each of which are hereby incorporated herein by reference in their entirety.

The contents of each of the above-referenced applications are hereby incorporated herein by reference in their entirety.

BACKGROUND

Field of the Invention

The present invention relates to lighting systems.

Description of the Related Art

Conventional systems for retrofit lighting applications are known by various parameters such as fixture mounting height, spacing, beam pattern, light level and some other parameters. However, none of the systems discloses a one-size-fits-all approach to include a large number of fixtures. In addition, the installation of such systems may be costly due to expenses incurred on wiring and power. Also, conventional systems may rely on low-tech occupancy or ambient light sensors that may not be feasible solutions with respect to environmental conditions.

Additionally, these systems may not be equipped to include variability in electricity pricing models.

Therefore, there is a need for improved lighting systems in both retrofit and new applications.

SUMMARY

Various embodiments of the present invention disclose modular designs of lighting systems that may be employed in a variety of environments. These lighting systems may employ lighting fixtures that may be LED or non-LED based, or a combination of both and that may be modularly designed for different directions and beam angles.

An aspect of the present invention discloses methods and systems for managing lighting in a plurality of environments, such as warehouse, manufacturing facility, parking garages, street lighting, prisons, gymnasiums, indoor pools, stadiums, bridges, tunnels, and some other types of environments.

Embodiments of the present invention may disclose methods and systems for delivering light as a resource by controlling and managing lighting systems based on mutually agreed parameters between an operator of the environment and a third party.

In an embodiment of the present invention, methods and systems may be provided for managing lighting in the environment based on information regarding energy demand.

In an aspect of the present invention, methods and systems may be disclosed for managing lighting in the environment based on the alternative energy and utility energy demand information.

Embodiments of the present invention may also disclose methods and systems for managing lighting in the environment based on the information regarding alternative/utility energy storage.

In an embodiment, methods and systems may be provided for regulating the lighting systems through a network based on the assessment of various demand information.

In an aspect of the present invention, methods and systems for managing lighting systems in the environment may include measuring lighting conditions in the environment and validating them based on mutually agreed parameters.

In another aspect of the present invention, modular lighting systems with variable lumen output and beam angles may be provided.

In an embodiment, modular lighting systems with management units and frames may be provided.

Embodiments of the present invention may disclose centrally controlled intelligent lighting systems for management of high bay fixtures in various environments.

In an embodiment, the control may be a wireless control.

In an aspect of the present invention, methods and systems for management of the lighting systems by performing lighting predictions based on past performance of the lighting systems may be provided.

Embodiments of the present invention may disclose use of sensors and tracking tools for intelligently managing the lighting in the environments.

In other embodiments, various lighting systems including fixtures with variable luminous efficacy, modular power connector system, and user-replaceable optical component may be provided.

In another embodiment, lighting systems with LED multihead may be provided.

In another embodiment, lighting systems with integral emergency lighting function, integrated RFID reader, lighting control system with electricity demand response interface, integrated electricity time-shift, integrated payment gateway, integrated camera for facility security systems, and ruggedized or explosion-proof LED fixture with integrated sensing and network, may be provided.

In an aspect of the present invention, methods and systems may be provided for managing artificial lighting in an environment. The method may include providing a plurality of lighting systems in the environment, storing a plurality of mutually agreed upon lighting parameters in a database, regulating the artificial lighting in the environment in accordance with the stored lighting parameters by automatically making a lighting measurement in the environment, comparing the lighting measurement with at least one of the stored lighting parameters, and making an adjustment to at least one of the lighting systems through the data network in accordance with the comparison. The lighting measurement in the environment may also be the measurement of a light level in the environment that may include natural light. Each of the plurality of the lighting systems may be associated with a data network and may be controlled through it. The mutual agreement for storing the lighting parameters may be between an operator of the environment and a third party manager of the artificial lighting.

The method may further include a third party manager user interface that may be adapted to provide the third party manager of the artificial lighting with tools for adjusting at least one of the lighting systems. The third party manager user interface may be adapted to provide the third party manager of the artificial lighting with tools for changing at least one of the plurality of stored lighting parameters. Further, the third party manager user interface may be adapted to provide the third party manager of the artificial lighting with tools for adding a new lighting parameter to the plurality of stored lighting parameters. Furthermore, the third party manager user interface may be adapted to provide the third party manager of the artificial lighting with tools for removing at least one of the lighting parameters from the plurality of stored lighting parameters. Still further, the third party manager user interface may be adapted to provide the third party manager of the artificial lighting with tools for manually overriding the automated decisions made according to the stored lighting parameters. The third party manager user interface may also be adapted to provide the third party manager of the artificial lighting with tools for determining which of the stored lighting parameters may be modified by the operator of the environment. Similarly, the method may include an operator user interface that may be adapted to provide an operator of the environment with tools for adjusting at least one of the lighting systems. In other embodiments, the operator user interface may be adapted to provide an operator of the environment with tools for changing at least one of the plurality of stored lighting parameters. In another embodiment, the operator user interface may be adapted to provide an operator of the environment with tools for visualizing the energy consumed by at least one of the lighting systems.

In embodiments, at least one of the lighting systems may be an LED lighting system. In embodiments, the beam angle produced by the LED lighting system may be altered, wherein the alteration may be a result of the comparison. Further, the LED lighting system may include a plurality of LED light strips; each of the plurality of light strips may produce a beam angle projected to cover a different area. In embodiments, the different areas may be in part overlapping. In embodiments, the method may further include storing a plurality of energy demand parameters wherein each of the plurality of energy demand parameters may be associated with a lighting regulation parameter such that when energy demand information is provided, at least one lighting system may be controlled in accordance with the lighting regulation parameter. This energy demand parameter may relate to utility energy demand and/or alternate energy demand.

In embodiments, a method and system may be provided for managing artificial lighting in an environment. The method may include providing a plurality of lighting systems in the environment, receiving energy demand information, comparing the energy demand information to an energy demand parameter stored in a database, evaluating the comparison according to a rule stored in a database, and communicating lighting control information through the data network to regulate at least one of the lighting systems in the environment in accordance with the evaluation. Each of the plurality of lighting systems may be associated with and controlled through the data network.

In embodiments, the regulation of at least one lighting system may involve regulating the beam angle of the light emitted from at least one lighting system. The regulation may also involve regulating the light intensity in a portion of the beam angle emitting from one or more lighting systems. The regulation of the lighting system may further involve modifying the intensity of at least one lighting system based on sensors placed in the environment. Change in at least one of the rules used to manage the behavior of at least one lighting system and modification of the amount of time the one lighting system may be turned on in response to sensor inputs may form part of the regulation of the lighting system. In addition, the regulation of at least one lighting system may involve modifying the brightness of some subset of the lights of the one or more lighting system.

In embodiments, the method may further include providing an energy provider user interface adapted to provide the energy provider with tools for adjusting at least one of the lighting systems. In embodiments, the method may also include providing an energy provider user interface adapted to provide the energy provider with tools for changing at least one of the pluralities of stored lighting parameters.

In embodiments, the method may include providing an energy provider user interface adapted to provide the energy provider with tools for adding a new lighting parameter to the plurality of stored lighting parameters. Further, the energy provider user interface may be adapted to provide the energy provider with tools for removing at least one of the lighting parameters from the plurality of stored lighting parameters. In other embodiments, energy provider user interface may be adapted to provide the energy provider with tools for manually overriding the automated decisions made according to the stored lighting parameters. In embodiments, the method may comprise providing an energy provider user interface adapted to provide the energy provider with tools for manually overriding the automated decisions made according to the stored lighting parameters. The method may also include providing an energy provider user interface adapted to provide the energy provider with tools for determining which of the stored lighting parameters may be modified by the operator of the environment. In another embodiment, the method may comprise providing an operator user interface adapted to provide the operator of the environment with tools for changing at least one of the pluralities of stored lighting parameters and for adjusting at least one of the lighting systems. Further, the operator user interface may be adapted to provide an operator of the environment with tools for visualizing the energy consumed by at least one of the lighting systems.

In an aspect of the present invention, a method and system may be provided for managing artificial lighting in an environment. The method may include providing a plurality of lighting systems in the environment, storing energy produced by an alternative energy source for use at a time different from when it is generated by the alternative energy source, and receiving utility energy demand information. Each of the plurality of lighting systems may be associated with the data network and controlled through the data network. The method may also include comparing the received utility energy demand information to a utility energy demand parameter stored in a database and making an assessment of the options of using utility energy and using the stored energy produced by the alternative energy source. Based on the assessment, at least one of the utility energy and the stored energy for use by the plurality of lighting systems may be selected, and at least one of the lighting systems may be regulated.

In embodiments, the regulation of at least one lighting system may involve regulating the beam angle of the light emitted from at least one lighting system, as well as regulating the light intensity in a portion of the beam angle emitting from the one lighting system. The regulation of at least one lighting system may also involve regulating the intensity of the one lighting system based on sensors placed in the environment and modifying at least one of the rules used to manage the behavior of at least one lighting system. The lighting system regulation may further include modification of the amount of time that at least one lighting system is turned on in response to sensor inputs and modification of the brightness of some subset of the lights making up at least one lighting system.

In embodiments, the method may further include providing an operator user interface adapted to provide the operator of the environment with tools for adjusting at least one of the lighting systems, tools for changing at least one of the pluralities of stored lighting parameters, and/or tools for visualizing the energy consumed by at least one of the lighting systems.

In another aspect of the present invention, a method and system may be provided for managing artificial lighting in an environment. The method may include providing a plurality of lighting systems in the environment, receiving energy from an alternative energy source, receiving information about the amount, kind, and expense of energy available from the alternative energy source, and receiving utility energy demand information. The utility energy demand information may be compared to a utility energy demand parameter stored in a database, and an assessment may be made of the options of using utility energy and using the alternative energy. Based on the assessment, selection may be done of at least one of the utility energy and the alternative energy for use by the plurality of lighting systems; and at least one of the lighting systems may be regulated through the data network based on the assessment. Each of the plurality of lighting systems may be associated with a data network, and each of the plurality of lighting systems may be controlled through the data network.

In yet another aspect of the present invention, a method and system may be provided for managing artificial lighting in an environment. The method may include providing a plurality of lighting systems in the environment, storing energy produced by an alternative energy source for use at a time different than when it is generated by the alternative energy source; receiving information about the amount, kind, and expense of energy stored from the alternative energy source, and receiving utility energy demand information. The utility energy demand information may be compared to a utility energy demand parameter stored in a database, and an assessment may be made of the options of using utility energy and using the alternative energy. Based on the assessment, at least one of the utility energy and the alternative energy may be selected for use by the plurality of lighting systems; and at least one of the lighting systems may be regulated through the data network based on the assessment. Each of the plurality of lighting systems may be associated with a data network, and each of the plurality of lighting systems may be controlled through the data network.

In embodiments, the regulation of at least one lighting system may involve regulating the beam angle of the light emitted from the one lighting system, as well as regulating the light intensity in a portion of the beam angle emitting from at least one lighting system. The regulation of at least one lighting system may rely on the intensity of the one lighting system based on sensors placed in the environment and may require modification of at least one of the rules used to manage the behavior of at least one lighting system. The regulation of at least one lighting system may further involve modifying the amount of time the one lighting system is turned on in response to sensor inputs and the brightness of some subset of the lights making up at least one lighting system.

In embodiments, the method may further include providing an operator user interface adapted to provide the operator of the environment with tools for adjusting at least one of the lighting systems, tools for changing at least one of the pluralities of stored lighting parameters, and/or tools for visualizing the energy consumed by at least one of the lighting systems.

In another aspect of the present invention, a method and system may be provided for managing artificial lighting in an environment. The method may include providing a plurality of lighting systems in the environment, storing a plurality of mutually agreed upon lighting parameters in a database, and automatically measuring lighting conditions in the environment to check compliance of the artificial lighting in the environment based on the agreed upon lighting parameters. Each of the plurality of lighting systems may be associated with a data network, and each of the plurality of lighting systems may be controlled through the data network. The mutual agreement pertaining to the storing of the mutually agreed upon lighting parameters in a database may be between the operator of the environment and the third party manager of the artificial lighting.

In embodiments, the automatic measurements may relate to levels of brightness in an environment. In embodiments, the automatic measurements may also relate to the operating status of the lighting system which in turn may relate to the power consumed by the lighting system. The operating status may further relate to whether the individual light fixtures are operational. The operating status may also relate to the amount of time for which the individual light fixtures may have been operational ("run hours") and whether the lighting system has been tampered with. The operating status may relate to third party systems to which the lighting system may be interconnected.

In embodiments, the automatic measurements may be made periodically. In other embodiments, the automatic measurements may be made upon the occurrence of an event where the event may be a time of day, a sensor response, a manual request, or the event may be based on an energy demand parameter.

In embodiments, a report may be generated based on the compliance check. The report may include percentage of time out of compliance, percentage of time in compliance, a cost of energy used to maintain compliance, an indication of how much alternatively generated energy was used to maintain compliance, a reconciliation of received energy cost estimates during operation of the lighting in the environment and the actual energy costs incurred, an indication of lighting system efficiencies, an indication of lighting system maintenance costs, an indication of when lighting system maintenance may be required, an indication of when lighting system maintenance may be desirable, and some other related parameters.

In embodiments, at least one of the lighting systems may be an LED lighting system. In embodiments, the beam angle produced by the LED lighting system may be altered, wherein the alteration may be a result of the comparison. Further, the LED lighting system may include a plurality of LED light strips where each of the plurality of light strips may produce a beam angle projected to cover a different area. In embodiments, the different areas may in part be overlapping.

In an aspect of the present invention, a method and system may be provided for assembling a luminaire out of components in a modular fashion. The method may include selecting a plurality of light modules, selecting a plurality of power management modules, and selecting a fixture frame that may provide mechanical support for the plurality of light modules and plurality of power management modules. Each of the plurality of light modules may produce a prescribed lumen output according to a prescribed beam angle distribution. Additionally, each of the plurality of power management modules may control power for one or more of the plurality of light modules.

In embodiments, the fixture frame that may provide mechanical support for the plurality of light modules and plurality of power management modules may also provide a mechanism for rotating the light module around one or two axes. The light modules mounted in a fixture may be individually controlled through data received on a data port. The beam distribution of the individual light modules may be modified by a user-replaceable optical assembly and an overall aggregate beam angle produced by the luminaire may be modified by a user-replaceable optical assembly.

In embodiments, the steps of the above process for assembling the luminaire may be embodied in a software application meant to guide a purchaser of the luminaire in the luminaire's construction.

In embodiments, a method and system may be provided related to a device for providing power to a plurality of LEDs. The method may include a power input; a first power output, for connecting to one or more strings of LEDs, a second power output, for providing a regulated low-voltage supply to accessories, and a network data input that can be used to control the power provided to the LEDs.

In embodiments, the method may further include a second data input for the receipt of analog data and a second data input for the receipt of digital data.

In an aspect of the invention, a lighting fixture may include a plurality of light emitting diode (LED) light bars mounted within a housing, wherein at least one of the plurality of light bars is arranged to rotate along at least one rotational axis independent of the orientation of the housing, wherein the rotatable LED light bar is arranged in the lighting fixture such that it is used to change the aggregate beam angle of light emitted from the lighting fixture when its angle of rotation is substantially changed. The fixture may further comprise an enclosure within the housing for disposing at least one sensor module, wherein the sensor module is in electrical communication with at least one of the plurality of LED light bars, wherein the surface of a sensor module lens is arranged to be close to a bottom plane of the fixture to achieve a maximum of sensor input angles.

In an aspect of the invention, a lighting fixture may comprise a plurality of light emitting diode (LED) light bars mounted within a housing, wherein at least one of the plurality of light bars is constructed and arranged to rotate around one or two axes, wherein the rotatable LED light bar is arranged in the lighting fixture such that it is used to change the aggregate beam angle of light emitted from the lighting fixture when its angle of rotation is substantially changed, and an angle indicator disposed on at least one of the LED light bar and the housing for indicating an angular adjustment of the LED light bar. The angle indicator may be a detent. The angle indicator may be a visual scale of at least one of degrees, numbers, and letters.

In an aspect of the invention, a method for altering an aggregate beam pattern may comprise mounting a plurality of light emitting diode (LED) light bars within a housing, wherein at least one of the plurality of LED light bars is a variable light intensity LED light bar, and electrically connecting a driver circuit to the at least one variable light intensity LED light bar for controlling a variable load applied to the at least one LED light bar, wherein the luminous output of the at least one LED light bar is varied in response to a change in the load. Each LED light bar may be controlled by a dedicated driver circuit. The plurality of LED light bars may be controlled by a shared driver circuit and a controllable shunt across each LED light bar allows for individual control. At least one of the plurality of light bars ay include a rotational drive constructed and arranged to rotate the at least one LED light bar along at least one rotational axis independent of the orientation of the housing.

In an aspect of the invention, a lighting fixture may include a plurality of light emitting diode (LED) light bars mounted within a housing, wherein at least one of the plurality of LED light bars has a different beam pattern, wherein the beam pattern of the at least one LED light bar is modified by an optical assembly.

In an aspect of the invention, a lighting fixture may include a plurality of light emitting diode (LED) light bars arranged within a housing, and a processor arranged to receive local sensor input and to adjust an intensity of light emitted from the plurality of LED light bars in response to the received local sensor input, wherein the processor is disposed in an enclosure mounted within the fixture, and wherein at least one LED light bar is arranged to rotate along at least one axis.

In an aspect of the invention, a computer program product embodied in a computer readable medium that, when executing on one or more computers, may perform the steps of storing LED light bar input data in the memory of the computer, receiving input on at least one parameter associated with a lighting area, receiving input on at least one desired lighting characteristic for the lighting area, and selecting at least one of a number of LED light bars, an optical profile for the LED light bars, an LED light bar fixture frame and an angular setting for the LED light bars based on the input.

In an aspect of the invention, a lighting fixture may include a plurality of light emitting diode (LED) light bars mounted within a housing, and an enclosure within the housing for disposing at least one sensor module, wherein the sensor module is in electrical communication with at least one of the plurality of LED light bars, wherein the surface of a sensor module lens is arranged to be close to a bottom plane of the fixture to achieve a maximum of sensor input angles, and wherein at least one of the plurality of LED light bars is modified by an optical assembly to emit a different beam pattern. The sensor may have swappable lenses. A variety of lenses may be carried on a lens wheel and rotated into place. The sensor enclosure may accept at least one of a PIR, ambient light, radiation, and particulate sensor, each of which is field-installable and field-swappable. The optical element for each sensor module may be field-swappable based on usage. The usage may be end of aisle vs. center vs. general wide field-of-view. Each sensor module may contain several types of optics which are selectable via a "lens-wheel" which could rotate different optics in front of the sensor, allowing an installer to select the proper optical configuration at time of installation.

In an aspect of the invention, a lighting fixture may include a plurality of light emitting diode (LED) light bars mounted within a housing, and a power management module (PMM) that supplies power to a plurality of sensor modules, wherein the PMM provides DC power and bidirectional data communication to a plurality of sensors along at least two data conductors, and wherein the PMM controls at least one of the plurality of LED light bars based on one or more inputs from the plurality of sensors. The sensors may be adapted to transmit an identification signal to the processor. The PMM may respond to the sensor module in accordance with the transmitted identification signal.

In an aspect of the invention, a lighting fixture may include an LED lighting system mounted within a housing, and a processor arranged to receive and process multiple sources of input data and adjust an LED lighting system parameter in response to the data in accordance with at least one rule stored in a memory of the processor, wherein the rile determines a weight to apply to each of the input signals, combines those weighted signals via an arbitration algorithm, and determines the adjustment to the LED lighting system parameter according to the output of the algorithm. The input data may include at least one of sensors connected to the fixture, sensor data conveyed from a remote sensor via a network, centralized commands, and utility inputs. The LED lighting system parameter may be at least one of the fixture's light level and the fixture's power consumption.

In an aspect of the invention, a lighting fixture may include an LED lighting system mounted within a housing, and a power management module comprising multiple sources of power input and a processor in electrical communication with the LED lighting system, wherein the processor is arranged to receive information about the impact of consuming power from each of the sources of input power, combine the impact information via an arbitration algorithm, and select which power input to utilize based on the output of the algorithm in accordance with at least one rule stored in a memory of the processor. At least one of the sources of input power may be an energy storage device connected directly to one or more lighting fixtures. The energy storage device may be a battery. The energy storage device may be an ultracapacitor. The information may be at least one of price per kWh, amount of kWh remaining in a storage device, and instantaneous power available from a renewable energy source.

In an aspect of the invention, a lighting fixture may include a plurality of light emitting diode (LED) light bars mounted within a housing, a processor in electrical communication with the plurality of LED light bars, wherein the processor is arranged to communicate with at least one of the plurality of LED light bars to obtain identifying information about the LED light bar, and a memory of the processor for storing the identifying information in a form accessible by a user of the lighting fixture. The identifying information may include at least one of beam angle, rotational position, lumen output, CCT, run hours, operating voltage, drive current [min/max/nominal], and thermal constraints [max ambient] The identifying information may be calculated or predicted based on at least one of beam angle, rotational position, lumen output, CCT, run hours, operating voltage, drive current [min/max/nominal], and thermal constraints [max ambient]. The identifying information may be stored in a nonvolatile memory onboard the LED light bar, and communicated via a digital bus to the processor. The identifying information may be stored passively on the LED light bar and can be read by the processor. The passive storage may include electrical contacts with encoded bit pattern stored in an optics holder. The passive storage may include passive RFID. The identifying information may be stored via a mechanism integrated into the housing and/or light bar for sensing angular position of the LED light bar inside the housing. The mechanism may include an encoder-style code on an end plate of the LED light bar. The mechanism may include an accelerometer disposed on the LED light bar. The identifying information may be stored via a passive power-up modulation sensing scheme, such as delta-t to full current consumption. The processor may be able to signal LED light bar type to users or operators for light bar replacement purposes. The signal may be via a tricolor LED on the LED light bar or PMM with the LED light bar type indicated via color code, via an LED on the LED light bar or PMM which blinks according to code to indicate LED light bar type, via a handheld scanner which reads encoded IR or visible light from the lighting fixture to determine type, and can be activated with laser detector or IR handshake, or via RF transmission of LED light bar types to remote diagnostic equipment.

In an aspect of the invention, a computer program product embodied in a computer readable medium that, when executing on one or more computers may perform the steps of querying an LED lighting fixture comprising a plurality of LED light bars mounted within a housing for identifying information, receiving and storing the identifying information in a power management module of the LED lighting fixture in a form accessible by a user of the LED lighting fixture, and displaying the identifying information to a user of the LED lighting fixture.

In an aspect of the invention, a lighting fixture may include a plurality of light emitting diode (LED) light bars mounted within a housing, a processor in electrical communication with the plurality of LED light bars, wherein the processor is arranged to communicate with at least one of the plurality of LED light bars to obtain identifying information about the LED light bar and auto-calibrate the power input to each LED light bar based on the identifying information. The identifying information may include at least one of beam angle, rotational position, lumen output, CCT, run hours, operating voltage, drive current [min/max/nominal], and thermal constraints [max ambient]. The identifying information may be calculated or predicted based on at least one of beam angle, rotational position, lumen output, CCT, run hours, operating voltage, drive current [min/max/nominal], and thermal constraints [max ambient]. The identifying information may be stored in a nonvolatile memory onboard the LED light bar, and communicated via a digital bus to the processor. The identifying information may be stored passively on the LED light bar and can be read by the processor. The passive storage may include electrical contacts with encoded bit pattern stored in an optics holder. The passive storage may include passive RFID. The identifying information may be stored via a mechanism integrated into the housing and/or light bar for sensing angular position of the LED light bar inside the housing. The mechanism may include an encoder-style code on an end plate of the LED light bar. The mechanism may include an accelerometer disposed on the LED light bar. The identifying information may be stored via a passive power-up modulation sensing scheme, such as delta-t to full current consumption. The processor may be able to signal LED light bar type to users or operators for light bar replacement purposes. The signal may be via a tricolor LED on the LED light bar or PMM with the LED light bar type indicated via color code, via an LED on the LED light bar or PMM which blinks according to code to indicate LED light bar type, via a handheld scanner which reads encoded IR or visible light from the lighting fixture to determine type, and can be activated with laser detector or IR handshake, or via RF transmission of LED light bar types to remote diagnostic equipment.

In an aspect of the invention, a lighting fixture may include a plurality of light emitting diode (LED) light bars mounted within a housing, wherein at least one of the plurality of light bars is a rotatable LED light bar, wherein the rotatable LED light bar is arranged in the lighting fixture such that it is used to change a beam angle of light emitted from the lighting fixture when its angle of rotation is substantially changed, and a heatsink disposed on the housing, wherein the fins of the heatsink are oriented perpendicular to the axis of rotation of the LED light bar. The long edges of the fins may be undercut to enable additional airflow. The cross-sectional profile of the heat sink may be designed to perform optimally within a continuous range of rotation along the long axis of the LED light bar.

In an aspect of the invention, a flush-mount lighting fixture may include a plurality of light emitting diode (LED) light bars mounted within a housing, and a thermal interface pad disposed along an upper surface of the housing in contact with a mounting surface, wherein the thermal interface pad enables transfer of heat energy from the LED light bars to the mounting surface.

In an aspect of the invention, a pole-mounted lighting fixture may include a light emitting diode (LED) light bar mounted within a housing attached to a pole, and a heat pipe system integrated with the fixture, wherein the heat pipe system comprises a radiator attached to the pole and a thermal transfer material flowing between the radiator and the heat pipe system within the fixture. The radiator may be self-orienting into prevailing winds.

In an aspect of the invention, a lighting fixture may include a light emitting diode (LED) light bar mounted within a housing, a water reservoir embedded within the fixture for capturing atmospheric water, and an evaporative cooling element in fluid communication with the water reservoir that absorbs heat from the LED light bar and causes the evaporative cooling of the fixture.

In an aspect of the invention, a lighting fixture may include a light emitting diode (LED) light bar mounted within a housing, a waste heat recovery facility disposed within the housing for converting waste heat from the LED light bar to electrical power, and a circuit for directing the electrical power generated from the waste heat to a power input for the lighting fixture.

In an aspect of the invention, a lighting fixture may include a light emitting diode (LED) light bar mounted within a housing, and an electrostatic element disposed on a surface of the housing, wherein the element is charged by drawing power from the lighting fixture, wherein the electrostatic element attracts charged air particles, causing an airflow of charged air particles through the lighting fixture.

In an aspect of the invention, a lighting fixture may include a plurality of light emitting diode (LED) light bars mounted within a housing, and a laser mounted on at least one LED light bar for indicating a direction of emitted light from the LED light bar.

In an aspect of the invention, a lighting fixture may include a plurality of light emitting diode (LED) light bars mounted within a housing, and a mask mounted on at least one LED light bar for sharpening the edges of the light emitted from the LED light bar, wherein sharpening enables determining a direction of emitted light from the LED light bar.

In an aspect of the invention, a lighting fixture may include a plurality of light emitting diode (LED) light bars mounted within a housing, and a level mounted on at least one LED light bar for indicating the relative position of LED light bar with respect to level.

In an aspect of the invention, a wireless communication network adapted for use in controlling a plurality of lighting fixtures, the wireless communication network may include a plurality of lighting fixtures, the lighting fixtures comprising a plurality of light emitting diode (LED) light bars mounted within a housing, at least one sensor integrated in at least one of the plurality of lighting fixtures, wherein each of the plurality of lighting fixtures are configured to receive a sensor data signal from one of the plurality of lighting fixtures and transmit a sensor data signal to at least one other of the plurality of lighting fixtures and further configured to receive a sensor data signal transmitted by one of the other lighting fixtures and transmit a repeated sensor data signal to at least one other of the plurality of lighting fixtures, wherein when a sensor data signal is received by a lighting fixture, a built-in processor processes the sensor data signal and transmits a control command to the lighting fixture in accordance with at least one rule stored in a memory of the processor.

In an aspect of the invention, a method of automatically mapping a network of lighting fixtures may include placing a plurality of lighting fixtures in a lighting area, the lighting fixtures comprising a plurality of light emitting diode (LED) light bars mounted within a housing, integrating at least one sensor in at least one of the plurality of lighting fixtures, wherein each of the plurality of lighting fixtures are configured to receive a sensor data signal from one of the plurality of lighting fixtures and transmit a sensor data signal to at least one other of the plurality of lighting fixtures and further configured to receive a sensor data signal transmitted by one of the other lighting fixtures and transmit a repeated sensor data signal to at least one other of the plurality of lighting fixtures, collecting performance data relating to the network of lighting fixtures, wherein the performance data are at least one of sensor data signal strength and the hop count of a sensor data signal from one lighting fixture to another, and generating a representation of the network of lighting fixtures based upon the lighting fixture placement and the network performance data. The representation may be used to construct a rule database stored on at least one lighting fixture or in a centralized network controller. The representation may be used to automatically assign lighting fixtures to zones. The representation may be used to automatically determine from which lighting fixtures' sensors the sensorless fixtures should receive sensor data signals.

In an aspect of the invention, a method of automatically mapping a network of lighting fixtures may include placing a plurality of lighting fixtures in a lighting area, the lighting fixtures comprising a plurality of light emitting diode (LED) light bars mounted within a housing, integrating at least one sensor in at least one of the plurality of lighting fixtures, wherein each of the plurality of lighting fixtures are configured to receive a sensor data signal from one of the plurality of lighting fixtures and transmit a sensor data signal to at least one other of the plurality of lighting fixtures and further configured to receive a sensor data signal transmitted by one of the other lighting fixtures and transmit a repeated sensor data signal to at least one other of the plurality of lighting fixtures, wherein the sensor data signal comprises a unique identifying signal, and generating a representation of the network of lighting fixtures based upon the detection of transmitted unique identifying signals by at least one neighboring lighting fixture of the transmitting lighting fixture. The representation may be used to automatically assign lighting fixtures to zones. The representation may be used to automatically determine from which lighting fixtures' sensors the sensorless fixtures should receive sensor data signals.

In an aspect of the invention, a method of mapping a network of lighting fixtures may include placing a plurality of lighting fixtures in a lighting area, the lighting fixtures comprising a plurality of light emitting diode (LED) light bars mounted within a housing, integrating at least one sensor in at least one of the plurality of lighting fixtures, wherein each of the plurality of lighting fixtures are configured to receive a sensor data signal from one of the plurality of lighting fixtures or an outside source and transmit a sensor data signal to at least one other of the plurality of lighting fixtures and further configured to receive a sensor data signal transmitted by one of the other lighting fixtures and transmit a repeated sensor data signal to at least one other of the plurality of lighting fixtures, selecting neighbors of each lighting fixture by detecting a sensor data signal transmitted to at least one lighting fixture from an outside source, wherein the sensor data signal comprises neighbor information, and generating a representation of the network of lighting fixtures based upon the detection of transmitted sensor data signals from the outside source. The transmitted sensor data signal may be a laser signal. The transmitted sensor data signal may be a remote control IR signal. The representation may be used to automatically assign lighting fixtures to zones. The representation may be used to automatically determine from which lighting fixtures' sensors the sensorless fixtures should receive sensor data signals.

In an aspect of the invention, a method of cooperative failure compensation in a network of lighting fixtures may include placing a plurality of lighting fixtures in a lighting area, the lighting fixtures comprising a plurality of light emitting diode (LED) light bars mounted within a housing, detecting a failure event of at least one of the plurality of LED light bars, determining a neighbor of the failed LED light bar based on consulting a network topology, and overdriving the neighboring LED light bar to compensate for the failure event. When one fixture or part of a fixture fails, neighboring fixtures may detect this and increase their light level to maintain desired light on surfaces. Sensing may occur via sensing onboard or via notification over network. The PMM can intelligently detect the presence of a dead light bar by sequencing through output channels and detecting power consumption at each step.

In an aspect of the invention, a lighting fixture may include a light module and a plurality of individually replaceable light emitting diode (LED) light bars.

In an aspect of the invention, a lighting fixture may include a plurality of light emitting diode (LED) light bars and a processor in communication with and for controlling the LED light bars.

In an aspect of the invention, a method may include powering a plurality of light emitting diode LED) light bars with a power management unit. The method may also include adaptively dimming at least one of the plurality of LED light bars with the power management unit.

In an aspect of the invention, a method may include receiving from a plurality of sensors data relevant to lighting power management. The method may further include logging the data with a power management unit configured for powering a plurality of light emitting diode (LED) light bars.

In an aspect of the invention, a system may include a power management unit for powering a plurality of light emitting diode LED) light bars. The system may also include a real-time clock associated with the power management unit.

In an aspect of the invention, a method may include powering a plurality of light emitting diode (LED) light bars with a power management unit. Further, the method may include measuring energy usage of at least one of the plurality of LED light bars for metering power associated with the power management unit.

In an aspect of the invention, a method may include powering a plurality of light emitting diode (LED) light bars with a power management unit. The method may also include reporting information related to powering the plurality of LED light bars over a network to a remote facility.

In an aspect of the invention, a method may include powering a plurality of light emitting diode (LED) light bars with a power management unit. The method may further include predicting a lifetime of at least one of the plurality of LED light bars.

In an aspect of the invention, a method may include powering a plurality of light emitting diode (LED) light bars with a power management unit. The method may also include determining temperature associated with at least one of the plurality of LED light bars. Furthermore, the method may include assessing the temperature to identify a lighting power management parameter to be adjusted to facilitate temperature protection of an LED light bar.

In an aspect of the invention, a system may include a power management unit for powering a plurality of light emitting diode LED) light bars. The system may further include a modular sensor bus in communication with the power management unit.

In an aspect of the invention, a method may include powering a plurality of light emitting diode (LED) light bars with a power management unit. Further, the method may include arbitrating among a plurality of input signals related to lighting control to power the plurality of LED light bars.

In an aspect of the invention, a method may include powering a plurality of light emitting diode (LED) light bars with a power management unit. The method may also include taking information related to consuming power from each of a plurality of power sources. Further, the method may include arbitrating among the plurality of power sources for powering the plurality of LED light bars.

In another aspect of the invention, a method may include powering a plurality of light emitting diode (LED) light bars with a power management unit. The method may further include receiving data from at least one of the plurality of LED light bars. Moreover, the method may include automatically adjusting power provided to the at least one of the plurality of LED light bars based on the data.

In yet another aspect of the invention, a method may include powering a light emitting diode (LED) light module with a power management unit. The method may further include receiving identification data from the light module by the power management unit.

In an aspect of the invention, a system may include a power management unit for powering a plurality of light emitting diode (LED) light bars. The system may include a ballast interface in communication with the power management unit for controlling at least one of the plurality of LED light bars.

In an aspect of the invention, a power measurement system may include an optoisolator and a Zener diode in electrical communication with one another and an AC power line. The power measurement system may also include a current transformer in electrical communication with the AC power line that provides an isolated current measurement. Further, the power measurement system may include a temperature sensor, located in proximity to the Zener diode that measures a temperature of the system and communicates the temperature to a temperature compensation system. In addition, the power measurement system may include a processor that decodes the AC voltage pulses by measuring the digital pulse width, which is indicative of the amount of time the AC voltage spends above a Zener reference voltage, to determine an instantaneous AC voltage, the processor further combining the instantaneous AC voltage with the analog current measurement to provide an instantaneous power consumption.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 17A and 17B depict a fixture with rotatable light bars

FIGS. 19A and 19B depict a fixture with individual light module dimming.

DETAILED DESCRIPTION

Figure 1A:
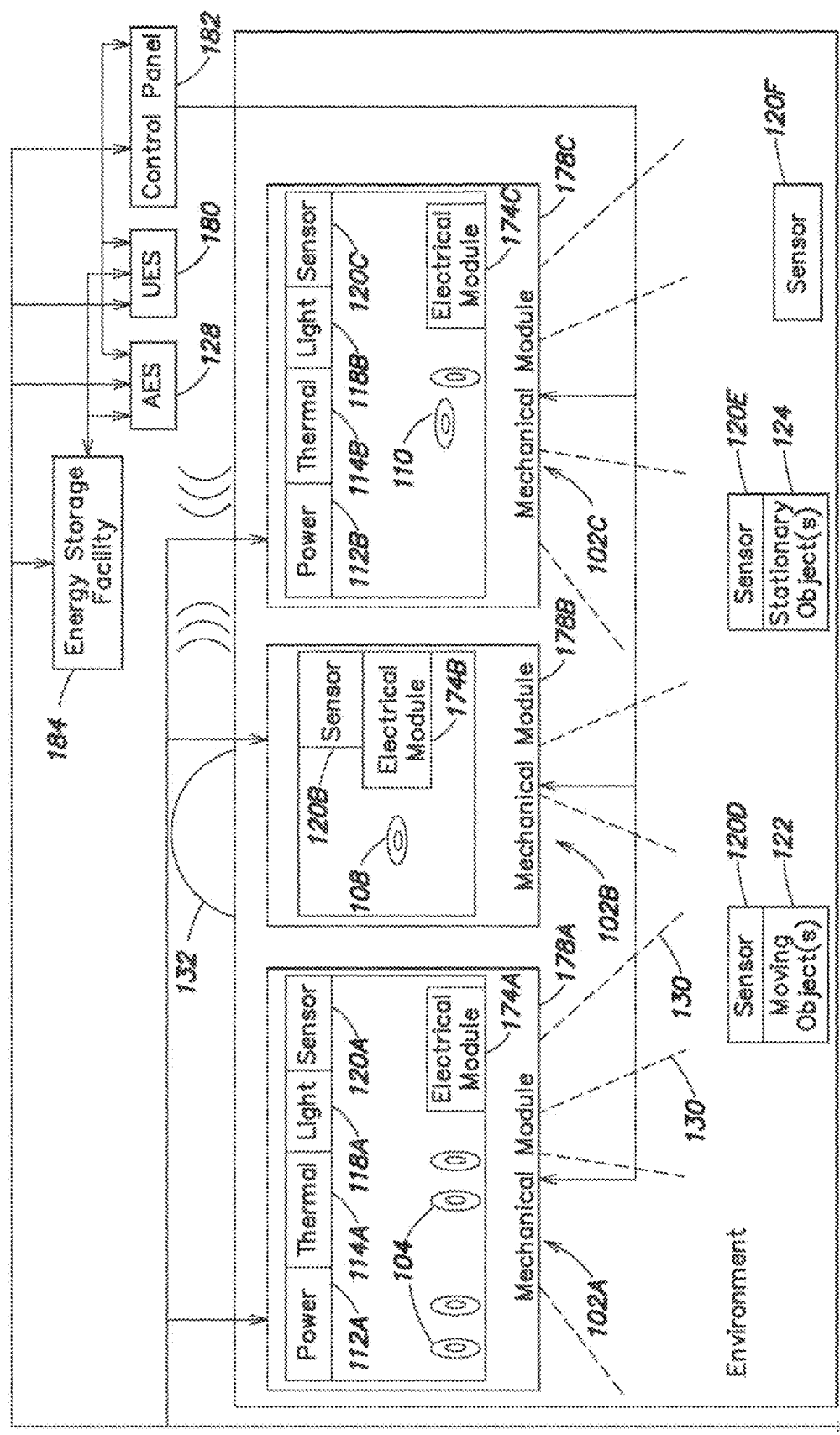
FIGS. 1A and 1B depict an exemplary environment where various embodiments of the present invention may be practiced and realized.

While the specification concludes with the claims defining the features of the invention that are regarded as novel, it is believed that the invention will be better understood from a consideration of the following description in conjunction with the drawings/figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or as more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

FIG. 1A depicts an exemplary environment 100 where various embodiments of the present invention may be practiced and realized. Examples of the environment 100 may include a warehouse, a manufacturing facility, a parking garage, a parking lot, a street, a prison, indoor pools, a gymnasium, a dormitory, a stadium, an arena, a retail house, a bridge, a tunnel, clean rooms, and some other types of similar environments and facilities.

Referring to FIG. 1A, the environment 100 may include lighting systems 102. The lighting systems 102 may include various lighting fixtures. A lighting fixture is a device for providing artificial light or illumination. A single lighting fixture unit may include a light source(s), power source, a reflector, a lens, outer shell (i.e., an enclosure) and other elements. In embodiments, various sub-components may be combined to create a family of lighting fixtures 102. The lighting systems 102 may further include various modules for managing power, light, and thermal requirements of the lighting systems 102 within the environment 100. The lighting systems 102 may also include communication systems such that data can be sent to the lighting systems 102 to control them and data can be sent from the lighting system 102 to provide information to a central system for management of the artificial lighting in the environment 100.

FIG. 1A illustrates three lighting systems, 102a, 102b, and 102c. However, those skilled in the art would appreciate that in an alternate embodiment, the lighting system may include one or more lighting systems such as 102d and 102e (not shown in FIG. 1A). Lighting system 102a utilizes Light Emitting Diodes (LEDs) and/or Organic Light Emitting Diodes (OLED) 104 as the primary light source. Similarly, lighting system 102b utilizes non-LED based lights as the primary light source. Examples of non-LED based lighting fixture utilizing non-LED light sources 108 may include any conventional type of lighting fixtures such as fuel lamp, high intensity discharge (HID) lamp, arc lamp, incandescent lamp, halogen based lamp, gas-discharge based lamp, fluorescent, compact fluorescent lamp, cathode based lamp, fiber optics based lamp, induction, microwave lamp, RF lamp, electrode less discharge lamp, nuclear power based lamp, and the like. Lighting system 102c may be a combination of lighting system 102a and 102b and may include lighting fixtures that may use both LED based light sources and non-LED light sources.

Each of the lighting fixtures may include an optical component(s) such as a lens, primary optic, secondary optic, or the like. The lens may be an etched, Fresnel, Piano-convex, condenser, objective, and some other type of lens to be used in the lighting systems to alter or shape the beam of light emitted from the lighting system. In other embodiments, the lens may be a flat, clear plate that is meant more as a way of keeping the inside of the lighting system clean. One skilled in the art would appreciate that there are many lens types that could be used in such a lighting system. In an aspect of the present invention, a "secondary" or "tertiary" optic assembly, which may be user-replaceable, may be disclosed. For example, in an LED based lighting fixture 104, the optic lens may be replaced by the user without the use of a tool. Further, some means for re-establishing the environmental seal around this fixture optic assembly may also be provided. Allowing the end-user (e.g. an electrical contractor) to swap optics on-site easily may provide maximum system design flexibility, while limiting the number of design variations required to be held in stock.

In embodiments, LED based lighting fixture 104 with variable luminous efficacy may also be provided. The luminous efficacy of an LED (and, by extension, of an LED based lighting system 102a) may vary across its operating current. For many LED devices, the peak operating efficacy may occur at a level well below the rated maximum current of the device. In an aspect of the present invention, an LED based lighting fixture 104 with at least two operating states: a lower-lumen, higher efficiency state; and a higher-lumen, lower efficiency state, and a means for the user to select which operating state is active may be provided. There may be more than two discrete operating states. In an embodiment, there may be a continuum of operating states between "high-efficacy, low-lumen" at one extreme and "low-efficacy, high-lumen" at the other extreme. A user may select the operating state in a variety of ways such as manual control attached to (or integrated) into the fixture, manual control mounted as a light switch, networked (wired) control, wireless control, and some other ways. The choice of operating state may be implemented within the fixture "ballast" in a variety of ways. For "manual" control, the ballast may contain a momentary or ON/OFF switch input. When the input is closed, the ballast may drive the LED devices to one operating state. Similarly, when the input is open, the ballast may drive the devices to the other operating states. For "manual" control, the ballast may contain a proportional voltage or current input, which may be connected to a device such as a potentiometer for user selection of state. For networked (wired) or wireless control, the ballast may contain a microprocessor or intelligent control device combined with a serial network. In an embodiment, for networked (e.g., wired or wireless) control, the ballast may contain a microprocessor or intelligent control device combined with a parallel network.

In another embodiment, for networked (e.g., wired or wireless) control, the ballast may contain a microprocessor or intelligent control device combined with a set of one or more digital input lines that may be mapped to various operating states. Further, for networked control, the ballast may also contain a microprocessor or intelligent control device combined with an analog input that may be mapped to the various operating states.

In an aspect of the present invention, an LED multi-head lighting system may be disclosed. In retrofit applications, the amount of re-wiring that must occur (resulting in added expense) may be limited. Conventionally, the high-voltage wiring may pose a problem due to electrical code constraints. For example, when the wiring must be run inside conduit or protected in some way, it poses a problem because high voltage wiring may be typically difficult to install.

The lighting systems 102 may include management modules such as a power management module 112 (indicated respectively as power management modules 112A and 112B; collectively, power management modules 112), a thermal management module (indicated respectively as thermal management modules 114A and 114B; collectively, thermal management modules 114), and a light management module (indicated respectively as light management modules 118A and 118B; collectively, light management modules 118). The power management module 112 may be a module that regulates the power delivered to the lighting system 102, including power delivered to the light source(s) within the lighting system 102. The thermal management module 114 may be a module that regulates the thermal aspects of the lighting system 102. For example, the thermal management module 114 may include active and passive cooling components. The light management module 118 may regulate aspects of the light source(s) in the lighting systems 102. For example, the lighting management module 118 may regulate the intensity, color temperature, beam angle, lens control, or other aspects of the light sources or light production.

The lighting systems 102 may also include operational modules such as an electrical module (indicated respectively as electrical modules 174A, 174B, and 174C; collectively, electrical modules 174), mechanical module (indicated respectively as mechanical modules 178A, 178B, and 178C; collectively, mechanical modules 178), and some other types of modules. The electrical module 174 may be associated with electrical packaging and accessories such as electrical connectors, circuits, conductors, wirings, routings, switches, junctions, electrical panels, and some other types of electrical accessories for the lighting systems 102. The electrical module 174 may also be associated with the management of the electrical components and accessories in the lighting systems 102.

In an aspect of the present invention, the electrical module 174 may be a modular power connector system that may support many types of existing power wiring and connector types. For example, the LED based lighting fixture 104 may contain a "wiring compartment" such as an electrical module 174 into which cabling carrying power may be connected. One face of this module may carry a bulkhead-mounted connector socket, and the face may be removable and replaceable to provide a large range of potential connector sockets to match existing conditions.

The mechanical module 178 may be associated with packaging and support frameworks such as chassis, housings, outlets, mechanicals connectors, plug connections, and some other type of mechanical elements for the lighting systems 102. In other embodiments, the mechanical module 178 may also be associated with the management of the mechanical components and accessories for lighting systems 102. Both the mechanical and electrical modules 178 and 174 may be modular in nature to facilitate interconnectivity between parts within and between each such module.

The mechanical module may include a lens cleaning system or a system to help in keeping the lens clean. For example, the lighting system 102, including the lens and/or other components such as the outer casing or inner parts, may be electrostatically charged to repulse dust from the lens and any exposed optical surfaces or other surfaces. Other surfaces may be charged such that the appearance of the fixture remains clean, while the lens may be charged to help in keeping light levels high and the lumen maintenance of the fixture over a period is improved. In another embodiment, a lighting system may include a glass lens or plastic lens and the surface of the lens may be coated with Titanium Dioxide. The Titanium Dioxide would be exposed to Ultra Violet (UV) rays in order to decompose the dust and make the surface photo-catalytic. The UV may be from external sources, including daylight In embodiments, one or more UV sources (e.g., a UV LED, an HID lamp) may be placed within the lighting system 102. When the objective is to keep the outer surface of the lens clean, the glass or plastic lens may be transparent in the desired spectrum of the UV such that the UV passes from the UV light source in the fixture to the dust on the outer surface of the glass. In embodiments, the whole lighting system or the entire lens assembly may be sprayed with the Titanium Dioxide. In yet other embodiments, a nano-texturing process is applied to the lens to prevent dust from sticking to it.

In yet other embodiments, the lens, or other parts of the lighting fixture 102, may be ultrasonically vibrated to prevent dust build up.

The power management module 112 controls and manages the power utilized by the lighting fixtures 102. This may include management of the voltage and current associated with the lighting fixtures 102. In embodiments, the power management module 112 may manage power by controlling voltage using a triode, a voltage regulator, and some other types of voltage control device. In another embodiment, the power management module 112 may control the current using a resistor and some other types of current controlling devices.

In embodiments, the power management module 112 may also manage the total illumination, operating voltage, power supply ratings, and the forward current requirements in the fixtures. A lumen is a measure of perceived power of light. Conventionally, it is known that the intensity of light emitted by the lighting fixtures tends to fall over time. This effect is termed as 'lumen maintenance.' In some instances, the power management module may also be concerned with 'lumen maintenance' of the lighting fixtures by regulating power to the lighting fixture 102 (e.g. in response to sensor feedback in the environment).

In embodiments, power management devices such as pumps, drivers, regulators, controllers, supervisors, and references (a voltage reference) may be used for controlling power in the lighting systems 102. Thereby, the power management module 112 may also be involved in management of these power devices. In embodiments, the power management module 112 powers one or more sensors (indicated respectively as sensors 120A, 120B, 120C, 120D, 120E, and 120F; collectively, sensor 120).

Conventional lighting systems as well as LED based lighting systems may reflect decrease in performance due to generation of ambient heat. The thermal management module 114 in the lighting systems 102 may manage and control the thermal properties of the lighting fixtures. The thermal management module 114 may provide hardware such as heat sinks, cooling mechanisms (fans, jet air, and liquids), heat pipes, thermo-siphons, and adhesive based materials for dissipation of heat.

In embodiments, the heat sink may be provided as an outside enclosure. The outside enclosure in this case, may act both a protective covering as well as heat sink. In embodiments, the heat sink may be made of aluminum or some other metal known in the art.

For example, in a non-LED based lighting fixture 108 such as a 1000-watt incandescent lamp, heat may be generated due to high intensity beam of infrared rays. In such an instant, the sensor 120 associated with the thermal management module 114 may instantly sense the increase in temperature level and may initiate or trigger a heat dissipation mechanism such as opening of ventilation holes in the lamp housing or initiating fans or other cooling mechanisms in the enclosure.

The power management unit may be associated with powering the LED based lighting fixture 104, such as LED light bars. Usability of LED based lighting fixtures 104 may also be determined by a maximum ambient temperature. This is the maximum temperature at which the LEDs may be used, and this may be dependent on a PN junction temperature ($T_j$) and thereby on a maximum PN junction temperature ($T_j$ max). In an embodiment, the thermal management module may determine temperature associated with the LED light bars. The thermal management module 114 may measure and control the maximum temperature. For example, if the maximum temperature for the LED based lighting fixture 104 is more than a predetermined value, the thermal management module 114 may lower the intensity of the lighting fixtures and consequently reduce the power consumption. In embodiments, the thermal management module 114 may continuously measure the temperature associated with the LED based lighting fixture 104. Further, the temperature of the LED light bars may be assessed to identify a lighting power management parameter that may be adjusted to facilitate temperature protection of the LED light bars.

The light management module 118 may regulate power and control signals, specifically for the LED based lighting fixtures 104 in FIG. 1(*a*). In embodiments, the light management module 118 may manage and control various beam angles of lighting fixtures. A beam angle is the area where the lighting fixture illuminates the brightest. A family of lighting fixtures may have different beam angles such as potentially asymmetric beam angles. FIG. 1A illustrates various beam angle lines 130 (narrow and far) for each of the lighting fixtures: 104, 108, and 110. The light management module may receive feedback from an internal module, such as the power management module 112 or the thermal management module 114, or an external module, such as the management systems 134, and respond to the feedback by altering the lighting produced by the light source in the lighting system 102.

Conventionally, in retrofit lighting applications, a huge variation in fixture mounting height, spacing, beam pattern and angles, and light levels may make a one-size-fits-all approach to a fixture design impossible In an aspect of the present invention, a modular design of a LED based lighting fixture 104 including light strips of various beam angles may be provided. This design may facilitate in emulating performance of a large number of fixtures, starting from a relatively small number of fixture building blocks.

In an embodiment, the modular design of an LED based lighting fixture 104 may include various composite beam patterns. These patterns may be created by combining smaller sub-fixtures. This may eventually facilitate in achieving required minimum foot-candle levels using lower total fixture lumens.

In an aspect of the present invention, the modular LED based lighting fixture 104 may also include a frame and a plurality of light strips mounted onto this frame. The frame may be modular in design. For example, the frame may be designed such that it may be rotated. In another example, the frame may be provided with additional mounting features such as a plug-and-play feature. The light strips as mentioned herein may also be referred to as LED light bars, light bars, and LED based lighting fixture. These terms are generally meant to be interchangeable herein except as would be understood based on context.

In an aspect of the present invention, the modular LED based lighting fixture 104 may include light strips that may be individually rotated within the frame for obtaining a specific direction of light from each strip. This facilitates in providing maximum flexibility to the resulting foot-candle pattern. For example, FIGS. 17A and 17B depict a fixture 1704 with at least one rotatable light bar 1702. At least one light bar 1702 can be individually rotated to change the fixture's beam pattern. The LED light bars may be arranged to rotate along at least one rotational axis independent of the orientation of the housing. Rotation of the light bar may be used to change the aggregate beam angle of light emitted from the lighting fixture when the angle of rotation is substantially changed. Throughout this specification, at least one of the plurality of LED light bars of the LED lighting fixture 104 may optionally include a rotational drive constructed and arranged to rotate the at least one LED light bar along at least one rotational axis independent of the orientation of the housing, or the LED light bar may be freely rotatable.

In another aspect of the present invention, the modular design may include a pre-set rotation angle that may fix the position of the light strips based on the type of application. For example, lighting fixtures for an "architectural" lamp may require setting of the light strips at a specific angle.

The light strips may be linear, rotund, or in some other shape. Upon illumination, each of the mounted family of light strips may create a region of illumination that may be either overlapping or non-overlapping. Further, the family of light strips may have different beam angles (potentially asymmetric) and levels of brightness. Some strips may be outdoor-rated, or have varying IP ratings. Electrically, the light strips may have built-in power conversion so that AC may be wired strip-to-strip. In other embodiments, the light strips may have a central power conversion module mounted to the frame, with distribution of power to each strip. Furthermore, each of the family of light strips may be associated with a sensor. The types of sensors that may be employed and the co-ordination of each lighting fixtures with these sensors is explained in detail below.

In an aspect of the present invention, modular lighting systems 102 may be provided wherein only a portion of the lighting fixtures may be powered to decrease the overall power consumption of the system. To accomplish this, the lighting fixtures may be designed to control the beam angle of the light emitted from them. For example, in a warehouse facility, the lighting system may be designed to power a narrow beam strip for traffic guidance or a side directed beam for shelf locations. The modular lighting systems 102 described above may provide ability to individually turn individual light strips 'ON' and 'OFF' inside the fixture in order to provide foot-candles precisely where and when needed In a simple incarnation, this may be represented by a modular fixture such as an LED based lighting fixture 104, with two light strips, say "A" and "B" (not shown in the figure), and the sensor 120 that may determine whether activity is occurring in the areas illuminated by "A" and "B". This sensor 120, when combined with a simple control system, may turn each individual light strip 'ON' only when needed, reducing the overall power consumption of the system. In another embodiment, each LED in the lighting fixtures may be individually controlled, giving maximal resolution of control.

Each lighting system 102 may also include a sensor 120, as shown in FIG. 1A, for managing and controlling power and light requirements and controlling the thermal properties of the lighting fixtures. The information or data produced by the sensors may be fed directly back into the lighting management module 118 such that the information can be acted on locally. For example, if the sensor is an ambient light sensor and it detects that the light has fallen to a certain level, an indication of the level may be fed back into the lighting management module 118 for processing. The lighting management module may calculate that the light level is not acceptable and as a result cause a change in the light emitted from the lighting system 102 (e.g. changing intensity, color temperature, beam angle, etc.). In other embodiments, the information from the sensor may be fed back to the management systems 134 through a data communication network for central processing. Then the management systems 134 (e.g. the lighting management module 148) may further regulate the lighting systems 102 based on the sensor feedback by sending instructions back over the data communication network.

In an embodiment, the sensor 120 may be a remote sensor, such as radiometer, photometer, spectrometer, light sensor, motion sensor, etc. In such a scenario, the remote sensor 120 may be placed at a location distant from the lighting systems 102 or may be associated with the lighting systems 102, or the management systems 134, in a remote or wireless way. The sensor 120 may then utilize radiations to sense objects or lighting conditions in the environment 100 and in turn control the lighting fixtures.

In an embodiment, the lighting fixtures may directly coordinate and interface with sensors for local control. The lighting fixtures may be providing information to the sensors for local control or vice versa, as shown in FIG. 1A. For example, in lighting system 102a, the sensor 120 may detect a sudden increase in ambient temperature inside the LED based lighting fixture 104. Upon detection, the sensor 120 may send a signal or alert to the thermal management module 114 in the lighting systems 102, to dissipate the heat from the enclosure of the LED based lighting fixture 104. Subsequently, the lighting power management parameter inside the lighting system 102a may be effectively managed and may be kept under check for protecting the LED based lighting fixture 104.

In another embodiment, the sensor 120 may send sensed or detected information to a central intelligence control that may be responsible for the overall lighting management of the environment 100. The central control may utilize information from sensor 120 and various other modules and sub-modules such as those for demand response, building management, power storage management, and some other types of modules to regulate and control the functioning of the lighting systems 102.

Examples of sensor 120 may include a motion sensor, occupancy sensor (infrared (JR), passive infrared (PIR), ultrasonic, etc.), thermal sensor, an electromagnetic sensor, a mechanical sensor, a chemical sensor, an optical radiation sensor, an ionizing radiation sensor, an acoustic sensor, a biological sensor, a geodetic sensor, electrical current, voltage, power sensor, ambient light sensor, force sensor (strain gauge), humidity sensor, air quality sensor (CO, pollutants, etc.), payments (EZPass, etc.), video (security camera, etc.), audio (microphone, etc.), RFID reader, limit switches, hall-effect sensors, and the like. A thermal sensor may be a temperature sensor such as thermometers, thermocouples, thermistors, thermostats, and heat sensors such as bolometer, calorimeter, or a heat flux sensor.

Examples of electromagnetic sensors may include electrical resistance sensors, current sensors, voltage sensors, power sensors, magnetic sensors, metal detectors, or RADAR. Similarly, mechanical sensors may be pressure sensors; flow sensors; humidity, density, and viscosity sensors; position sensors; acceleration sensors, and the like. Chemical sensors may include odor sensors, oxygen or carbon monoxide detectors, ion selective or redox electrodes, and some other types of chemical sensors.

Examples of light sensors may include photo-detectors, infrared sensors, proximity sensors, scanning laser, fiber optic sensors, and some other type of sensors. Examples of acoustic sensors may include SONAR, Ultrasound, and some other types of acoustic sensors.

In embodiments, the sensor 120 may be associated with the objects in the environment 100. The objects may be moving or stationary in nature. Moving objects 122 may be people, vehicles, and the like. Similarly, stationary objects 124 may be racks, a dead-end wall, containers, stairs, a light pole, and some other types of stationary objects. Sensors may be installed on the moving objects 122 and/or stationary objects 124 for managing lighting in the environment 100.

For example, a proximity sensor may be installed over a freight kept in the center of a poorly lit warehouse. In case a person or object (such as a vehicle) approaches this freight, the proximity sensor may detect the presence of this person or the object and may send this information to the central control system that can subsequently initiate an action to deflect collision. An appropriate action may be, lighting the path of the person/object or lighting up the freight area or raising an alarm and some other type of action that may facilitate in preventing the collision. In other embodiments, sensor 120 may also be installed on other objects of the environment 100 such as walls, floorings, ceilings, corners, parking ticket booths, and the like. In an aspect of the present invention, sensors on the people or vehicles of a warehouse to track their presence and then intelligently manage the lighting in the warehouse in accordance therewith may be provided.

Most intelligent lighting systems may rely on relatively low-tech occupancy or ambient light sensors. These are not always a perfect solution as environmental conditions (such as high ceilings) can make their operation ineffective. As an alternative, passive "tags" may be attached to people and vehicles in a facility, enabling the lighting system to sense their position. Based on the sensed positions, higher-resolution position maps may be built for internal purposes.

In an embodiment, a passive tag/transceiver such as a passive RF ID or an active tag such as an EZPass may be attached to people and/or vehicles in a facility. Further, compatible transceiver sensors may be attached to the lighting network. The transceiver location information may be used to build an internal representation of the locations of each person and vehicle at each point in time, and set light levels accordingly.

In an embodiment with sufficient temporal and spatial resolution, the control system may track velocity and/or acceleration, if useful for each person and vehicle, and use this information to warn of potential collisions.

In another embodiment, the higher-resolution usage data may be exported to other systems. Further, this higher-resolution information, when used in a parking garage application, may facilitate the type of intelligent parking system described above.

In another embodiment, the sensors may also be installed on people or vehicles outside the warehouse. For example, a truck coming from St Louis to Chicago to pick up an order may have a sensor installed on it. When the truck is 5 miles (8.047 kilometers) away from Chicago, the forklift may be automatically coordinated through the computer to ready the order, and the truck may be assigned a spot based on the previously assigned unloading area in the warehouse. This may result in a better system for just-in-time (JIT) inventory management. Lighting systems disclosed throughout the application herein may be used as guidance in such a management system.

The sensors 120 in the environment 100 may derive power supply scavenged from luminaires in the system. Alternately, the power may be derived through a bus from a management system or a gateway. In other cases, power source may be a separate wall wart (e.g., power brick, plug pack, plug-in adapter, adapter block, domestic mains adapter, power adapter, or AC adapter.) Still further, the power source may be an integrated power supply.

Similar to the lighting systems and management systems, the sensors 120 may be in a network. The network may be either wired or wireless. The wired network may include powerline carrier (Echelon, X10, etc.), Ethernet/IP, Serial (RS-232, RS-485), lighting specific (DMX, DALI, etc.), and proprietary (BacNET, LON, etc.)

Similarly, the wireless network may be a mesh network (Zigbee, Zwave, Ember, Millennial, etc.) or open standard (802.11 etc.)

Referring again to FIG. 1A, the environment 100 may also include a day-lighting structure 132. Day-lighting is a practice of placing structures and surfaces in a region so that effective internal illumination may be provided by natural light during the day to facilitate optimization of power and energy. The day-lighting structure 132 may be provided at the top of the environment 100 such as the top of a warehouse building or maintenance facility, through the window on the side of a structure, or openings in a structure like the sides of a parking garage. Examples of day-lighting structure 132 may include windows, light reflectors, light shelves, skylights, light tubes, clerestory windows, saw-tooth roof, and some other types of day-lighting structures In another aspect of the present invention, the day-lighting structure may be an absence of a wall, portion of a roof, and some other type of openings and vents in the environment 100.

Through sensors 120 in the environment 100, the effectiveness of day-lighting may be observed and the artificial lighting in the environment 100 may be altered in response thereto. As indicated elsewhere herein, the sensors 120 may provide feedback directly to a lighting system 102 and/or the sensor feedback may be sent to the management systems 134 for processing. In either situation, the sensor feedback may be used to regulate the lighting systems 102 in the environment 100 in response to day-lighting. For example, the day-lighting may be observed through one or more sensors 120 in the environment 100 and the sensors 120 may then send data to the lighting management module 148 for processing. The lighting management module 148 may then process the information to check for compliance with pre-established acceptable lighting conditions and regulate the lighting system(s) 102 in accordance with the evaluation. In embodiments, as will be described in detail below, available energy and energy pricing information may also be provided to the lighting management module 148 and these factors may be incorporated into the overall equation for altering the lighting systems 102 in response to observed day-lighting conditions.

In embodiments, the lighting systems 102 may also include a power source for sensor 120 or the lighting fixtures. In embodiments, the power source may be a conventional power source such as Alternating Current (AC) or Direct Current (DC) (power from the grid), batteries, generators, and some other types of conventional power sources.

In embodiments, the power source may be an alternate energy source (AES) 128. Information regarding the external power available in the form of either alternative energy through AES 128 or energy obtained from UES 180 and relative cost of grid based and externally provided power may be utilized by the management systems to intelligently utilize power. The management systems 134 may control AES 128 to regulate the lighting system 102. For example, AES 128 may be a solar power. The solar power may be derived from solar photovoltaic panels, solar thermal systems, and/or solar concentrator systems. This power may be used to charge a plurality of batteries in the energy storage facility 184. The stored energy may be managed by the demand response module 144, which may utilize the stored energy as an alternative to the conventional power. In one example, the demand response module 144 may determine that additional power may be required for maintaining lighting, and in response, it may provide only partial electric supply from AES 128. In another example, full operational power to the lighting system 102 may be provided by the demand response module 144 from AES 128. In yet another example, the lighting prediction and management module 152 may forecast the need for additional power at mid-night, say 1:00 AM. This information may in turn be provided to the demand response module 144 which may query demand response rules database 154 and/or third party rules database 158 to determine the compliance regulations. If the compliance to the rules is established by the respective databases, the demand response module 144 may switch 'ON' AES 128 for additional power. For illustrative purposes, the examples of AES 128 may include solar, wind, hydroelectric, fuel cells, Reformed Methanol Fuel Cell (RMFC), Ocean Thermal Energy Conversion (OTEC), kinetic energy, piezoelectric, pyro-electric, thermoelectric, electrostatic, capacitive, tidal, salinity gradient, and some other types of alternate energy source In an embodiment, AES 128 may be a generator such as an electric-generator or an engine-generator.

Similar to AES 128, the power source providing energy to the lighting systems may also or alternatively be a utility energy source (UES) 180. Example of a UES 180 may be a central station such as a power station from where external energy may be delivered to the lighting systems 102 in the environment 100.

In another embodiment, energy from AES 128 and UES 180 may be routed to an energy storage facility 184. Examples of the energy storage facility 184 may be batteries, fuel cells, flywheels, ultra-capacitors, capacitors, mechanical energy storage devices, superconducting magnetic energy storage, compressed air energy storage, hydraulic accumulator, cryogenic liquid air, thermal stores, steam accumulator, and some other types of energy storage facilities.

In an aspect of the present invention, energy or power harvesting techniques may be utilized to capture and store alternate energy. Energy harvesting information from AES 128 may be directed to management systems 134. The management systems 134 may further utilize this information for managing power demands and energy requirements within the environment 100. In other embodiments, the energy harvesting information may be sensed by sensor 120. The sensor 120 may read this information and direct it to the central control such as management systems 134 or the local control within the lighting systems 102; thereby the lights may be managed and controlled locally within the environment 100. The utilization and control of the alternate energy, utility energy, and harvested energy and their management by the management systems 134 has been explained in detail below.

Figure 1B:
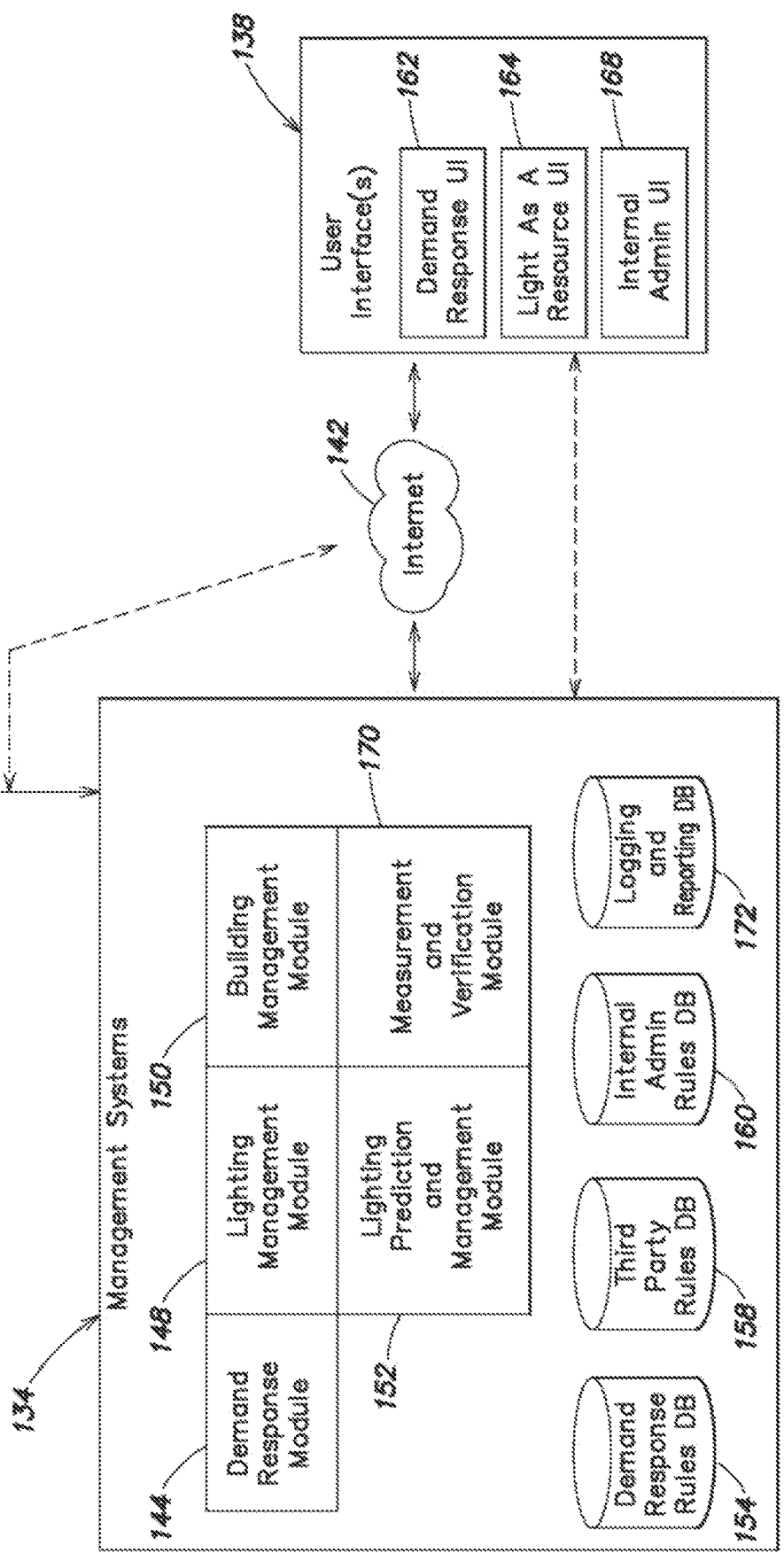

AES 128 and UES 180 may provide or feed information to the central management systems such as management systems 134, as depicted in FIG. 1B, regarding the energy that may be generated in each of the energy sources or stored in the energy storage facility. The information feed from AES 128 may be further utilized by the management systems 134 to manage and control the lighting systems 102. Also, AES 128 may provide information to the management systems 134, regarding the amount of power stored and/or that may be available in the energy storage facility 184. The information feed from AES 128 may be directed to a sub-module of the management systems 134 such as an energy demand response module 144, regarding the amount of power that may be collected or may be available in the storage battery. For example, when an increase in energy demand in the environment 100 is reported by sensors 120 to the energy demand response module 144. The demand response module 144 may instantly act upon this information and combine it with the information regarding the alternate energy available in the storage facility. Subsequently, it may switch over the power sources in the lighting systems 102 from conventional (e.g. UES) to alternate power sources. This may lead to induction of an efficacious and responsive system for managing the increased power demand in the environment 100.

The information feed from AES 128, UES 180, and energy storage facility 184 may be utilized by the various sub-modules of the management systems 134 for initiating various control and management actions. For example, there may be an internal administration rule that energy utilization during any time of the day should not cross a mark of 4 KW/hr. In case the energy utilization is more than the marked value, the demand response module 144 may initiate an alarm or warning signal for the administrator to switch over power supply from the UES 180 sources to AES 128. Similar to the internal administrator, third parties may also utilize information feed from AES 128, UES 180, and stored and harvested energy in energy storage facility 184. For example, during night the storage batteries will be fully charged. Therefore, the third party may switch the power sources from conventional to AES 128 to optimize energy usage. It may be noted that switching of the power sources may also be based on certain third party rules set forth in the mutual agreement between the third party and the administration and stored in third party rules database 158. In some cases, the government (or energy from UES 180) may also provide energy at subsidized rates say at 40 percent lower than the normal rates. This energy may also be stored in energy storage facility 184 or various storage devices such as batteries, flywheel, ultra-capacitors and the like and may be subsequently utilized when peak hour energy demand triggers response from the demand response module 144. In addition to the above, the demand response module 144 may utilize information regarding the rise in cost of energy procured outside the building through web, or other sources and combine this information with the energy information from AES 128, UES 180, and energy storage facility 184 to determine the most effective energy source (between the conventional or alternate) for powering the lighting systems 102 in the environment 100. For example, in case the energy demands are high and external operating costs rise for the lighting systems 102, the demand response rules database 154 may direct the lighting management module 148 to check the alternate energy storage. Alternately, the demand response rules database 154 may direct the lighting management module 148 to turn the lights 'OFF' or fade away (dim the lights).

Similar to the demand response module 144, lighting and prediction and management module 152 in the management systems 134 may utilize weather forecast information, analyze the energy information from AES 128, UES 180 and energy storage facility 184; and estimate the amount of energy that may be generated over a period.

In an embodiment, energy from the AES 128 and UES 180 may be delivered to the lighting fixtures in the environment 100 via a control panel 182. The control panel 182 may be responsible for managing the flow of energy between the energy sources and the lighting fixtures. In an aspect of the present invention, the control panel 182 may be managed and controlled by the management systems 134. For example, the management systems 134 may command switching 'ON/OFF' for the control panel 182. The description and/or functioning of various sub-modules of management systems 134 and other exemplary elements of the present invention have been explained in conjunction with FIG. 1B below.

FIG. 1B depicts other exemplary elements of the present invention. These elements may include central control systems or management systems 134 (as depicted in the figure), user interface 138, and energy demand information module 140. In an aspect of the present invention, the elements of the present invention may be connected by a controlling network 142 that may be a wired network such as an Ethernet. In another aspect of the present invention, the elements of the present invention may be connected by the controlling network 142 that may be a wireless network such as Wireless Local Area Network (WLAN), Wireless Personal Area Network (WPAN), Wireless Metropolitan Area Network (WMAN), mobile devices network, and some other type of wireless networks In embodiments, the elements of the network 142 may be connected in various topologies such as bus, star, tree, linear, ring, mesh, hyper, and some other types of network topologies. In an aspect of the present invention, the controlling network 142 may be a mesh network.

In an aspect of the present invention, combining LED based lighting fixtures 104 with intelligent wireless sensing and control may enable new applications. In an embodiment, the applications may be related to high bay fixtures used in the warehouse. In accordance with the above ideas, a lighting system may be designed to integrate LED illumination modules with intelligent sensing of various types and a wireless control network to transmit sensing and command data between the fixtures, sensors, control points (such as switches), and monitoring points (such as a facility manager's desktop computer) specific to warehousing applications.

Examples of applications may include fork truck traffic guidance, intelligent guidance based on projection of pathway to be used, integration with other warehouse management systems, zone control, zone control based on sensor input, zone control based on warehouse management systems input, and some other types of applications.

In accordance with another embodiment for LED based lighting fixtures 104 with intelligent wireless sensing and control, the lighting fixtures may also be used to provide a warning signal regarding potentially hazardous conditions, so that persons or vehicles in that area may stay clear. For example, lighting fixtures located at the end of a narrow aisle (with poor sight lines down the aisle) may blink to indicate the presence of a fork truck in that aisle.

In another embodiment, the lighting fixtures may be used to guide the fork truck operators to their destination inside a warehouse. For example, each lighting fixture may contain an integrated fork truck sensor 120 and the wireless network to report the truck's position back to the management systems 134. The management systems 134 may take input from an existing Warehouse Management systems (WMS) to specify the destination of each truck. This destination information may be used by the management systems 134 to calculate optimal routes through the warehouse for each truck and to determine the lighting fixtures that line each route. The management systems 134 may then issue commands back to the lighting fixtures along each route to cause the lighting fixtures to indicate the proper route to the fork truck driver. This may be indicated, for example, by blinking of the main light or attaching a low-power indicator light (for instance, a small green LED light) to the main fixture, and blinking of the indicator light.

In yet other embodiment, "smart fork truck" control systems may be integrated into the lighting fixtures for automated control.

In another embodiment, the management systems 134 may allow the operator to define "zones" of lighting such as "stacks" zone, "active work" zone, "loading" zone, and so forth. Each zone then gets a unique lighting policy to minimize overall energy consumption.

Similar to the warehouse, in an embodiment, combining LED based lighting fixtures 104 with intelligent wireless sensing and control may enable new applications for a manufacturing facility In accordance with this idea, a lighting system may be designed to integrate LED illumination modules with intelligent sensing and the wireless control network to transmit sensing and command data between the lighting fixtures, sensors (sensor 120), control points (such as switches), and monitoring points (such as a facility manager's desktop computer) specific to manufacturing applications. This may be explained in conjunction with the various embodiments that follow.

In an embodiment, a toxic vapor sensor 120 may be integrated into each lighting fixture. Further, the wireless network may be used to relay any alarming events back to the management systems 134 and blink the light (or turn on a smaller indicator light) if the sensor 120 is triggered.

In another embodiment, RFID sensors in each lighting fixture combine with the wireless data collection network to provide real-time material tracking inside a manufacturing facility.

In other embodiments, a "Zone" lighting system with the wireless network and equipped with sensor 120 specific to the manufacturing facility may be provided.

In another aspect of the present invention, the wireless control of parking garage lighting fixtures for the applications related to intelligent lighting management of the parking garage may be provided. Examples of such applications include parking spot identification, parking spot guidance, safety illumination, daylight harvesting, and ingress and egress of pedestrians tracked to manage light level while always maintaining safety level. Combining LED based lighting fixtures 104 with intelligent wireless sensing and control may enable new applications in the parking garage market.

The present invention relates to a lighting system that may integrate LED based lighting systems 104 with intelligent sensing of various types and a wireless control network to transmit sensing and command data between the fixtures, sensors, control points (such as switches), and monitoring points (such as a facility manager's desktop computer) specific to parking garage applications.

In an embodiment, an ambient light sensor 120 may be integrated into each parking garage fixture, thereby, reducing the light output of each fixture based on the amount of ambient daylight illumination available.

In another embodiment, an occupancy or motion sensor 120 may be integrated into each parking garage fixture. For example, when the surveyed region is empty, the light levels may be reduced to minimum light levels approved by Illuminating Engineering Society (IES), and when a person or vehicle is present, the light levels may be increased to maximum in order to improve perceived safety.

In other embodiments, lights may be linked together in the wireless network so that regions (e.g., an entire floor) dim and brighten together to eliminate dark spots. Further, the lights may be linked together wirelessly, and occupancy data may be transmitted to a remote location (or log to local database) for safety auditing purposes.

In an embodiment, the lights may be varied linearly (and not just high or low).

In other embodiments, a proximity or distance sensor 120 may be used instead of occupancy sensor 120, so that illumination may be brightest when a person or vehicle is directly below the fixture.

In yet other embodiments, a heat sensor may sense body heat and indicate the path via blinking lights or illuminating indicator attached to the main light in order to increase safety.

In an embodiment, cell phone identification of parking spot location may be also integrated with light management of the parking garage. Sensor 120 capable of identifying the unique signature of a cell phone may be integrated into the lighting fixtures. When a person parks, his/her phone may be registered against the database of parking spaces. Upon returning to the parking, the lighting system may guide the person back to the parked space.

In another aspect, the parking space may be determined by RFID embedded in a parking ticket. In yet other aspect, the parking space may be determined by tracking EZpass-type transceiver.

In an embodiment, a carbon monoxide sensor 120 may be integrated into the lighting systems 102 with wireless network linking sensor 120 to a ventilation system.

In an embodiment, users may be allowed to reserve parking spots in advance via cell phone, web, and other such reserving or booking means. Therefore, users with reserved parking spots may be guided to the assigned spot with the help of the lighting systems 102. In addition, the assigned spots may be marked with red or green colored lighting to indicate to other users that the parking space is already reserved.

In another embodiment, the nearest available free spots may be shown on GPS before entering the garage through lighting systems 102 and garage management systems 134 (Garage to GPS) communication. This information may let a person know the first available spot on the sixth floor or may disclose the number of spots that may still be available. In case of full occupancy, GPS may also route the person to different garages in the vicinity.

In an aspect of the present invention, a sensor input for identifying and tracking parking spaces and communicating the same to cell phones (e.g., based on flight schedules, based on a registered cell phone viz., registered at the Burlington mall garage) may be provided. Conventionally, the deployed intelligent parking garage systems may be expensive to retrofit into existing facilities. For example, $400-500 per space of parking may be required to park in a mall. In such a scenario, LED based lighting fixtures 104 (with integral wireless control and sensing) may be used as a 'Trojan horse' to facilitate lower-cost system implementation in retrofit cases.

In an embodiment, parking space information may be sent to a user's cell phone (via SMS/email/etc.) to help the user return to his/her vehicle.

In another embodiment, the cell phone may be automatically identified via Bluetooth, or other wireless means, when the ticket is pulled from the machine upon entry into the parking area.

Referring to FIG. 1B again, the management systems 134 may be responsible for managing the overall lighting system in the environment 100 in co-ordination with various local management modules such as power management module 112, thermal management module 114, light management module 118, and some other types of modules.

In embodiments, the management systems 134 may include various sub-modules such as a demand response module 144, lighting management module 148, building management module 150, lighting prediction and management module 152, and measurement and verification module 170.

The demand response module 144 may manage the energy demand of the lighting systems 102 in the environment 100. In an embodiment, this module may also coordinate with the lighting management module 148 to manage the lighting systems 102. The demand response module 144 may utilize information from various sources to manage the energy demand of the lighting systems 102. The information may include power utility information, cost of energy, information on buying power on the hour, and some other types of information. The information may also include the rise in the cost of energy procured outside the building, amount of energy generation over a period (based on analysis of weather forecast by the lighting prediction and management module 152). In embodiments, the demand information may also be associated with billing information that may be generated via a metering unit for measuring the consumption of power. In effect, the demand response module 144 in co-ordination with various modules and sub-modules of the central control systems or management systems 134 may be managing the 'demand response' of the lighting systems 102 in the environment 100.

In an aspect of the invention, the demand response management of lighting involving intelligent management of the lighting beam angles produced by the lighting fixtures in a facility may be provided. In this aspect, control over individual light strips may be combined with the control network to provide the ability for "demand response" modulation of power consumption.

In an intelligent lighting system, the individual light strips may be turned 'ON' or 'OFF' or dimmed via a network interface. Further, a "Demand Response Front End" unit such as a demand response user interface 162 may be created that can accept demand response event information from the utility and translate it into commands for the lighting systems 102. In an embodiment, the above-created unit may be combined with a zone control system that can specify which zones are mission-critical (and not subject to being turned 'OFF' during an event) and/or which can be turned 'OFF' or dimmed. In an embodiment, the light strips may be dimmed (to minimum IES levels or even lower) for safety instead of completely turning them 'OFF'. In another embodiment, they may be regulated based on pre-determined parameters.

Another sub-module of the management systems 134 may be the lighting management module 148 that may be involved in the control and regulation of lights and lighting fixtures 102. The information generated by sensor 120 may be utilized and digested by this module to manage the lighting fixtures in the lighting systems 102. This module may be specifically involved in the operation of the lighting fixtures specifically LED based lighting fixtures 104.

Similarly, the other sub-module, building management module 150 may manage and control various aspects and information related to a building (that may be a part of the environment 100) or a facility.

Examples of the information related to the building or the facility may include check-in/checkout information, information regarding exit doors and emergency doors, information regarding various sections of the building including sections of specific concern (those housing sensitive material such as inflammable material), information regarding the parking, and other some other types of information.

In embodiments, the lighting management module 148 may automatically control and manage the lights using an intelligent system such as remote light monitoring system.

In an aspect of the present invention, the lighting management module 148 may also co-ordinate with other modules of the management systems 134. For example, the lighting management module 148 may co-ordinate with the building management module 150. The building management module 150 may direct information regarding check-in or checkout of a vehicle from the warehouse. The lighting management module 148 may in turn send a command to the local light control system in the path of the vehicle, thereby illuminating the area of path of exit or movement of the vehicle.

In another example, the building management module 150 may send information regarding emergency scenarios such as fire to the lighting management module 148.

Consequently, the lighting management module 148 may give instructions to local management modules to shut-off power supplies to the lighting systems 102.

The lighting prediction and management module 152 may manage the lights in the environment 100 by analyzing the usage of lights in the past. Based on the analysis, the lighting prediction and management module 152 may predict the lighting requirements for the future and may create or manage the sudden changes in light and energy requirements more effectively.

In an aspect of the present invention, lighting prediction and management module 152 may utilize information on usage patterns to optimize many processes across many applications, including those to minimize energy consumption of a facility. This process is described below in detail.

The process may start with an intelligent lighting system 102a, which may include sensor 120 (of any type), some network for carrying sensor data, and a central computer to which the sensor data is logged. Examples of relevant sensor types may include occupancy, temperature, ambient light, and motion sensors.

By analyzing past patterns of sensor data, the control system or management systems 134 may make predictive decisions that may reduce overall energy consumption or optimize some process. For example, if the management systems 134 observed that a particular warehouse aisle is accessed very infrequently, the ambient lighting level of that aisle may be lowered in order to save costs.

This sensor data may be compiled for use by the above management systems 134 (in order to reduce costs or increase safety, as explained above) or exported for use by some other system (such as a warehouse inventory management system, parking garage management system, security system, or so on).

In an embodiment, forecasting (cyclical and seasonal) through lighting systems to determine better layouts for plant may also be provided by the lighting prediction and management module 152. For example, the management systems 134 may compile data with a purpose to rearrange and find optimal layouts for warehousing (such as layout for stacks and fixtures inside the facility).

In an aspect of the present invention, lighting systems 102 may be managed based on mutually agreed parameters between the operator and a third party. Consider a scenario wherein the management and operation rights of the lighting systems 102 are sold to a third party or an operator under a term or rule or price based contract/agreement In such a case, the sensors associated with the lighting systems 102 may measure various factors such as maintenance levels, light levels, energy usage, and some other type of factors and variables. For example, the sensors may measure and store the amount of foot-candles available in a particular region, at may be a specific time and/or during a specific event.

The measurement and verification module 170 may log or store the above-described measurements by the sensors. In embodiments, these measurements may be verified against parameters laid down in the third party agreement or contract. An analysis between compliant versus contractual data may also be conducted.

In embodiments, various reports may be generated based on the above analysis. Further, reports may be generated in accordance with contract requirements and parameters.

In other embodiments, the above-generated reports may be sent to a third party for billing, certification, and some other types of verification purposes.

In an aspect of the present invention, the measurement and verification module 170 may perform billing verification for external energy sources. For example, the measurement and verification module 170 may track the cost of energy at a particular time of the day based on the demand information received from the UES 180 in the environment 100. The tracked information may be further compared with generated bills to ensure proper billing by the utility and external energy sources.

As described herein, a third-party may administer the lighting system. Management systems 134 may meter light delivered to environment 100, subsequently the customer may be billed according to the light delivered. For example, an administrator of lighting system may provide the lighting arrangement to an event management company for a couple of days. The arrangement may include illuminating a specified area for a fixed number of days. In this example, the event management company may be billed according to a mutually agreed contract, utilization of electricity, a fixed sum, and/or based on some other types of mutually accepted norms. In this example, the event management company may also be billed according to the total luminance delivered on a per unit basis. Various light management systems may monitor light levels in order to verify proper operation of lighting systems and facilitate billing procedures. For this purpose, luminaires may have embedded light sensor to measure total ft-cd delivered.

Further, the measurements may be logged in order to facilitate auditing and billing procedures.

In embodiments, camera-based systems (equipped with proper calibrations and filter) may be used to measure ft-cd over a broad area.

Various light management systems may also be programmed to generate utility grade auditable reports for billing and system verification.

In other embodiments, utility-grade M&V may be integrated into fixture by providing black-box module support (e.g. gaming random generators). Light fixtures or associated control systems may measure the electricity they've consumed, and report it back to a utility for billing purposes. Utilities may use the measurement and report capacity of the light fixtures to do testing of the circuits and firmware running on an electric meter, as an inaccuracy, intentional or otherwise, may have direct revenue implications. Rather than trying to test the entire fixture to the nth degree, utility-grade metering may be provided by a measurement and verification module 170 that is independently tested and thus trusted by the utility.

In an embodiment, light sensors 120, separate from fixtures, may be live and/or active on network 142 and may be monitored by various light management systems. In addition, total delivered ft-cd may be estimated by luminaire or light management systems based on luminaire runtime combined with initial calibration and open-loop depreciation estimates.

Similar to sensors, camera-based systems (with proper calibration and filters) may also be used to measure ft-cd over a broad area (say a big parking lot.)

Luminaires may emit structured light (distinct signature) in order to distinguish luminaire-delivered light from ambient light. This may be useful for auditing or configuration purposes, where a distinction between grid power consumption and power from other sources may be required.

Likewise various measurements and data logs may be used to reconcile against utility kWh billing.

The management systems 134 may further include rules databases such as demand response rules database 154, third party rules database 158, internal administration rules database 160, and logging and reporting database 172.

In an embodiment, the light management systems such as module 148 may automatically manage reaction to utility demand response event in order to reduce system power consumption by turning off all or some luminaires in the system. In other embodiments, only a selected luminaires from specific zone(s) may be switched off; consequently reducing the brightness of the luminaires to a predefined level. For example, luminaires near the windows and daylight structures may be switched off during the day upon receiving signals from outdoor sensors to reduce the power consumption. Demand response management methods may apply to any of the lighting fixtures described herein as well as lighting fixtures not described herein.

In embodiments, the demand response rules database 154 may be a repository of a set of rules or logic that may help the management modules, specifically demand response module 144, to control and manage lighting systems based on the power demand information.

The administration of the lighting systems 102 in the environment 100 such as building management for the warehouse, manufacturing facility, or an inventory may enter into a term and price based (such as flat rate based) contract with the third party (as explained earlier). Various lighting inspirations in the environment 100 may prove to be a type of investment and may yield effective return on investment (ROI) over a period. Thus, such contractual arrangements may be managed and tracked based on certain rules or agreed parameters of contract. In this context, specific rules may be laid down for managing such arrangements. These rules may be embedded in a repository such as a dedicated database.

In another aspect of the present invention, light measured in foot-candles may be sold into a facility and management of the lighting systems in the facility within base criteria (e.g., measures the light to verify compliance with an agreement, allows for spreading the cost of installation over years of a performance agreement). Considering the capital cost of retrofit, LED lighting systems may be higher in the short term. Therefore, as a way of getting around this for capital-constrained customers, a new class of performance-based contract may be created that may revolve around foot-candle distribution.

The above concept may be explained with the help of a process that may begin by dividing a facility to be re-lit with intelligent LED based lighting fixtures 104 into zones defined by use of space (e.g., high stacks vs. loading) or other criteria. For each zone, an objective metric (such as foot-candle level) or set of metrics may be defined.

At a next step, existing facility performance vs metrics may be measured prior to conducting retrofit approach. Similarly, the customer's existing energy bills to determine price-performance of existing lighting system may be evaluated. Further, a long-term performance-based lighting contract may be signed with the customer that specifies zones, metrics, and bounds on each metric. The intelligent lighting system may then be installed. Furthermore, performance of lighting system vs. metrics may be monitored via one or more of several mechanisms such as manual measurement at some schedule, automated measurement via individual sensors, automated measurement via networked sensors, and some other types of mechanisms.

Further, performance numbers for auditing purposes may be logged. In an embodiment, billing may be based on a flat fixed price. In another embodiment, billing may vary with performance vs metrics (e.g., user can opt to turn lights 'OFF'). In another embodiment, real-time kW/hour pricing may be adopted. In other embodiments, utility demand response programs may be used for auditing purposes.

Figure 14:
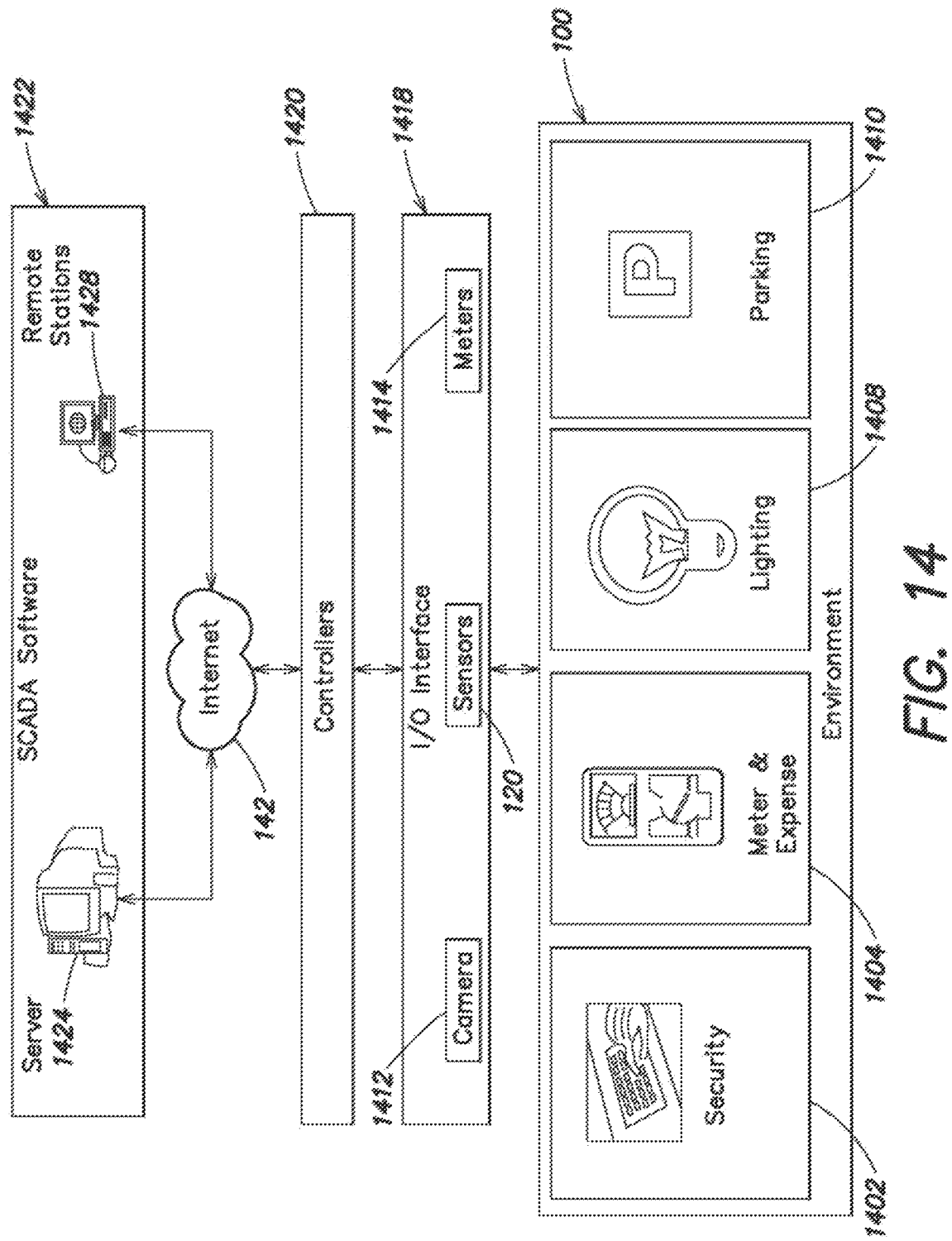
FIG. 14 depicts billing information management via a third party software, in accordance with an embodiment of the present invention.

With respect to billing corresponding to the consumption rate, the light management unit or module 148 may receive billing information (kWh billing rate) directly from the utility (e.g. through IP connection) or from third party device Supervisory Control and Data Acquisition (SCADA) box. FIG. 14 depicts one such configuration using SCADA software 1422. In the environment 100, various utilities may be located such as security 1402, meter and expense 1404, lighting units 1408, parking 1410. Information from all these utilities may be accessed by an I/O interface 1418, that primarily include elements such as cameras 1412, sensors 120, meters 1414, and some other I/O elements. These are further associated with a controlling interface of controllers 1420 that may be composed of all control and management modules associated with the system SCADA software 1422 interacts through a network with all these interfaces to generate various reports such as billing information. This billing information may be utilized to modify either automatically or manually (via an agreed upon deviation plan) the rules for managing the lighting systems.

Referring to FIG. 1B, the third party rules database 158 may be a repository of rules or logic that may help the management modules to control and manage the operations and rights related to the third party. In addition, the third party rules may be the rules that may lay out the acceptable way of managing the 'selling rights' and the 'third party rights.' The selling rights may be associated with the building management and the third party rights may be associated with the third party that may be entering into the contract. For example, the internal administrator may limit the third party rights to management of ambient lighting systems solely.

The demand response module 144 may identify wastage of energy in the ambient lighting systems (cases where lights are not switched 'OFF' during the day, and so on). Based on this information, the internal administrator may temporarily switch over the control from third party to internal management modules and may levy a penalty on the third party. The rules for levying the penalty may be set forth in the contract.

Similar to the third party rules database 158, the internal administration rules database 160 may include rules and logic that may define activities performed by an internal administrator. For example, the internal administration rules database 160 may define rules for a manager of the warehouse to regulate the lighting systems 102 in a certain specified way.

In another scenario, there may be rules such that the internal administrator may also manage and oversee the operations of third parties. In an embodiment, the internal administration rules database 160 may define hierarchy for maintaining the lighting systems 102. In an aspect of the present invention, the internal administration rules database 160 may also define the rules for general management within the environment 100.

In an embodiment, the logging and reporting database 172 in association with the measurement and verification module 170 may log information obtained from the environment 100 and report the information when needed.

The environment 100 may also include the user interfaces 138 through which various users may interact with diverse elements of the environment 100. The users may include the internal administrator, third parties, and the like.

Referring to FIG. 1B, the user interfaces 138 may include demand response user interface 162, light as a resource interface 164, and internal administration user interface 168. The user interfaces 138 may be a Graphical User Interface (GUI), Web User Interface (WUI), Intelligent User Interface (IUI), Voice User Interface (VUI), Touch interface, and some other types of user interfaces. In embodiments, the various user interfaces 138 (demand response user interface 162, light as a resource interface 164, and internal administration user interface 168) may also interact with each other in other embodiments, the user interfaces 138 may interact with the three rules databases. For example, consider a region wherein natural light may be available. This condition may be sensed by sensor 120 and may be transmitted to the management systems 134. Based on the impetus received from the management systems 134, the third parties may decide to either turn-off or fade away the lights (decrease the intensity of illumination of lights) for this region from the light as a resource interface 164.

The demand response user interface 162 may interact with the various management modules, specifically demand response module 144, for receiving and managing various demand response information in the environment 100.

In an aspect of the present invention, lighting control system with an electricity demand response interface may be provided. In electricity grids, demand response (DR) refers to mechanisms to manage the demand from customers in response to supply conditions. For example, electricity customers may be made to reduce their consumption at critical times or in response to market prices. Conventionally, hardware-based demand response systems are not tightly integrated with lighting control systems, adding installation complexity and cost.

In an aspect of the present invention, lighting management module 148 with the electricity demand response interface may be provided. In the electricity grids, demand response (DR) may refer to mechanisms for managing the demand from customers in response to supply conditions. For example, electricity customers may be asked to reduce their consumption at critical times or in response to market prices.

Similarly, the internal administration user interface 168 may be involved in the interaction of the internal administrator with various modules, sub-modules, and systems of the present invention. For example, the internal administrator may generate specific instructions using this interface for other users in the environment 100, related to emergency operations such as exit instructions in case of fire.

The present invention may disclose a lighting system designed for retrofit applications consisting of a central "master" lighting fixture, which may connect to high-voltage power (and control signals), and one or more "slave" lighting fixture, which may connect to a low-voltage power bus provided by the master lighting fixture.

In an aspect of the present invention, a novel retrofit lighting system for use in parking garages may be used. Conventionally the garages may be wired in a "single row" configuration, with a single row of junction boxes running down the middle of each driving aisle. The addition of any additional high-voltage wiring to the ceilings may pose a difficulty, because the wiring would have to be contained in protective conduit and the surfaces may be concrete. Therefore, the lighting system may consist of a master lighting fixture that may be mounted directly to the central junction box, and a pair of low-voltage slave lighting fixtures that may be connected to low-voltage power ports on the master lighting fixtures.

In an aspect of the present invention, an LED based lighting fixture 104 such as a high intensity discharge lamps with integral emergency lighting function may be provided for use in such areas as high bays, parking garages, outdoor areas, and the like. The high-intensity discharge lamps that may be used for the above applications may take a longer time to reach full intensity upon application of power. Therefore, a separate set of fixtures may be installed in order to provide light after a power failure.

The present invention describes an LED based lighting system 102a that may provide "emergency" lighting. In an embodiment, the fixture may be an integrated energy storage device that can supply power for some period.

In another embodiment, the fixture may have a modular energy storage device that can supply power for some period.

In another embodiment, the fixture may have external supplementary power connection that can supply power for some period.

In other embodiment, the fixture may be designed such that the power source in the above embodiments supplies power to only a part of the LED array.

In another embodiment, the fixture may include some mechanism for reporting information related to powering the LED light bars over a network to a remote facility In other words, the mechanism may report power failure back to a central control point.

In an aspect of the present invention, an LED based lighting fixture 104 with integrated RFID reader may be provided.

Conventionally, installation of RFID systems in industrial environments is costly due to the expense of wiring and supplying power. Integrating the RFID reader into the fixture may reduce the cost and complexity of such installations.

The present invention describes an LED based lighting system 102a that may be integrated with a RFID reader module and a data network to transfer RFID data to a central processing point such as management systems 134. The RFID reader may draw power from the fixture and further may use the system's data network for communication.

In an aspect of the present invention, lighting systems 102 with integrated electricity time-shift may be provided.

Conventionally, utilities are known to move towards variable pricing models, where electricity rates vary in a continuous or discrete manner over time. Integrating an energy storage device into the lighting systems 102 (at the system or fixture level) may create a way to take advantage of these rate fluctuations by altering the consumption profile of the lighting systems 102.

Similar to the billing rates, information regarding electricity rates variation may be shared across the network 142. This information may be further utilized by the management system 134 to store energy in power storage means (e.g. energy storage facility 184) when power is less expensive, and subsequently utilize the stored energy to power luminaires and light modules when needed, thereby leveling off grid consumption.

It is known that lighting systems consume electricity at the exact moment they utilize it. Therefore, an energy storage facility 184 (such as a battery) may be added to the lighting system (as explained in reference with FIG. 1A). Consequently, electricity may be consumed from the grid at times of lower rates, stored for later, and then consumed according to the normal schedule.

In an aspect of the present invention, lighting system with integrated payment gateway may be provided. In an embodiment, EZpass-like reader may be integrated into intelligent lighting system to provide a payment gateway.

This may be used in applications such as electric car charging. EZpass-like reader may be integrated into the lighting fixtures to handle payments associated with charging of electric cars in parking garage or parking lot facilities. Further, this may be used in parking space payment applications as well.

In an aspect of the present invention, lighting systems 102 with integrated camera for facility security systems may be provided. Many commercial and industrial facilities currently install security camera systems to allow for monitoring of facility.

In an embodiment, the camera may be integrated directly into the fixture. Alternately, camera may be integrated into the fixture via modular power and data connection. Thereby, the camera video may be transmitted to the central location using the fixture's integrated network.

In another aspect of the present invention, ruggedized or explosion-proof LED based lighting fixture 104 with integrated sensing and network may be provided. Certain types of industrial facilities such as laboratories, pharmaceutical labs, food processing, gas stations, and some other types of laboratories may also require the use of "explosion-proof" fixtures.

In an embodiment, an explosion-proof LED fixture may be combined with a sensor 120 or a sensor module designed to detect dangerous conditions. A network module such as network 142 may communicate the presence of these conditions to other equipment such as process control equipment, blast doors, fire suppression systems, and some other types of equipment.

The above-disclosed embodiments may also be disclosed to include functionalities such as thermal management designs, power management designs, LED control techniques, system coordination and control techniques, explosion proof fixtures, leak detection, selective UV lighting, retrofit brackets, power and data wires/cords, and some other type of functionalities.

Various embodiments of the present invention may be applicable to a variety of environments and applications such as warehouse, manufacturing facility, parking garage, parking lot, roadway, sidewalk, highway, alley, prison, indoor pools, gymnasium, dormitory, high density housing, stadiums, arenas, task settings, clean rooms with UV, retail, bridge, tunnel, and some other types of environments and applications.

The manufacturing facility may further include steps for sensing hazardous conditions and connecting to real-time monitoring systems for controlling ventilation, blast doors, etc. Also, it may include steps for warehouse temperature sensing for pharmaceuticals/food applications in combination with steps for logging into fixture and some auditing system.

Figure 2:
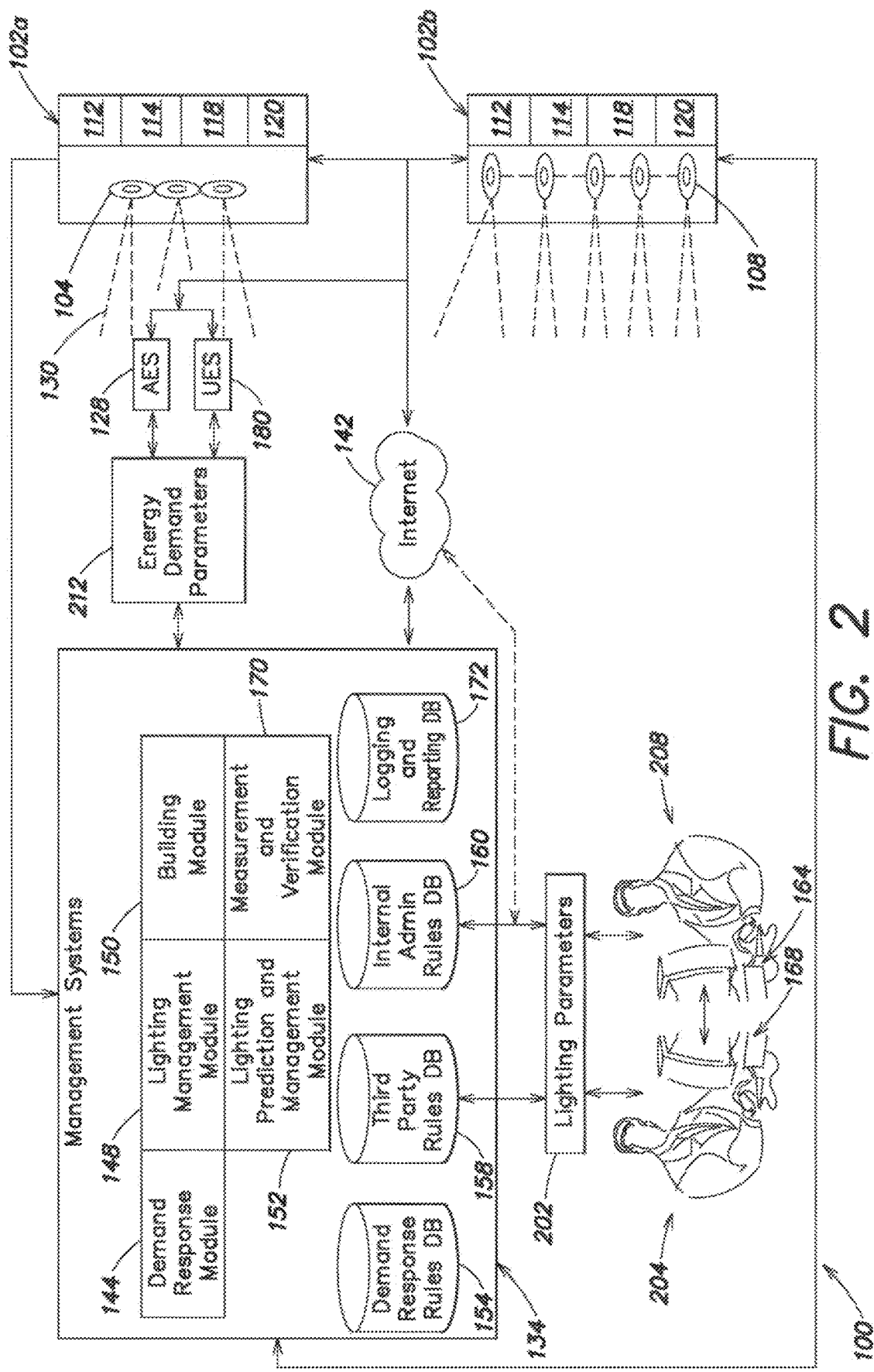
FIG. 2 depicts the management of artificial lights in the environment based on the comparison of various lighting measurements with stored parameters, in accordance with an embodiment of the present invention.

Referring to FIG. 2, the present invention may provide methods and systems for managing artificial lighting in the environment 100. FIG. 2 illustrates lighting systems 102*a* and 102*b*. In an embodiment, the lighting systems 102 may be an LED based lighting system. It may be noted that the invention may also be realized with plurality of other lighting systems such as 102*c*, 102*d*, and so on. The lighting systems 102 may also include a plurality of light strips 210 that may be producing different beam angles 130. Also, the area of illumination as a result of the various beam angles 130 may be in part overlapping.

These lighting systems 102*a* and 102*b* may be associated with each other in a network. Further, they may also be controlled by a data network 142. In an embodiment, a set of lighting parameters 202 may be stored in a database. These lighting parameters may be a result of the mutual agreement between an operator 204 and a third party manager 208.

In the environment 100, measurements may be conducted to assess the conditions and various aspects of lighting. For example, the sensors 120 may determine a fall in the voltage levels and intensity of the lighting fixtures and may transfer this information to the management systems 134. The lighting management module 148 may utilize these measurement values to generate a command to increase the voltage supply being delivered to the lighting systems 102 and subsequently regulate the artificial lighting.

In other embodiments, the management systems 134 modules such as measurement and verification module 170 may compare these measurement values received from the sensors 120, with at least one of the stored lighting parameters. Based on the comparison the management systems 134 may make an adjustment to at least one of the lighting systems 120. For example, based on the comparison between the value of beam angle received from the sensors 120 and the beam angle value stored, the measurement and verification module 170 may adjust the beam angle 130 produced by the lighting system 102*a*.

There may be various interfaces through which the operator and the third party manager may interact. FIG. 2 illustrates a third party manager user interface or light as a resource user interface 164 and an operator user interface or the internal administrator user interface 168, previously depicted in FIG. 18.

The third party manager user interface 164 may be adapted to provide the third party manager 208 with tools for performing various functions. These tools may be operational commands, switches, sub-interfaces, and some other types of tools. For example, the interface 164 may be equipped with tools for adjusting at least one of the lighting systems 102, changing and/or adding and/or removing at least one of the lighting parameters 202 from the plurality of stored parameters.

In embodiments, third party tools and devices may control and manage various systems inside the environment 100. These third party devices may be for various systems such as building automation systems (conventionally provided by Honeywell, Johnson controls, etc.), lighting control systems (similar to those of Lutron, Light Corp, etc.), industrial control systems, security systems, process control systems, inventory control systems, warehouse management systems, and some other systems.

The third party manager 208 may also utilize the third party manager user interface 164 for manually overriding automated decisions made by the management systems 134. For example, consider a scenario wherein during a day-time, based on set forth rules, the management system 134 increased the intensity of the lights operational near the entry of a parking lot. The third party manager 208 on identifying that the natural and ambient light may be used instead of the lighting systems, may override the above automated decision and switch off the operational lights by sending an appropriate command from the user interface 164. In another embodiment, the tools may also be used for determining which of the stored lighting parameters 202 may be modified by the operator 204 of the environment 100.

Similar to the third party manager user interface 164, the operator user interface 168 may be adapted to provide the operator 204 with tools for adjusting and/or changing at least one of the lighting parameters 202 from the plurality of the stored parameters. For example, the operator 204 may decide to change the values related to maximum lumen output. He may do so by changing the predetermined values stored in the database. In another example, the operator user interface 168 may also be adapted to provide the operator 204 with tools for visualization of the energy consumed by one or more lighting systems 102. Examples of visualization tools may include charts, 3D graphics, CAD, MATLAB, MS Excel, and some other types of visualization tools known in the art.

In addition to lighting parameters 202, a plurality of energy demand parameters 212 may also be stored in the database in the management systems 134. Each of these energy demand parameters 212 may be associated with a lighting parameter 202 such that whenever the management systems 134 may receive information regarding the energy demand of the lighting systems 102 in the environment 100, then this information may be subsequently utilized for controlling the lighting systems 102. In embodiments, the energy demand parameters may be associated with the utility and/or alternate energy demand of the lighting systems 102.

Figure 3:
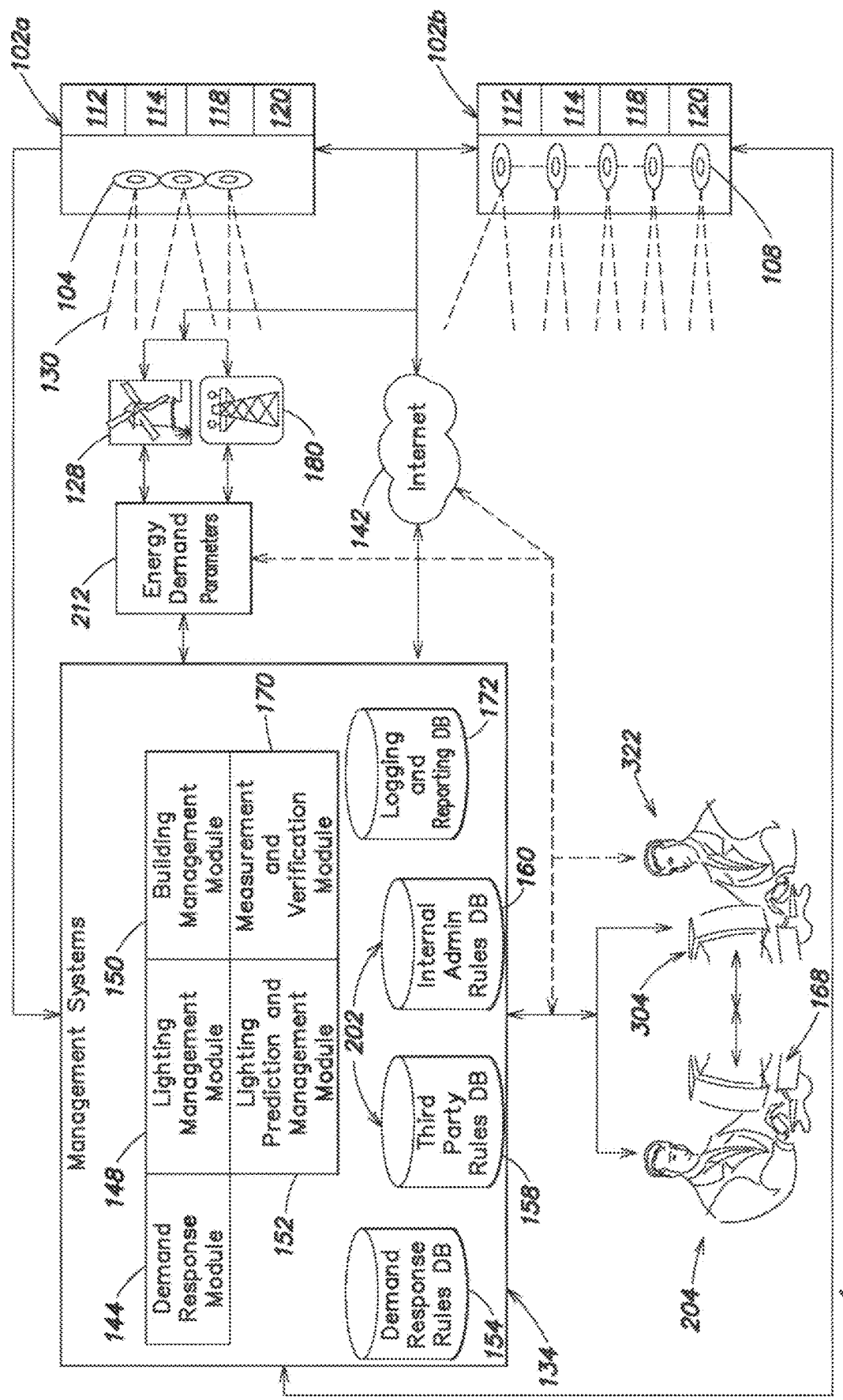
FIG. 3 depicts the management of artificial lights in the environment based on energy demand response, in accordance with an embodiment of the present invention.

FIG. 3 illustrates management of the artificial lighting in the environment 100 upon receiving the demand response, in accordance with an embodiment of the present invention. Energy demand information received by the management systems 134 may be compared with the stored energy demand parameters (FIG. 2); this comparison may be evaluated based on a rule stored in the database. Based on the above evaluation, control information from the management systems 134 may be communicated to the lighting systems 102 via the network 142.

For example, the lighting systems may communicate the demand and/or cost in energy during the peak load hours to the management systems 134. Energy parameters related to alternate energy usage and utility energy usage may be compared to this demand information. The compared values may then be evaluated based on a rule, such that if the values have a difference more than a predetermined value, the demand response module 154 may command the utilization of alternate energy in order to meet the peak demand.

Similarly, based on the evaluation the beam angle and the intensity of light associated with it may also be regulated for the lighting systems 102. Consider a scenario wherein the sensors 120 communicate the fall in the beam angles 130 for the lighting systems 102b at the entry of the warehouse. This information received from the sensors 120 may be evaluated based on the lighting rules set in the database such as third party rules database 158. The rule may be set forth such that the desired beam angle may be of 30 degrees for the lighting systems 102. The third party may initiate a command from the interface 164 to increase the beam angles 130 for the lighting systems 102b.

The rules set forth in the management systems 134 may also be modified, in accordance with an embodiment of the present invention. In another example, the lighting systems may be regulated by modifying the amount of time the lighting systems 102 may be turned-on in response to the sensor inputs.

Another example of regulating the lights may be modification in the brightness of some sub-set of the lights from the complete set of lighting system 102a.

Referring to FIG. 3 again, an energy provider user interface 304 may be provided that may be adapted to provide an energy provider 322 with tools for adjusting, changing, removing and/or adding lighting parameters 202. These tools may also be adapted to override manually, the automated decisions made according to the stored lighting parameters 202. Further, tools may also determine which of the stored lighting parameters 202 may be modified by the operator 204.

In an embodiment, the energy provider 322 may also be the third party manager 208.

Figure 4:
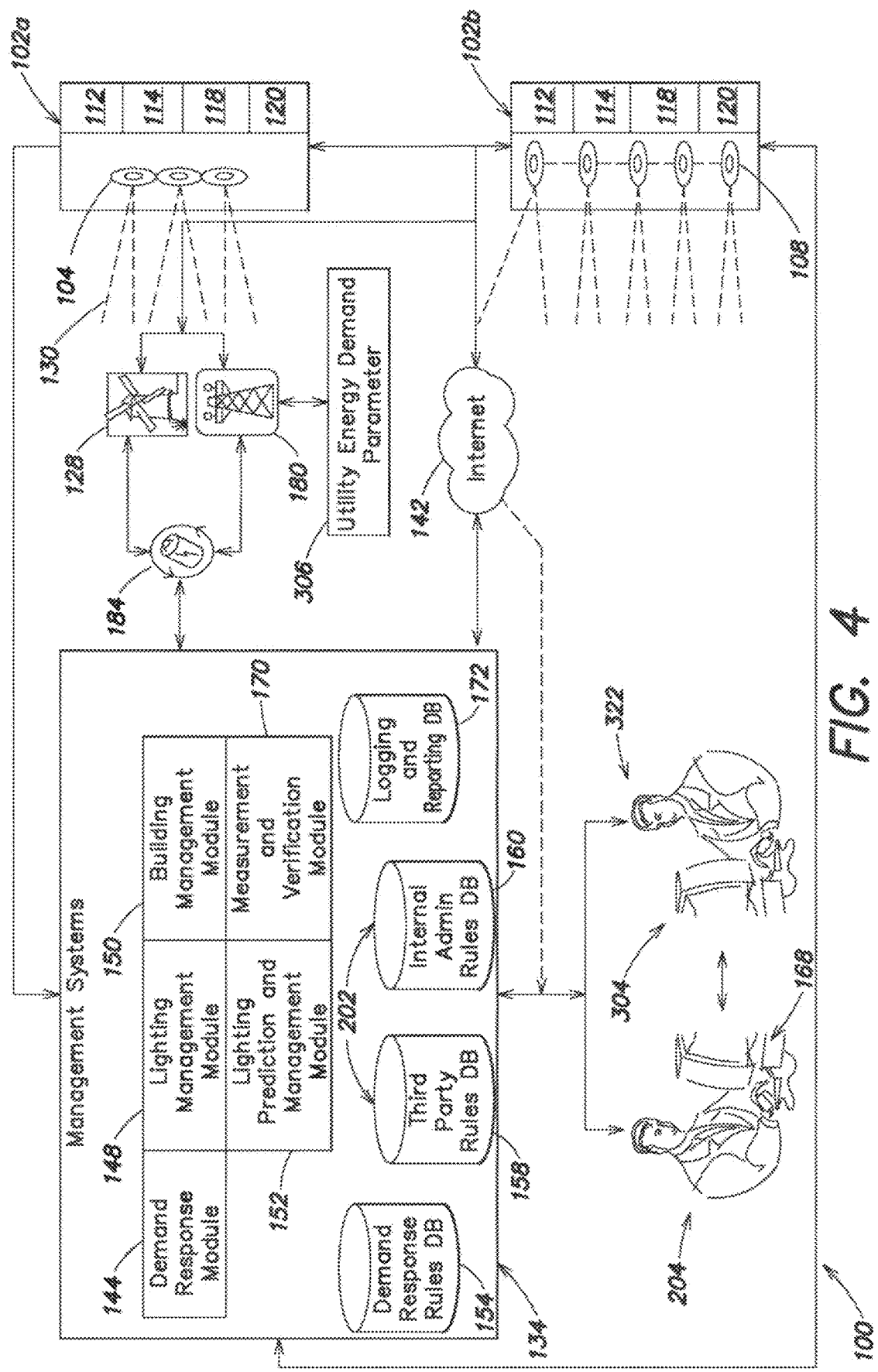
FIG. 4 depicts the management of the lighting systems in the environment based on the assessment regarding the utility energy and the stored alternative energy, in accordance with an embodiment of the present invention.

FIG. 4 depicts the management of the lighting systems 102 in the environment 100 based on the assessment regarding the utility energy and stored alternative energy. As described earlier in FIG. 1A, the energy produced by the alternative energy source 128 may be stored in an energy storage facility 184 so that this energy may be utilized at some other different time. For example, energy produced by the solar energy and wind energy may be stored in batteries, flywheels and some other types of storage facilities. Upon receiving information regarding the rise in the cost and consumption of conventional energy from the lighting systems 102, the demand response module 144 may automatically switch over completely and/or partially the power supply from the conventional sources to the stored alternate energy sources and may sustain this till it receives another information from the lighting systems or command from the user interfaces.

The demand response module 144 may also receive utility demand information from the lighting systems 102 and may compare this information with utility energy demand parameters 302. Further, the demand response module 144 may make an assessment regarding both utility energy and alternative energy options. This assessment may be regarding various distinct features and options available from both the sources. Based on the assessment, the management systems 134 may subsequently select one of the above assessed options and may generate an appropriate command for the regulation of the lighting systems 102. For example, at any instant it may be assessed that the overall cost and advantages (such as installation) obtained from the utility energy sources 180 outweighs the alternate energy sources 128 (considering the operational costs as well), the management systems 134 may decide to automatically switch over to the former energy source.

Figure 5:
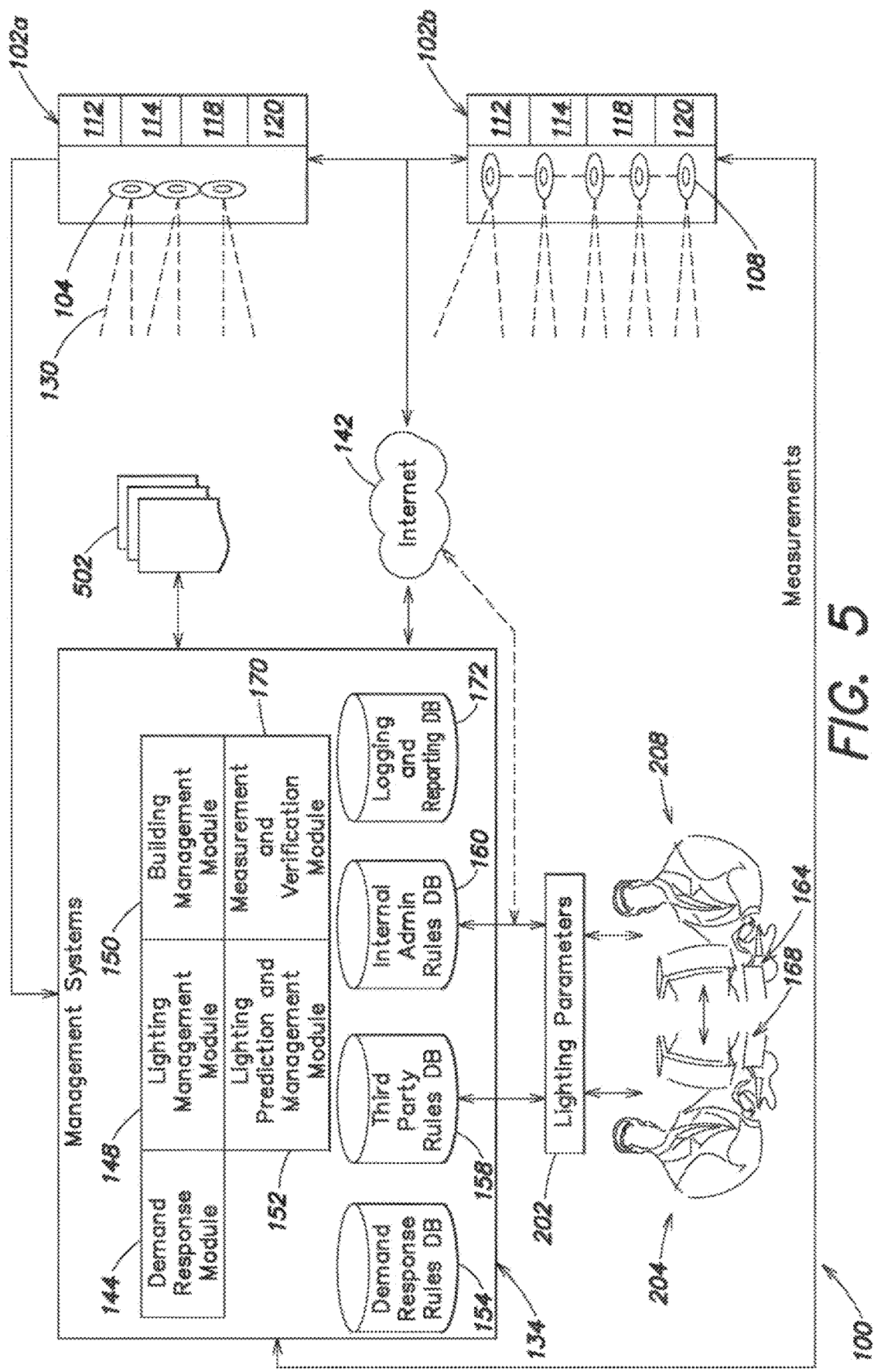
FIG. 5 depicts the management of lighting systems in the environment on the basis of various lighting measurements, in accordance with an embodiment of the present invention.

Referring to FIG. 5, the figure illustrates the management of lighting systems 102 in the environment 100 based on lighting measurements being made. As shown in the figure, the lighting systems 102, such as LED based lighting systems 104 may be present in the environment. The interaction and association among the lighting systems 102 may take place via a wired and/or wireless network 142. As previously described in conjunction with FIGS. 2-4, the mutually agreed upon stored lighting parameters may be utilized to assert compliance of the measured lighting conditions in the environment 100. The lighting conditions may be automatically measured by sensors 120 that may be installed in the lighting systems 102 or within the environment 100. The above measurements may be regarding the levels of brightness, operating status, power consumption, operational time (run hours), tampering or damage to the lighting systems 102.

In another embodiment, the automatic measurements may also be made regarding the third party systems that may be responsible for assessing and monitoring the lighting systems and their associated interconnections. For example, third party systems such as lights in the third party area, user interfaces, visualization tools and their energy consumption may be measured to assess the conditions of lights and power in the environment 100.

Automatic measurements made by the sensors 120 or some measurement units may be communicated to the management systems 134, third party and operator terminals over the network 142. The measurement may be made either periodically or upon occurrence of an event. For example, sensors 120 may measure the lighting conditions based on a rule, such as a specific time of the day (during lunch time or closing hours) in other example, measuring units may automatically measure the lighting conditions when some other sensor associated with the system is triggered (measurement of the switches in power 'ON' mode, upon sensing an emergency). In yet other example, measurements may be made based on an energy demand parameter. Still in some other cases, measurements may be conducted only when the sensors 120 receive a manual request from one of the user interfaces.

In accordance with an embodiment, the above described compliance checks may also be reported in the form of generated reports 502. The reports may include tabular data, instructions, recommendations, measurement data, compliance status, reporting parties. The reports may also include information such as percentage time in and/or out of compliance, cost of energy used to maintain compliance, amount and/or cost associated with the usage of alternative energy, efficiencies and maintenance cost of the lighting systems 102, and some other types of information. The reports may be hard-cover or soft copies. Additionally, these reports may also include information regarding the various modules, units, and systems of the lighting systems 102, such as a luminaire system.

Figure 6:
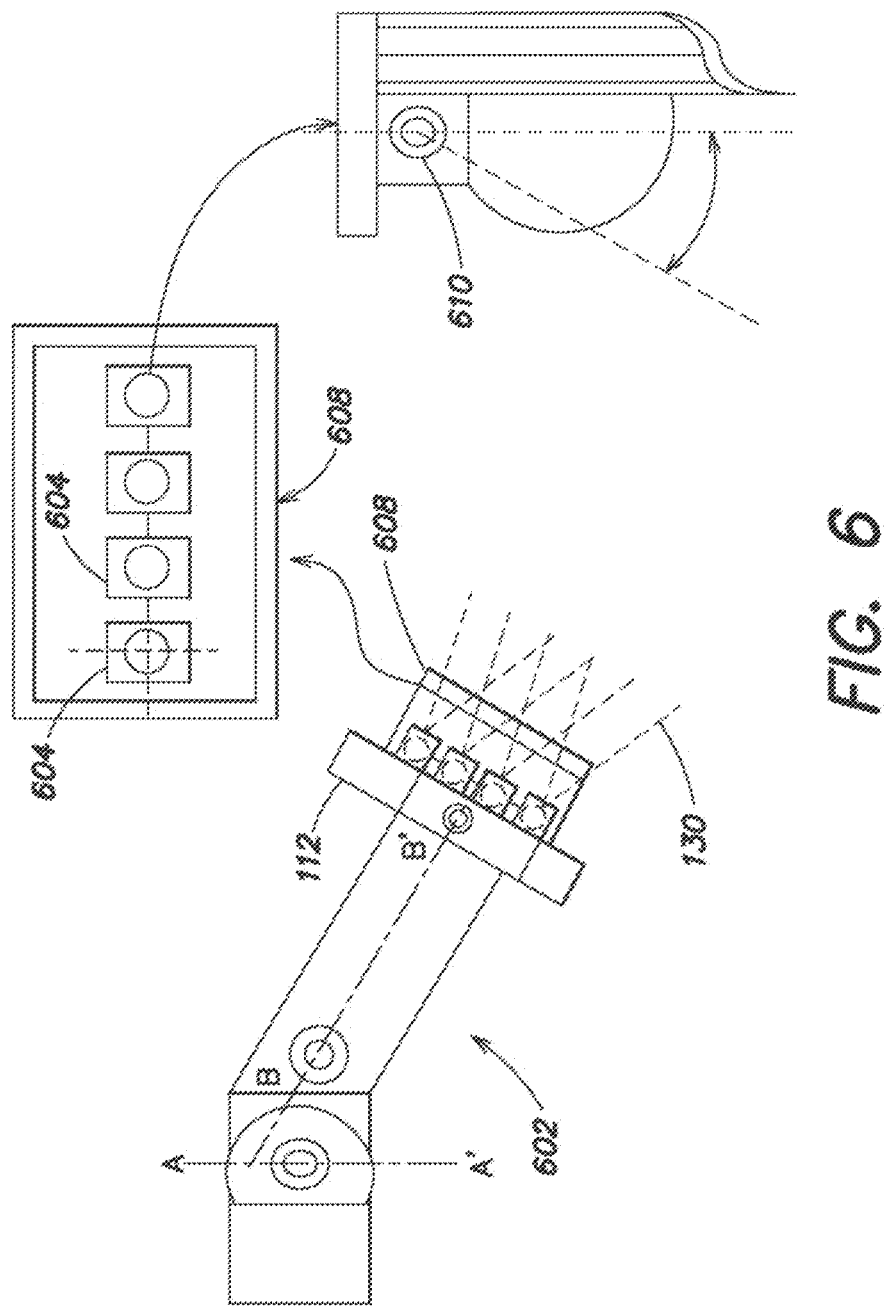
FIG. 6 depicts an exemplary modular luminaire system, in accordance with an embodiment of the present invention.

FIG. 6 illustrates an exemplary modular luminaire system 602, in accordance with an embodiment of the present invention. The luminaire system 602 may be constructed by assembling various components and may consist of a series of light modules 604 and one or more power management modules or modules 112.

Each of the light modules 604 may be characterized by varying lumen output and beam angles 130. The lumen output and beam angles 130 for the light modules 604 may be predetermined. However, it may be appreciated, that the light modules 604 may be controlled and guided accordingly to generate a desired intensity of light, lumen output, and/or beam area coverage.

Each of the power management modules (modules) 112 may be associated with one or more light modules 604. The luminaire system 602 may also include a fixture frame 608 to provide a mechanical support to the light modules 604 and the power management modules (modules) 112.

In certain cases light modules 604 may be in the form of light bars or light rods. These light bars may incorporate both thermal and optical systems (e.g. thermal management module 114 and light management module 118) to constitute a modular LED assembly. These light modules 604 (light bars), power management module 112, and a mechanical structure similar to fixture frame 608 may together represent a modular LED luminaire.

In embodiments, the fixture frame 608 may provide a mechanism to rotate the light modules 604 around one or more axes. For example, as shown in the figure, the fixture frame 608 may be rotated around axes AA' and BB' to render a flexible and modular feel to the luminaire system 602. Similarly, each of the light modules may be rotated around axes CC' to modify the orientation and the beam area distribution for the luminaire. In other words, each of the light bars may be rotated along at least one rotational axis independent of the orientation of the fixture frame 608.

In embodiments, rotation of the beam angles associated with these light bars may vary intensity of light at different orientations. This may particularly be useful in areas where the requirement of light in various corners or sections of the area may vary. For example, in a scenario where the light bars are automatically rotatable based on the sensory movement of the object near them, the beam angle of the light bar may be different in the position when the object is directly below than to the beam angle when the object is at a distance from the light bar.

In an embodiment, the light bars and the power management module 112 may be designed for easy and quick replacement. For example, conventional lighting systems may require a prior knowledge and expertise for replacing them. In some cases, apprehensions and fear related to safety may also be associated. However, the above light bars and power management modules 112 may be electrically and mechanically designed so as to facilitate easy replacement by a person who may or may not be a licensed electrical contractor.

Figure 20A:
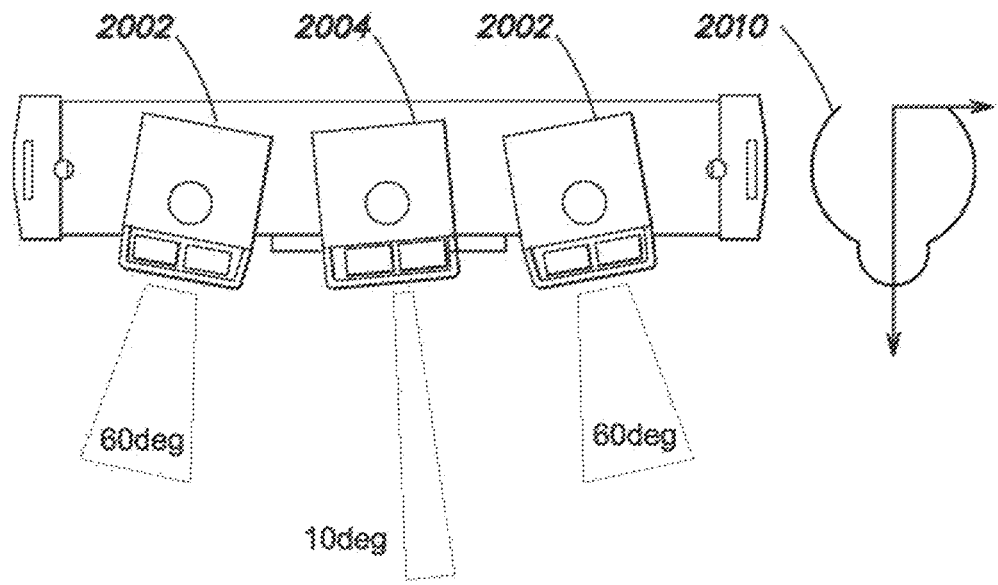
FIGS. 20A and 20B depict a fixture with reconfigurable beam pattern.
Figure 20B:
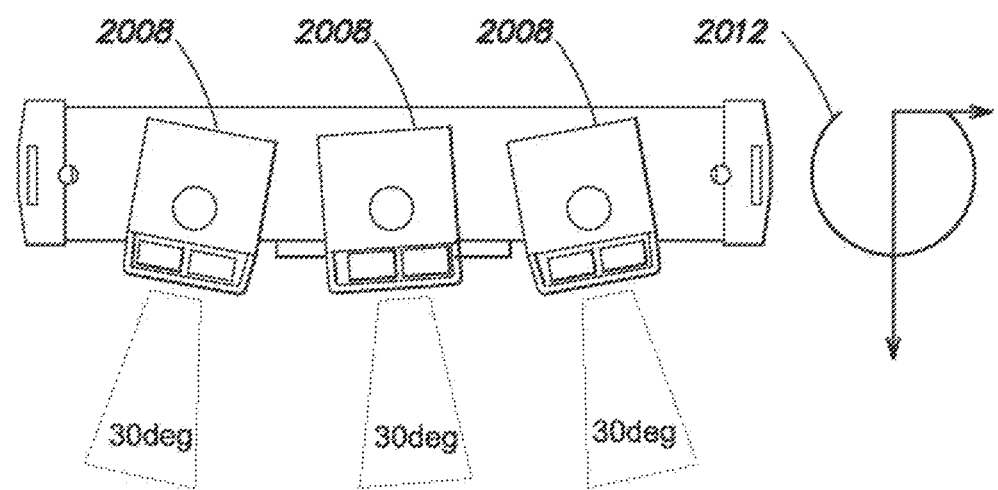

In other embodiments, a user-replaceable optical assembly 610 may be used to modify the beam pattern of the individual light modules 604 and overall aggregate beam angle produced by the luminaire system 602. The optical assembly 610 may be user-replaceable such that any user may be able to replace the optic in a tool-less manner. Referring also to FIGS. 20A and B, an example of a fixture with reconfigurable beam pattern is depicted. Using the same power management module and fixture frame, LED light bars that emit different beam patterns to get a different compound beam angle may be swapped in. The beam pattern of each individual light bar can be changed in order to change the fixture's beam pattern. Alternatively, the individual light bar beam pattern may be changed by swapping in a bar with a different optical profile, such as by swapping whole bar or swapping out optics on individual bars In FIG. 20A, a fixture is shown where the LED light bars are emitting directional light distribution, which may be best for lighting tall aisles. One LED light bar 2004 is emitting a 10 degree beam angle while the other two light bars 2002 are emitting 60 degree beam angles, generating an aggregate beam pattern 2010. In FIG. 20B, the fixture is emitting uniform light distribution, which may be best for lighting open spaces. All three LED light bars 2008 are emitting the same 30 degree beam angle, generating an aggregate beam pattern 2012.

In an embodiment, there may be provided some means for re-establishing the environmental seal around the assembly. Also, the optical assembly 610 may be either secondary or tertiary optic assembly.

Figure 8:
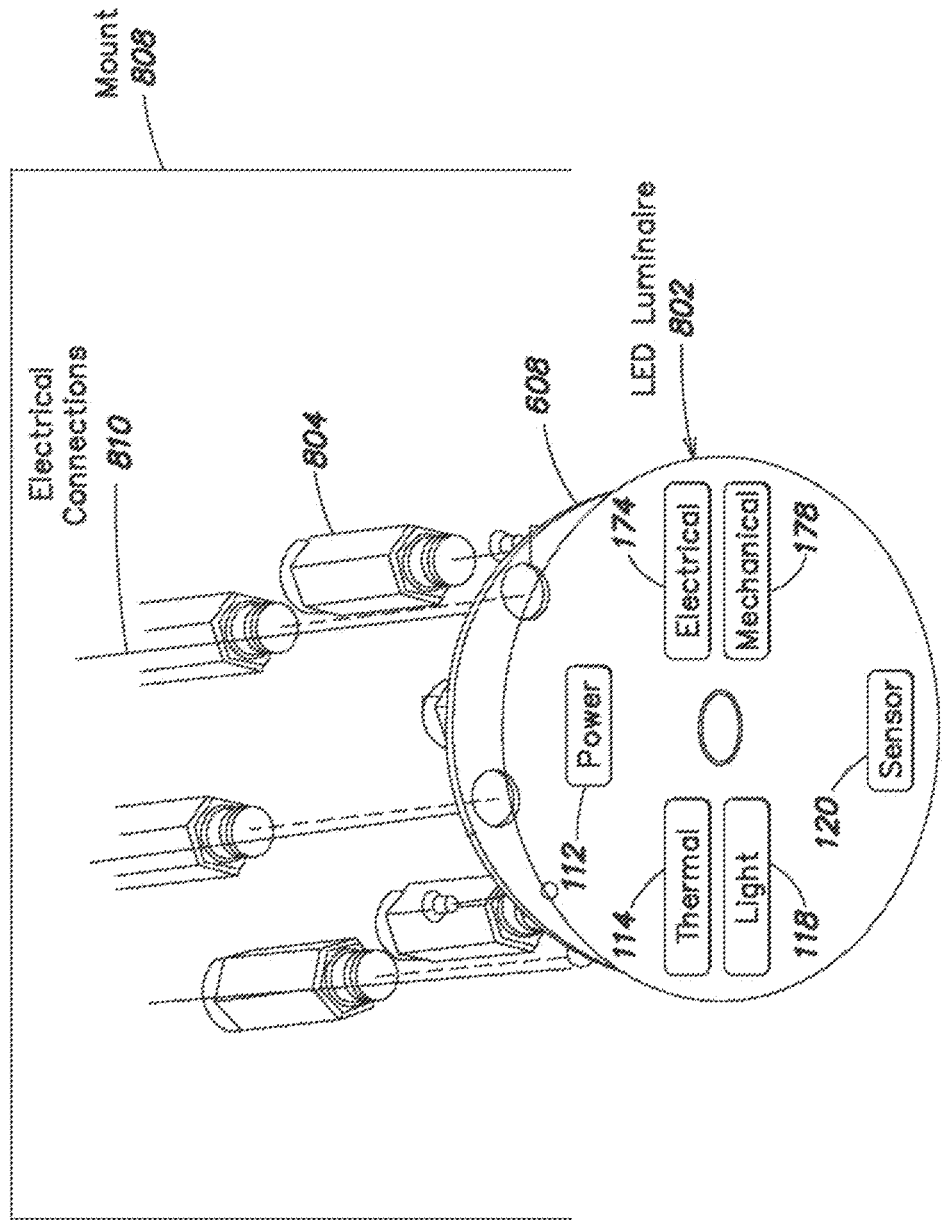
FIG. 8 depicts a quick release mechanism for light fixtures, in accordance with an embodiment of the present invention.

In another embodiment, the light modules 604 or light bars may be connected to the fixture frame 608 by means of various mechanisms such as a quick release mechanism. This mechanism may provide a combination of free-rotation and a tool-less easy replacement of the luminaires. FIG. 8 depicts an exemplary quick release mechanism 800 for light fixtures. An LED luminaire 802 includes fixture frame 608, various management modules (power 112, thermal 114, light 118, electrical 174, and mechanical 178), and sensors 120. Mechanical quick releasing fasteners 804 attach the fixture frame 608 to a mount or wall 808.

In accordance with an embodiment, the quick-release mechanism may be a mechanical mechanism. For example, skewers, latches, and hooks may be used to provide quick-release attribute to the luminaires.

The quick release mechanism may also include magnetic connections or magnetic methods used for easy replaceability of the light modules 604. In other cases, a combination of magnetic means and mechanical means may be used in the luminaires.

In accordance with another embodiment of the present invention, the quick-release mechanism may serve as both a mechanical interface and a conduit for electrical power (e.g. electrical connections or wires 810) to the light bar.

In yet other embodiment, the quick-release mechanism may serve as a data conduit for communicating with intelligent circuitry onboard the light bar. For example, the mechanical structure (e.g. hook for quick release) may include sensors 120 capable of transmitting detected changes in the luminaire to a master control.

In an aspect of the invention, the power management module 112 may be integrated into the light bar or light module 604 (for example, as a compact module.) Therefore, in systems consisting of multiple light bars or modules 604 (FIG. 6), each bar may be associated with a specific power management module 112. In such a scenario, a master control module such as management systems 134 may distribute power and control signals to the power management modules 112 and subsequently to the light bars or modules 604 in the lighting system.

In an embodiment, the power management module 112 may be mounted co-axially at the end of the light bar. It may be noted that various other configurations may be practiced for arranging power management modules in the light bar as evident and obvious to a person skilled in the art.

In other embodiments, the mechanical structure i.e., the fixture frame 608 may be designed to include different number of light bars or modules 604 to the frame. The number and configuration of the light bars may be dependent on several factors. For example, for a given length of an extruded sub-frame, several light bars of round configurations may be arranged as shown in FIG. 6.

As per specific installation requirements, various types of fixture frames may be designed and used in the luminaires. Similarly, different types of power management modules 112 (depending on a specific set of electrical characteristics) and various types of light bars or modules 604 (depending on photometric/optical characteristics) may be used. These different types of fixture frames 608, power management modules 112, and light bars or modules 604 may be used to construct custom luminaires 802 for the consumers. For example, a luminaire with an adjustable fixture composed of fabricated steel and numerous holes may be provided with LED glow rectangular lights with varying beam angles and a luminous flux of 680 lumens (lm).

Figure 22:
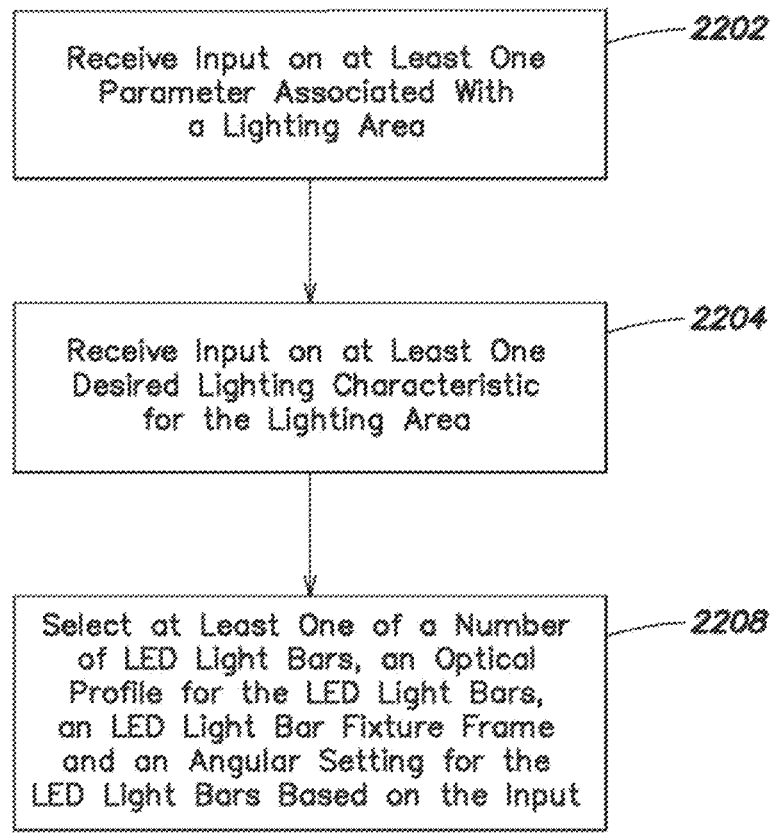
FIG. 22 depicts a flow diagram of a configuration tool for modular lighting system.

Similarly, for constructing the above types of custom luminaires 802, the luminaire assembly (or system) may be accompanied by a software configuration tool that may help the users to specify the combination of fixture frames, power management modules, and light bars for specific applications. Referring to FIG. 22, a flow diagram of a configuration tool for a modular lighting system is depicted. The configuration tool may be a software tool that lets a user input information about the space they are trying to light, and outputs the best fixture configuration to meet their needs. The tool may tell a user how to configure the fixture via light bar count, choice of optics, angular settings, and the like. Some input variables may include mounting height, aisle width, fixture spacing, surface reflectivity, desired ft-cd level, and ambient temperature. Some outputs may be number of light bars, a selection of optics for each light bar and angular settings. The configuration tool may employ a logical process including the steps of receiving input on at least one parameter associated with a lighting area 2202, receiving input on at least one desired lighting characteristic for the lighting area 2204, and selecting at least one of a number of led light bars, an optical profile for the LED light bars, an LED light bar fixture frame and an angular setting for the LED light bars based on the input 2208.

Alternately, the steps for assembling the various components of the luminaire system 602 or LED luminaire 802 may be embodied in the software application so that it may act as a guidance or instruction manual for a purchaser of the luminaire system or assembly.

Conventionally, there are software systems that also allow manufacturers to create product prototypes to validate design and engineering data, and ensure satisfactory fit and function for custom products. However, in accordance with the embodiments of the present invention, the use of the software configuration tool will take this approach to another height where an increased customer satisfaction may be reported due to the active involvement of the consumer in designing a modular and customized lighting system.

In embodiments, the above described modular luminaire system 602 or LED luminaire 802 may also be driven by an efficient power management system to generate a lighting system that may be modular in design, cost-effective, environmentally adaptable, equipped to include variability in pricing models, and intelligently controlled. These features and some others will be described later in conjunction with appropriate examples and accompanying figures.

Figure 7:
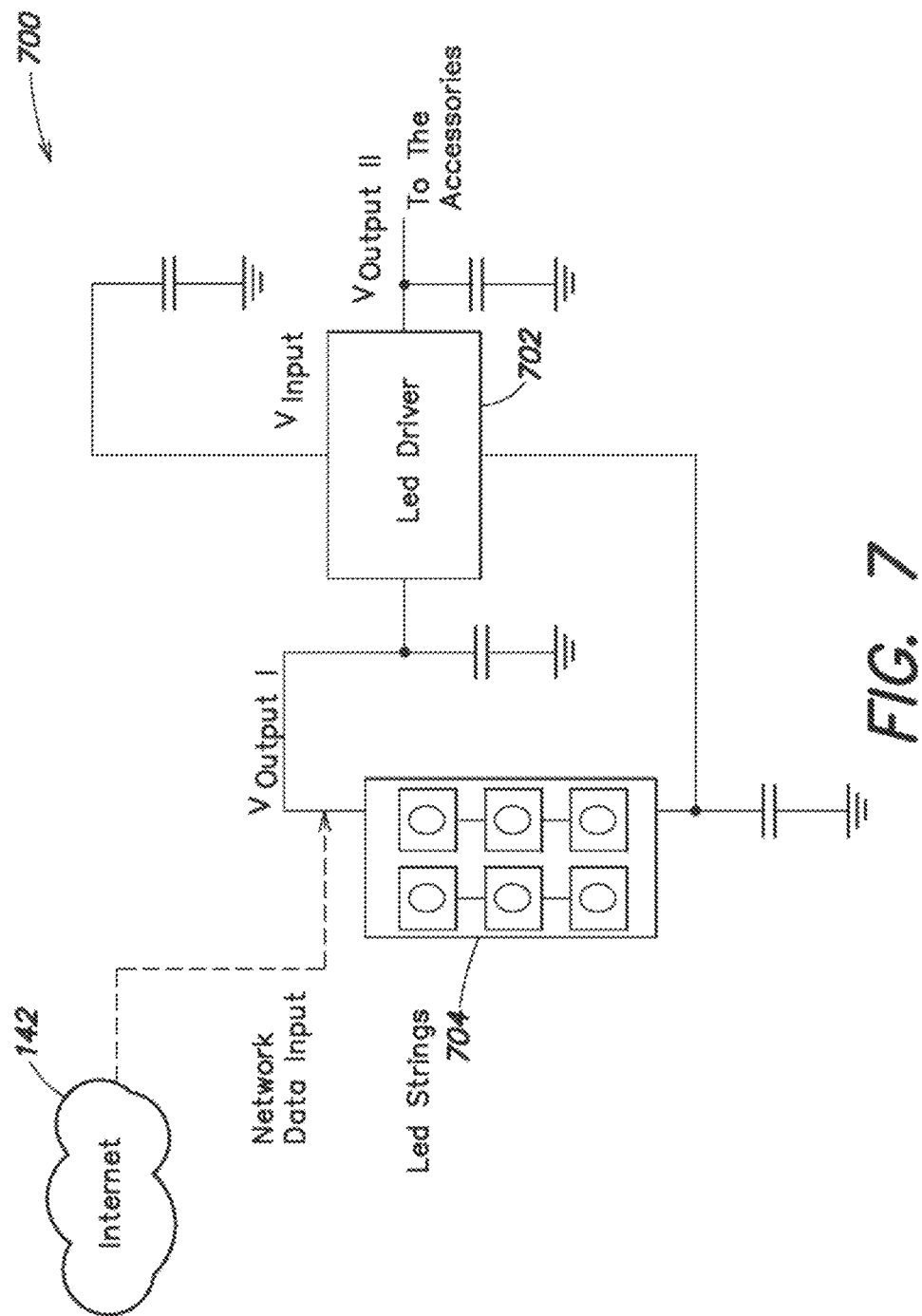
FIG. 7 depicts a power management module, in accordance with an embodiment of the present invention.

FIG. 7 depicts a smart power management module 700, in accordance with an embodiment of the present invention. The figure illustrates an LED driver module 702 that may be connected to a power supply (power input).

As illustrated in the figure, the LED driver module 702 may provide power output to LED strings 704. These LED strings may be a part of the lighting systems 102. In addition, the LED driver module 702 may provide low voltage power output to the accessories associated with the lighting systems 102. The accessories may include sensors, network modules, management modules, user interfaces, and some other types of accessories.

Additionally, the power management module 700 may be provided with a network data input via network 142, to control the power provided to the LED strings 704. In embodiments, a data input for the receipt of analogue and/or digital data may also be provided.

'Easily replaceable' by the users may be a significant feature of the modular LED lighting systems. In light of this, a modular LED luminaire 802 consisting of different types of luminaires based on functionality may be used to replace existing lighting fixtures. The different luminaires may be a 'master' luminaire and a 'slave' luminaire. The master luminaire may connect directly to an existing AC drop by mechanical or electrical means and in turn may provide an auxiliary low voltage power output to the lighting system. Subsequently, one or more 'slave' luminaires may connect to the auxiliary low voltage power output, thereby, facilitating installation of luminaires without the expense of running additional electrical conduit.

In another embodiment, the modular LED luminaire 802 may include a 'master' power management module 112 and one or more 'slave' luminaires. Similar to the 'master' luminaires, the 'master' power management module 112 may be connected (mechanically or electrically) to an existing AC drop and may provide a low voltage power output. The 'slave' luminaires may connect to the low voltage power output and may be installed without the expense of running additional electrical conduit. As a result of this configuration, a reduction in wastage of power may be achieved.

Figure 21A:
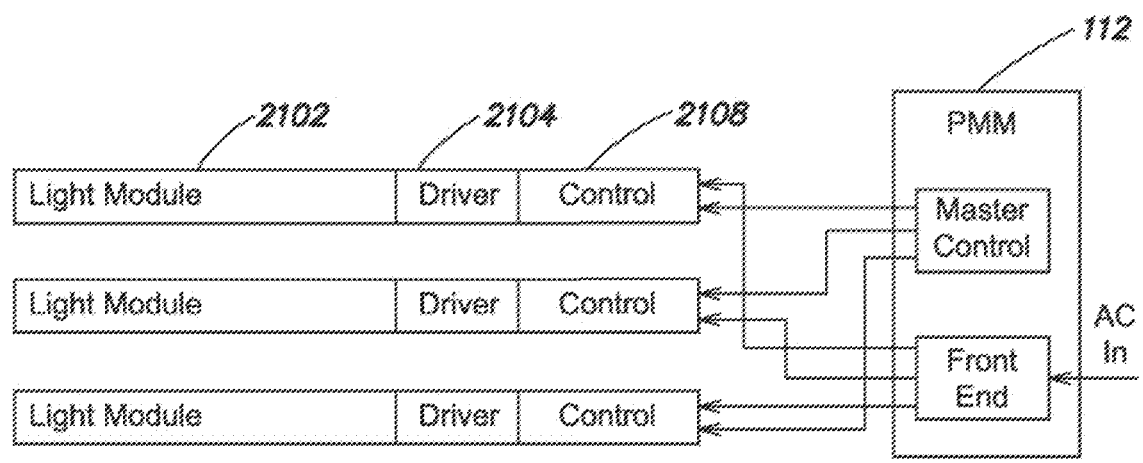
FIGS. 21A and 21B depict a fixture with intelligent light modules.
Figure 21B:
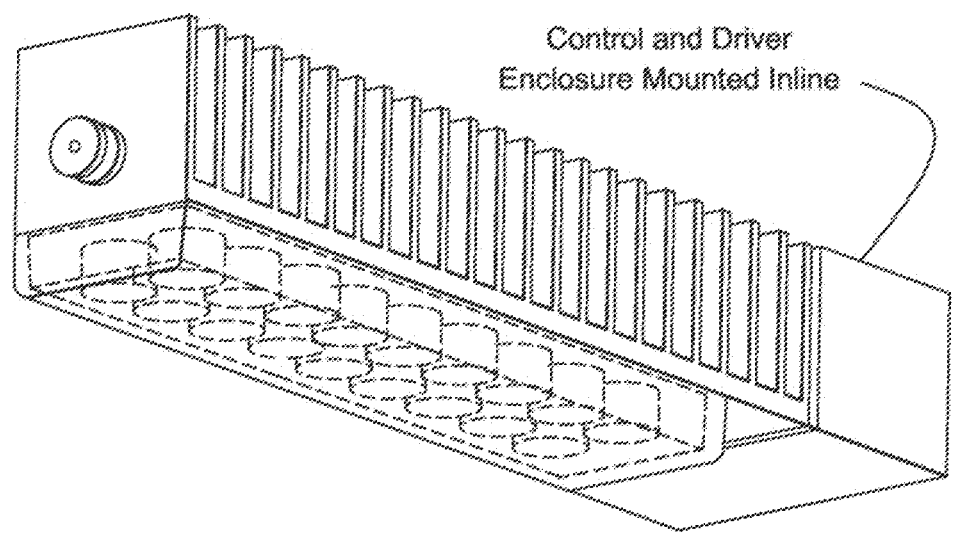

Referring to FIGS. 21A and B, a fixture with intelligent light modules is depicted in a schematic (A) and in profile (B). The lighting fixture includes a plurality of LED light bars (light modules 2102) mounted within a housing and a power management module (PMM) 112, wherein the intelligence and power conversion lives in both the PMM 112 (master control) and onboard the light bars. The lighting fixture may be associated with a processor in communication with the LFD light bars. The processor may be used for controlling the LFD light bars. The LED light bar's driver 2104 and control electronics 2108 may be disposed within an enclosure mounted in line with the axis of rotation of the bar, to preserve airflow to a heat sink of the fixture. The PMM 112 may be arranged to receive local sensor input and to adjust an intensity of light emitted from the plurality of LED light bars in response to the received local sensor input.

Figure 23:
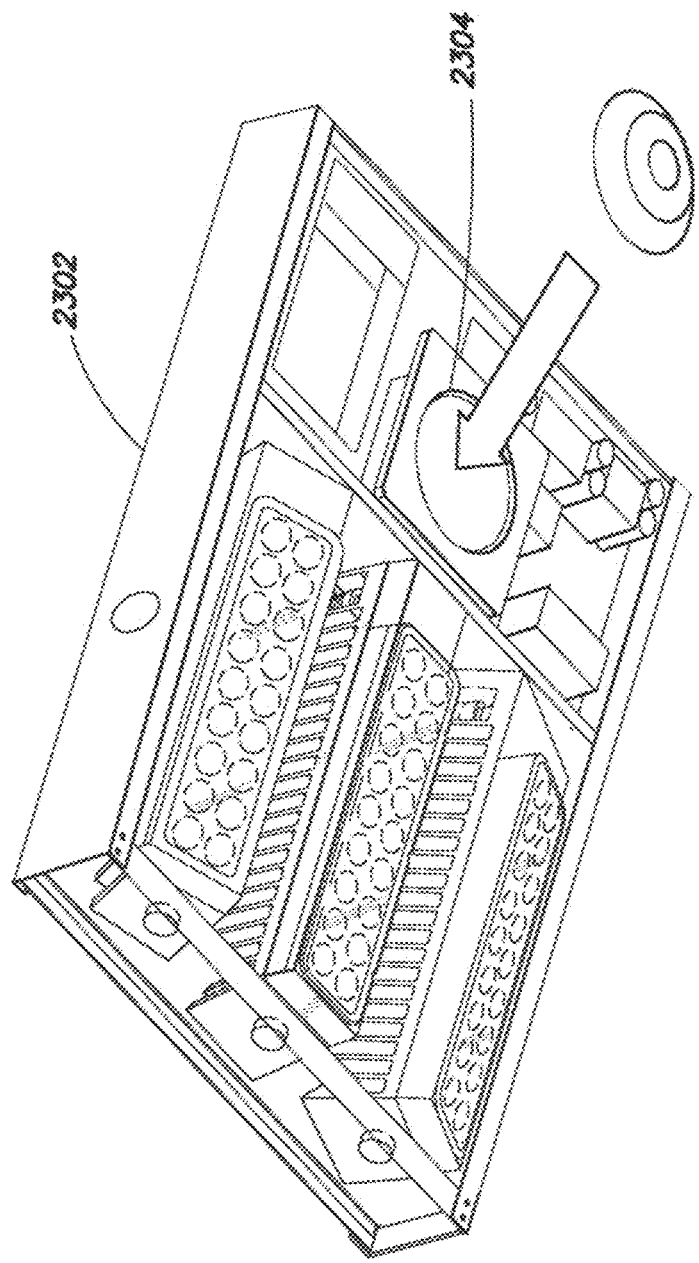
FIG. 23 depicts a fixture with integral sensor bay.

Similarly, another intelligent design may include an integrated sensor enclosure such as a small bay that may be associated with the power management module 112. This bay or enclosure may protect the various sensors associated with the power management module 112 from any type of mechanical or other impact. For example, a fabricated bay may protect the temperature sensor 120 in the power management module 112 from forklift. In addition, this mechanism may keep the surface of the lens inside the assembly close to the bottom plane of the fixture thus allowing maximum angle or coverage and minimum obstruction for sensors. The sensors may be both field-installable and field-swappable. The optical element for each sensor module may be field-swappable based on usage. The usage may be end of aisle vs. center vs general wide field-of-view. Examples of the various sensors that may be provided inside the integrated sensor enclosure may include Passive Infra Red (PIR) occupancy sensor, ambient light sensor, radiation sensor, particulate sensors, and some other types of sensors. Referring to FIG. 23, a fixture with integral sensor bay is depicted. In FIG. 23, a recessed or ceiling style occupancy sensor 2304 is integral with the fixture 2302. The sensor 2304 may be embedded inside a protected area of the fixture 2302, such as within a cavity designed to provide mechanical and electrical connectivity for a standard sensor module 2304 with features designed to protect it from damage before, during or after installation. The sensor module 2304 may have swappable lenses, where a variety of lenses may be carried on a "lens wheel" and easily rotated into place by a user, such as an installer. The surface of the sensor module lens may be arranged to be close to a bottom plane of the fixture 2302 to achieve a maximum of sensor input angles. In some embodiments, at least one of the plurality of LED light bars mounted in the fixture 2302 is modified by an optical assembly to emit a different beam pattern.

Likewise, the optical elements for each sensor may also be field-installable and field-swappable. For example, depending on the usage, the optical elements of the sensors 120 may be replaced (for use in the end of aisle, at the center, and/or a general wide field of view.) The various optical elements may be selected via a selecting mechanism such as a lens-wheel, thereby rotating different optics in front of the sensor. This selection and rotation procedure for sensor optical elements may allow an installer to select the proper optical configuration at time of installation. There may be various other selecting mechanisms such as on-off switches, variable control devices (sliders, knobs, wheels etc.), buttons, touch interfaces, keypads, momentary switches, voice-recognition systems, and some other types of selecting mechanisms.

In an aspect of the present invention, practices for smart power management may be applied. In accordance with an embodiment a power management module such as a power management module 112 may include an input power source, a controllable power output, and a microcontroller. The power output may be used for connecting the light bar and the microcontroller may modulate power delivered to each of the power outputs.

In an embodiment, the power management module 112 may provide a low voltage output for powering add-on sub-modules such as sensors 120, network interfaces, and some other types of sub-modules. Similarly, power management module 112 may provide a data input for these sub-modules so that control signals may be transmitted from sub-modules to the module 112. The power management module may provide power to the LED light bars.

Figure 24:
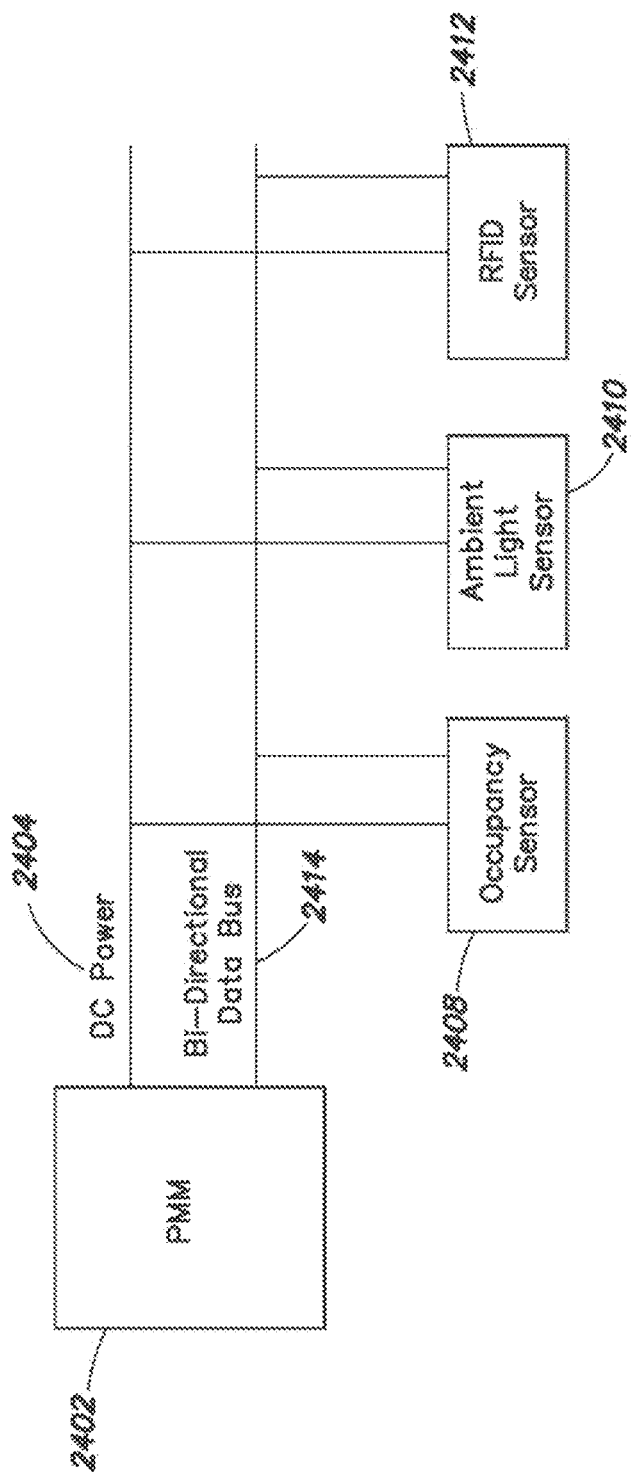
FIG. 24 depicts a power management module with modular sensor bus.

Referring also to FIG. 24, a power management module may be associated with a modular sensor bus. Fixtures may have more than one sensor connected to them, with all of the sensors simultaneously observing some characteristic of the environment and passing that information back to the fixture. One way to facilitate this would be to have multiple distinct sensor inputs on the PMM, but an alternative way is a digital bus which can carry multiple sensors. The PMM 2402 may output DC power 2404 to supply multiple sensors, such as occupancy sensors 2408, ambient light sensors 2410, and RFID sensors 2412 and may provide a bi-directional data bus 2414 to gather information from the multiple sensors, where the sensors place data on the bus which may be formatted according to a standard protocol In some embodiments, the sensors may be able to identify themselves (and their "type") to the PMM. The PMM may respond differently to different sensor types as so identified.

Figure 25:
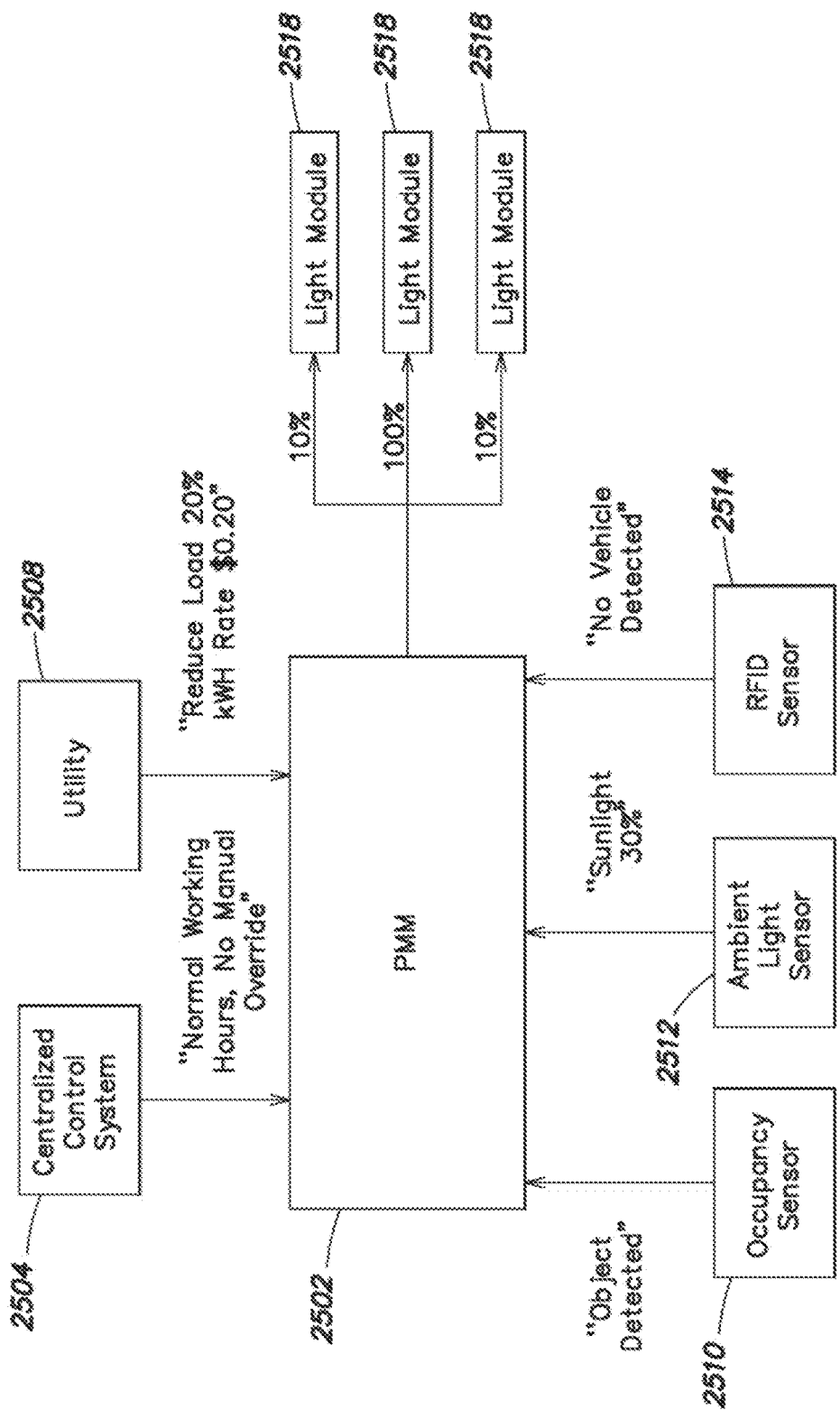
FIG. 25 depicts a power management module with multi-input arbitration.

Referring to FIG. 25, a power management module with multi-input arbitration is depicted. The power management module may arbitrate among input signals related to lighting control to powering the lighting fixtures (LED light bars). The lighting fixtures may receive command inputs from multiple sources, such as a centralized control system 2504, a utility 2508, an occupancy sensor 2510, an ambient light sensor 2512, and an RFD sensor 2514, sensors connected to the fixture, sensor data conveyed from a remote sensor via a network, centralized commands, utility inputs, and the like. The PMM may process all of these inputs and then set the fixture's light level or each individual LED light bar's 2518 light level and power consumption based on a set of rules stored in the PMM's memory. The rule may determine a weight to apply to each of the input signals, combines those weighted signals via an arbitration algorithm, and determines the adjustment to the LED lighting system parameter according to the output of the algorithm In an example, the fixture may have four inputs, an occupancy sensor onboard the fixture which relays binary input (occupied/not occupied), an ambient light sensor onboard the fixture which relays digital input on the amount of light sensed, an operating mode input relayed from a central controller via network that provides tri-state input (ACTIVE, INACTIVE, OFF) based on a parameter, such as time-of-day, and a demand response state (DR) input which may be relayed from a central controller via network and which may originate with a utility that provides binary input (event/no event). The PMM may listen to all input sources, and decide what power level should be delivered to each of the associated light bars or lighting fixtures.

In environment 100, one or more input signals for controlling the functioning of the lighting systems may be provided from any of a variety of sources. For example, control signals may be transmitted by sensors 120 (for occupancy, ambient light, temperature, and some other factors), or by wired/wireless network 142. These input signals may be in turn received by the microcontroller which may associate a "weight factor" or "relevance weight" to the signals. The weighted signals may be further combined using an appropriate algorithm such as an arbitration algorithm. As a next step, the output of the arbitration algorithm may be used to set the controllable power outputs.

Figure 26:
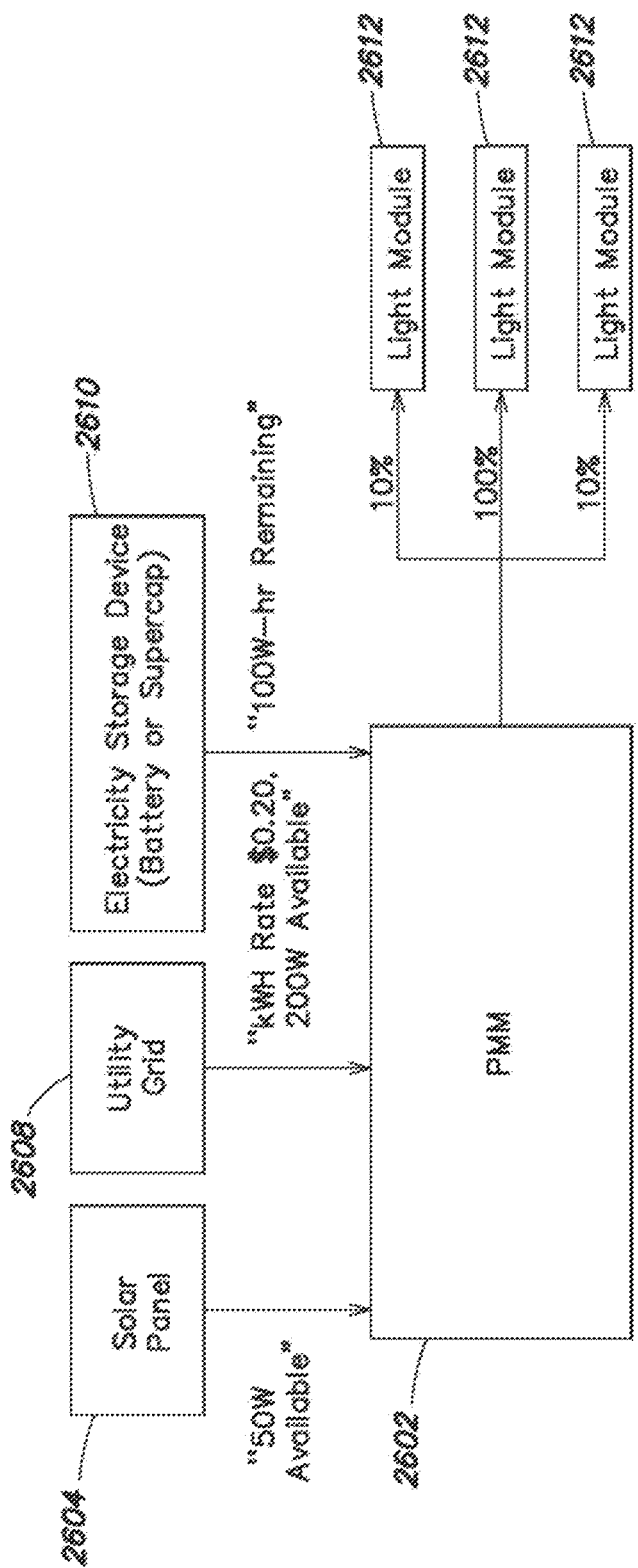
FIG. 26 depicts a power management module with power source arbitration.

Referring to FIG. 26, a power management module 2602 may be associated with power source arbitration. The PMM 2602 may retrieve power consumption information of power sources and may arbitrate among the power sources for powering the LED light bars. The PMM 2602 may modulate power drawn from multiple power inputs based on real-time or static information about the impact of each input, whether that impact is economic ($), environmental (renewable vs not), or practical (amount of power available or remaining in source). A fixture 2612 may include a PMM and multiple power input sources 2604, 2608, 2610, where the PMM 2602 receives information about the power sources such as price per kWh, amount of kWh remaining in a storage device, or instantaneous power available from a renewable energy source and may set the intensity, and thus power consumption, of the fixture 2612 based on this information and rules stored in the PMM 2602. The PMM may combine the impact information via an arbitration algorithm, and select which power input to utilize based on the output of the algorithm in accordance with at least one rule stored in a memory of the processor. For example, a fixture may consume 100 W maximum at full intensity. The fixture may have three potential power sources: solar 2604, utility grid connections 2608, and a battery 2610. The solar input may be capable of providing 50 W maximum (Available power=S; Power used by fixture=Ps), the utility grid connection may be capable of providing as much power as needed (Power used by fixture=Pu), and a high-capacity battery may be capable of storing up to 500 W-hr and may consumer power in charging (Available capacity=B; Charging power supplied to battery=Cb; Power used from battery=Pb). The PMM 2602 may have a target power output (T) based on sensor input, manual input, or command input from a centralized controller.

The microcontroller may understand the relationship between the power delivered to each light bar and the luminous efficacy (the indication of how well the light source provides visible light from a given amount of power/electricity) of each light bar. This information may be used by the microcontroller to maximize fixture efficacy over a period. The efficacy of an LED fixture (how much light is produced per unit power input) is not constant over the fixture's power range. When the fixture is driven at high power levels, the thermal stress on the LEDs makes the efficacy fall off, and at low power levels, the fixture may not be able to deliver sufficient illumination to the environment. If the fixture has a microcontroller onboard which internally stores an accurate model of the fixture's efficacy (say, as a function of one or more variables such as ambient temperature), the fixture may be operated at a power level that maximizes efficacy while still providing a sufficient amount of light given the current values of the relevant variables.

In another embodiment, information about relative price of power (pricing signals) consumed by each of the input power sources may be received by the microcontroller. These pricing signals may be combined using an arbitration algorithm. Further, based on the output of the algorithm, the microcontroller may select which input power source to utilize further and which input power source may be halted.

In an embodiment, the source of the input power may be an energy storage device such as battery, ultra-capacitor, and some other device or energy obtained through energy storage facility 184. The storage device may be connected directly to the luminaire or group of luminaires. As shown in FIG. 1A, the energy storage facility 184, AES 128, and UES 180 are all associated with the lighting systems 102 in the environment 100.

In certain cases, the smart power management module or module 112 may also provide indications regarding status (e.g. need for replacement) of the light bars or light modules 604 to the users and/or operators.

Figures 9A, 9B:
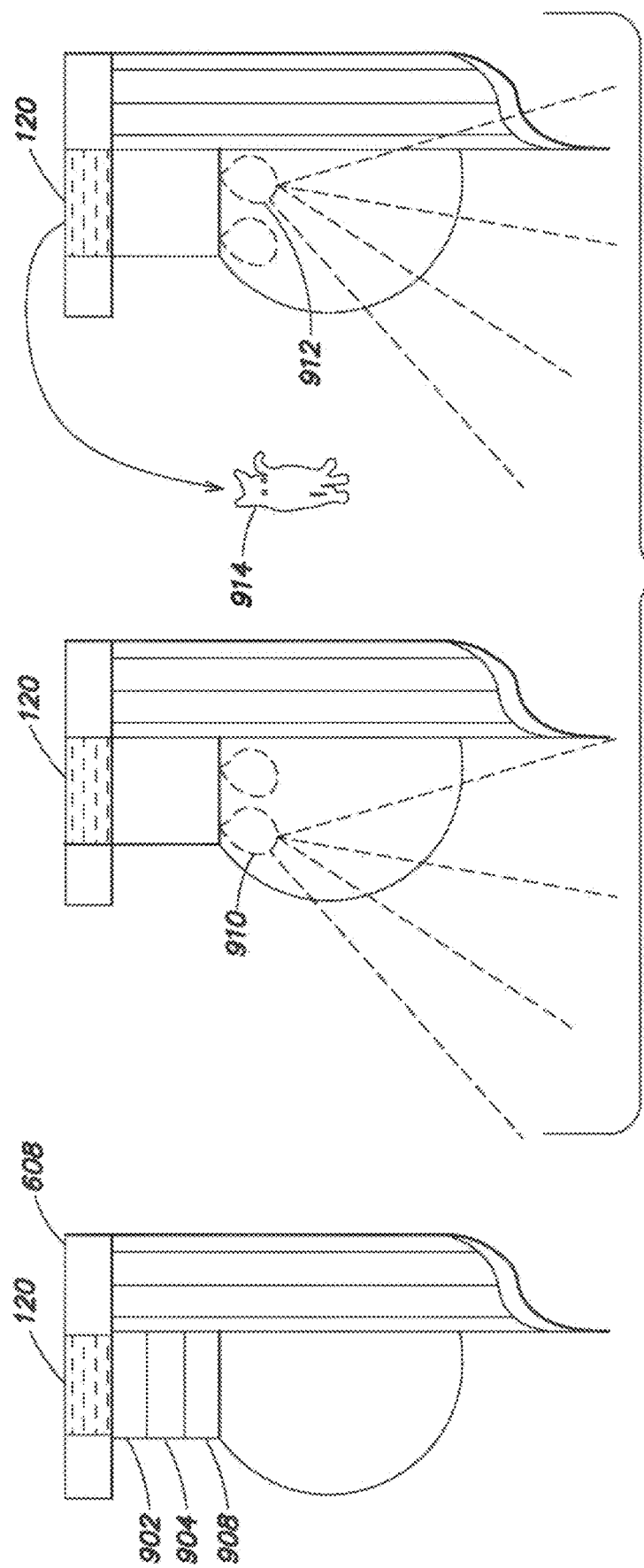
FIGS. 9A and 9B depict a mechanism of status indication by colored LEDs on luminaires, in accordance with an embodiment of the present invention.

For example, as shown in FIG. 9a, a RGB—tricolor LED on a light bar and/or power management module 112 may indicate that the light bar has a tungsten filament (indicated by red (R) color 902), variable beam angle (indicated by green (G) color 904), and luminous flux of 600 lumens (indicated by blue (B) color 908). Similarly, different color codes may be used to indicate various other features of the light bar.

In another embodiment, the colored LEDs on the light bar may blink according to a code to indicate the type of light bar to be replaced. FIG. 9b depicts another light bar in which red LED 910 blinks in case of emergency, and a blue LED 912 blinks in the case when the sensors 120 detect the presence of an object 914 in the vicinity.

In yet other embodiments, a handheld scanner may be used for reading encoded Infra Red (IR) or visible light from the luminaire to determine its type. The scanner may be activated with laser detector or IR hand-shake.

Alternately, the light bar information may be transmitted to a remote diagnostic equipment or a repository such as a database including information regarding make and specifications of each type of light bar via wireless means (e.g. radio frequency waves.)

The power may be modulated in the power management module 112 by connecting light bars in various configurations. For example, the light bars may be connected in series and shunted across a specific/individual light bar to throttle its brightness.

The power management module 112 may also intelligently detect the presence of a dead or non-working light bar by sequencing through output channels and detecting power consumption at each step.

In an embodiment, the power management module's power output may be combined with a TVS shunt located on the light bar. For example, consider a series of LED bulbs and a shunt in a lighting circuit. In case a light bulb is damaged from the series, the power management module 112 will receive this information and immediately redirect or rebalance the voltage load on the remaining light bulbs. It may happen that the remaining light bulbs will stop working, but this will thwart any damage such as fuse of the entire series of light bulbs.

In addition to various control functions, the power management module 112 may also be associated with measurement and verification functions. This may be similar to the measurement and verification module 170 of the 'master' or central management systems 134, as explained in FIG. 1B.

The measurement and verification functions may also be performed by sensors such as a power sensor that may be located on the AC input. Alternately, the measurement and verification may be performed by a light sensor positioned to sample reflected light from the fixture's beam.

All the above power managements may be logged for auditing purposes. This information may be further utilized for cross-checking the total generation and consumption of power within the environment 100.

In an aspect of the present invention, the power management module 112 may estimate the extent of visibility of optical elements (lenses, mirrors, and elements in the reflector system) associated with the luminaire. The estimation may be conducted by sensing and measuring light both inside and outside the luminaire, and comparing the two measurements. For example, if the power management module finds more than five percent change in the two measurements, it may be deduced that the lens was dirty. This type of 'dirtiness' measurement may be extended to other optical elements as well.

Upon receiving a 'dirtiness' measurement, the power management module 112 may notify the user or operator to clean the optical element. The alert may be issued if the measurement exceeds a pre-defined level (say 5%.)

In certain cases, expected light loss due to dirty lens or optical element may be established based on the measurements deduced either by power management module 112 or measurement and verification module 170. In addition, this may be followed by actions such as overdriving the luminaire and/or re-routing the power to buffer luminaires (the luminaires that may be utilized in case the original luminaires stop working.)

In another embodiment, the 'dirtiness' measurement may be utilized for logging purposes for future foot and candle (ft-candle) delivery auditing.

Further, an interaction between the power management module 112 and each light bar may facilitate determination of individual light bar characteristics. For example, the power management module 112 may determine beam angle for one light bar, rotational position for other, and lumen output for some others. Similarly, other characteristics of the light bars, such as correlated color temperature (CCT), run hours etc. may also be determined.

The communication channel between power management module 112 and each light bar may be using MCU, EEPROM, or some other digital communication channel In another case, a mechanism may be integrated into the mechanical structure (fixture frame 608) and/or light bar for sensing angular position of the light bar inside the frame. Examples of such mechanisms include encoder style code on end plate, accelerometer, and some other types of mechanisms.

In another embodiment, a passive encoding mechanism may be used. For example, electrical contacts with encoded bit pattern may be stored in optics holder (fixture frame 608) or passive RFID.

In yet other embodiments, a passive power-up modulation sensing scheme (e.g. delta-t to full current consumption) may be used enabling the PMM and LED light bar to communicate without a dedicated channel. One of the ways this could happen is for the PMM to apply full voltage to the LED light bar upon initial power-up, but intelligence onboard the LED light bar could cause the bar to consume a specific current profile over the first, say, 1 second from initial application of power. The PMM could monitor this current consumption, and analyze it to figure out what kind of LED light bar was attached. For example, given LED light bars, A and B, LED A bars could be programmed to delay 500 ms before drawing full current upon initial power-up, and B bars could be programmed to draw full current immediately. The PMM then can monitor the current consumption, such as via a simple current sensor, and use a simple timer to distinguish between the two types. More complicated schemes could provide even more information about the light bars' capabilities.

Figure 27:
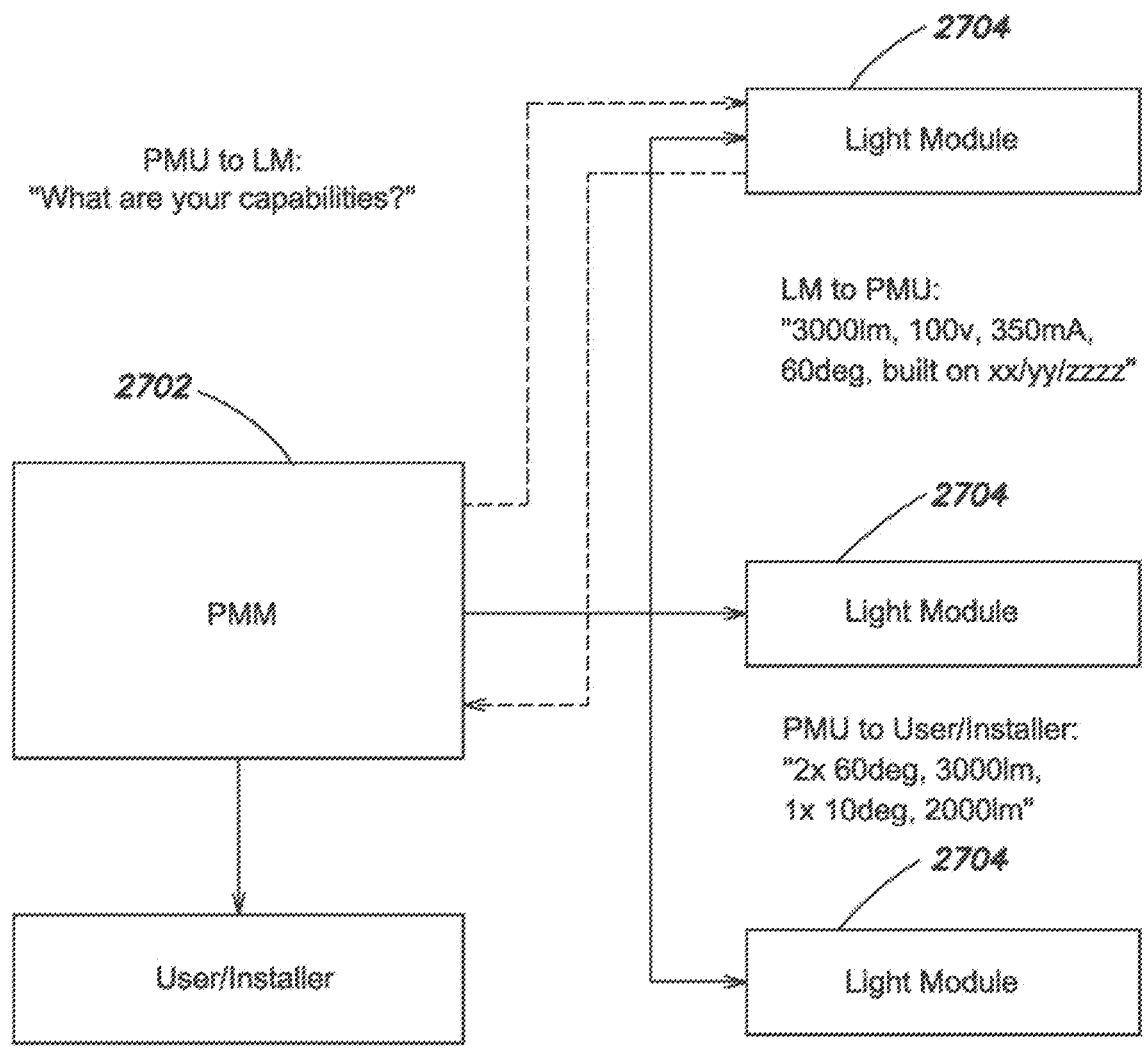
FIG. 27 depicts a power management module with light module identification.

Referring to FIG. 27, a power management module 2702 may be associated with light module identification feature. Each light module 2704 may have identification data programmed into it, and can communicate that information to the PMM 2702, which can in turn store and communicate that information to a user or installer to aid in replacement or commissioning. The PMM 2702 may receive identification data from the light module. The identification data may be stored in a nonvolatile memory onboard the light module 2704, and communicated via a digital bus to the PMM 2702. The identification data may be stored passively on the light module, such as via a series of jumpers or dip switches, and can be read by the PMM. The passive storage may include electrical contacts with encoded bit pattern stored in an optics holder. The passive storage may include passive RFID. The identification data may be stored via a mechanism integrated into the housing and/or light bar for sensing angular position of the LED light bar inside the housing. The mechanism may include an encoder-style code on an end plate of the LED light bar. The mechanism may include an accelerometer disposed on the LED light bar. The identification data may be stored via a passive power-up modulation sensing scheme, such as delta-t to full current consumption. The processor may be able to signal LED light bar type to users or operators for light bar replacement purposes. The signal may be via a tricolor LED on the LED light bar or PMM with the LED light bar type indicated via color code, via an LED on the LED light bar or PMM which blinks according to code to indicate LED light bar type, via a handheld scanner which reads encoded IR or visible light from the lighting fixture to determine type, and can be activated with laser detector or IR handshake, or via RF transmission of LED light bar types to remote diagnostic equipment.

In an aspect of the present invention, the power management module 112 may be designed such that they may be easily replaced and upgraded on field, e.g., environment 100. In this regard, the power management module 112 may include an auto-calibration feature. This feature may determine various electrical characteristics necessary for providing power to each light bar. Examples of electrical characteristics may include but not limited to chronological age, elapsed run time, forward voltage, optimal drive current, maximum drive current, and some other characteristics.

The various electrical characteristics may be stored in a nonvolatile memory onboard each light bar. Examples of the nonvolatile memory may include read-only memory, flash memory, memory in computer storage devices (hard disks, floppy disks, and magnetic tapes), optical discs, punch cards, and some other types of memory. In certain cases, there may not be a direct and continuous measurement of the electrical characteristics but determination may be made based on the previous measurements and calibrations. In some other cases, a subset of characteristics may be used to predict the other electrical characteristics. For example, determination of the run time may be linked to the chronological age of the lighting systems.

Figure 28:
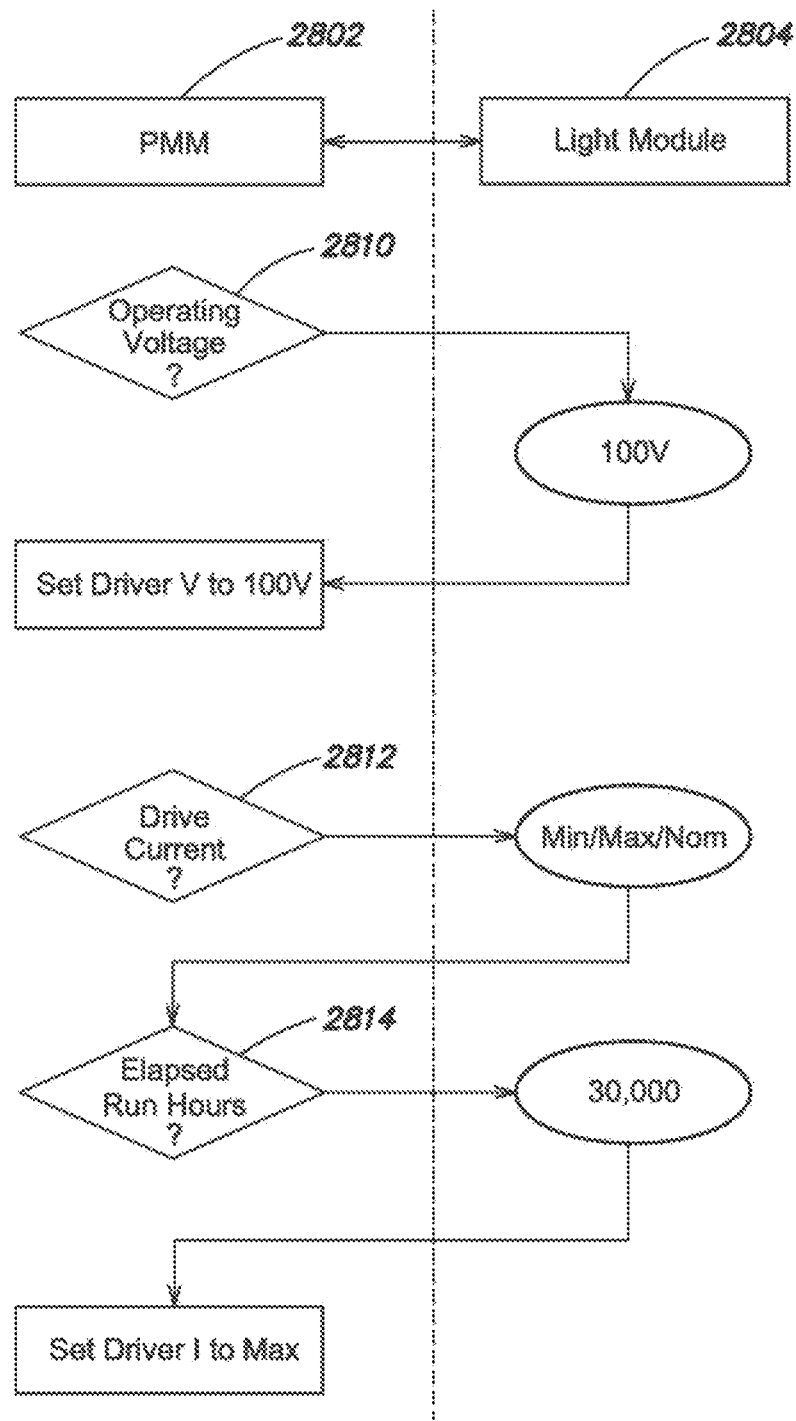
FIG. 28 depicts a replaceable power management module with auto-configuration.

Referring to FIG. 28, a replaceable power management module may be associated with auto-configuration capability. The PMM 2802 uses identification data about the light module(s) 2804 to which it is connected to configure its outputs. The PMM 2802 may automatically adjust power provided to the LED light bars based on the identification data. The PMM 2802 may have the ability to determine light module characteristics, such as operating voltage 2810, drive current 2812 [min/max/nominal], thermal constraints [max ambient], elapsed run hours 2814, and the like, and configure its own outputs to match the optimal operating parameters of the light modules 2804. The LED light bar may auto-calibrate the power input to each LED light bar based on the light module characteristics. The identification data may be stored passively on the LED light bar and can be read by the processor. The passive storage may include electrical contacts with encoded bit pattern stored in an optics holder. The passive storage may include passive RF ID. The identification data may be stored via a mechanism integrated into the housing and/or light bar for sensing angular position of the LED light bar inside the housing. The mechanism may include an encoder-style code on an end plate of the LED light bar. The mechanism may include an accelerometer disposed on the LED light bar. The identification data may be stored via a passive power-up modulation sensing scheme, such as delta-t to full current consumption. The processor may be able to signal LED light bar type to users or operators for light bar replacement purposes. The signal may be via a tricolor LED on the LED light bar or PMM with the LED light bar type indicated via color code, via an LED on the LED light bar or PMM which blinks according to code to indicate LED light bar type, via a handheld scanner which reads encoded IR or visible light from the lighting fixture to determine type, and can be activated with laser detector or IR handshake, or via RF transmission of LED light bar types to remote diagnostic equipment.

In another aspect of the present invention, the power management module 112 may include a temperature sensor. Based on the measurements from the sensor, the module 112 may adjust LED drive current. For example, in colder regions where temperature drops below zero degrees centigrade, the module 112 may adjust the drive current such that there is no irreversible damage to the lighting system.

In an embodiment, the temperature sensors may be located near the light bars such that the temperature is sensed directly.

In other embodiments, only ambient temperature (outside the fixture) may be measured and LED operating temperature extrapolated based on the previous drive current, voltage, thermal characteristics measurements (similar to predicting a characteristic based on some other characteristics, as explained earlier.)

It is an object of the present invention that the presented modular LED lighting systems 102 address various thermal and optical requirements of the lighting systems.

Figure 10:
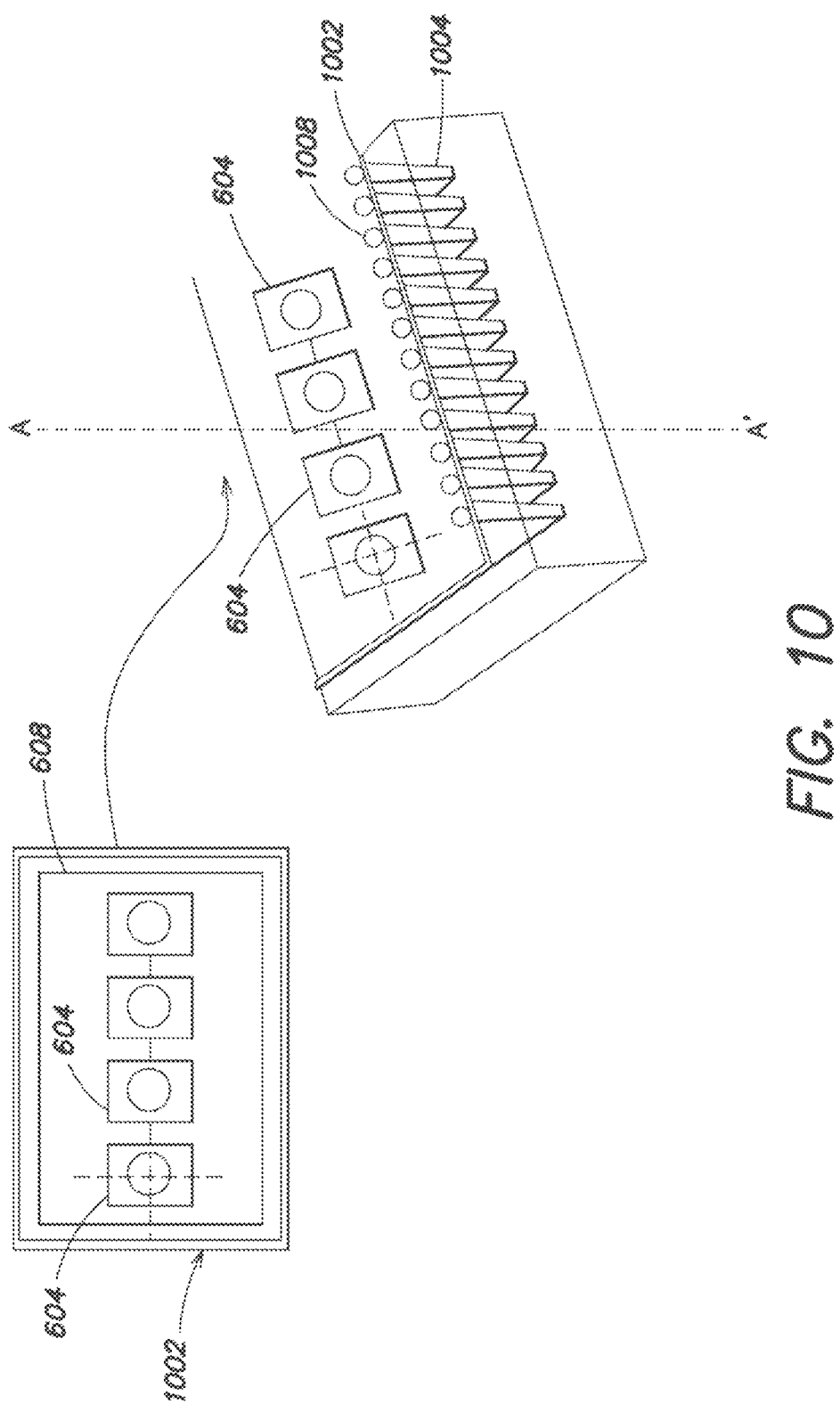
FIG. 10 depicts a finned heat sink design for thermal management in lighting systems, in accordance with an embodiment of the present invention.

With regard to this, a good thermal system design ensures high efficiency and reliability of lighting systems. In an aspect of the present invention, heat dissipation systems such as heat sinks may be designed for the LED light bars. Dissipation of heat from the heat source (in the light bar) into the surrounding environment may take place through a heat sink. The entire process may be concluded in four steps. As a first step, heat is transferred from heat source to the heat sink followed by conduction from within the heat sink to its surface, then transferred from the surface into the environment. In some cases, radiation loss based on the surface of the heat sink may also take place. Conventional heat sinks may primarily be flat plate; die-cast finned type, and extruded finned type. Materials used for preparing the heat sinks may include aluminum, copper, and some other types of material. In accordance with an embodiment of the present invention, a heat sink, such as a finned heat sink may be used. The heat sink fins may be oriented perpendicular to the axis of rotation of the LED light bar. FIG. 10 depicts a finned heat sink 1002 associated with the light modules 604 (light bar). Fins 1004 of the heat sink 1002 are perpendicular to the length of the light module 604. The light module as described herein may also be referred to as a light bar. These terms are generally meant to be interchangeable herein except as would be understood based on context.

In accordance with another embodiment of the invention, the long edges or fins of the heat sink may be 'undercut' to facilitate additional airflow between the heat sink surfaces.

Figure 29:
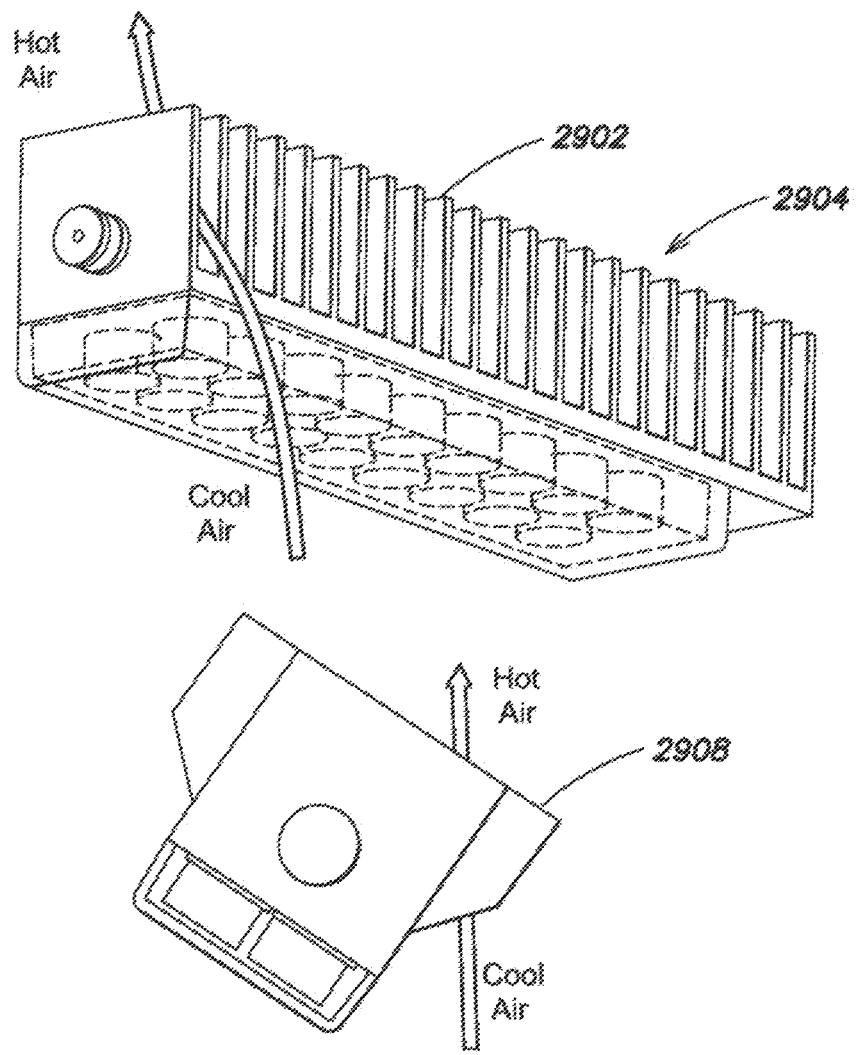
FIG. 29 depicts a rotatable light module with cross-cut heatsink.

In an embodiment, cross-sectional profile of the heat sink may be designed to perform optimally within a continuous range of rotation along the long axis of the light bar. For example, the light module 604 can be rotated 60 degrees to either side of vertical axes AA', therefore the heat sink 1002 may be constructed so as to ensure that the dissipation of heat is not affected when the light module is rotated (continuously or intermittently) to either side. Referring to FIG. 29, a rotatable light module 2904 with cross-cut heatsink 2902 is depicted. Orienting the fins of the heatsink perpendicular to the axis of rotation gives better airflow at all rotational angles. Undercut fins 2908 can expose even more area to airflow when bar is rotated away from vertical.

Various embodiments of the present invention provide methods and systems for imparting an efficient thermal management system for the lighting systems. Some of these methods have been explained below in conjunction with suitable examples.

An ultra-low profile luminaire may be designed for direct thermal transfer into concrete or other surface material. For example, lighting systems mounted on the walls and poles of places such as parking lots, aisles, and stairs may utilize the concrete structure for dissipation of heat. Specifically, the pole-mounted luminaires may be designed to couple to a heat dissipating apparatus (a small heat sink) already existing on the mounting arm or pole to thermally transmit the heat.

Figure 30:
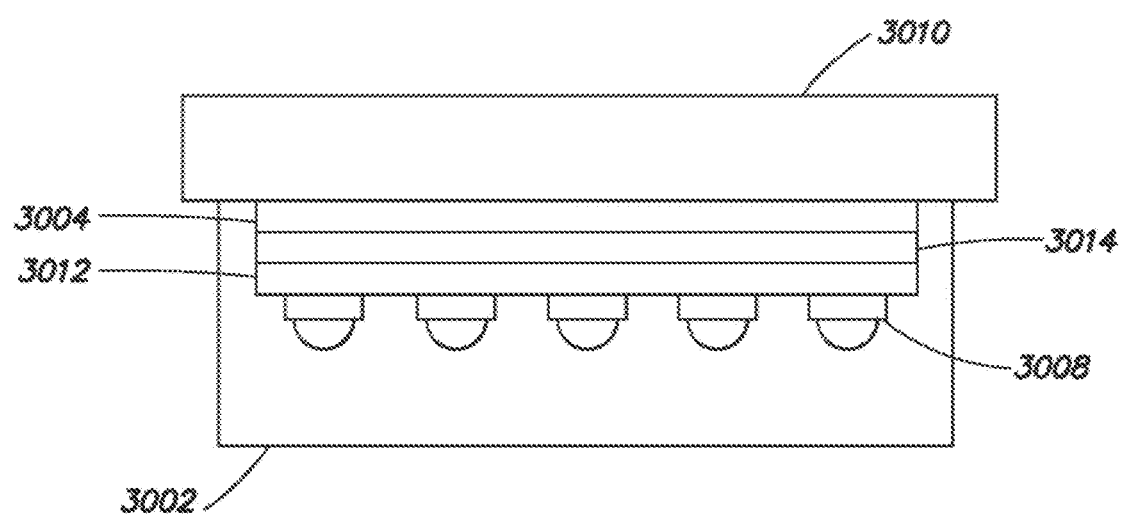
FIG. 30 depicts a thermal design for surface-mount fixture.

Referring to FIG. 30, a flush-mount fixture 3002, such as commonly used in parking garages, may not have sufficient room for air circulation around heat sink fins. However, concrete is a reasonably good thermal conductor, so coupling the LED heat source directly to the concrete surface may provide sufficient cooling. A fixture may be designed to be flush-mounted with an exposed thermal interface pad 3004 on the side that comes in contact with the mounting surface. The thermal interface pad 3004 disposed along a surface of the fixture in contact with a mounting surface enables transfer of heat energy from the LED light bars 3008 to the mounting surface 3010. The fixture may further include a PCB 3012, a heat spreader plate 3014, and the like.

Figure 31:
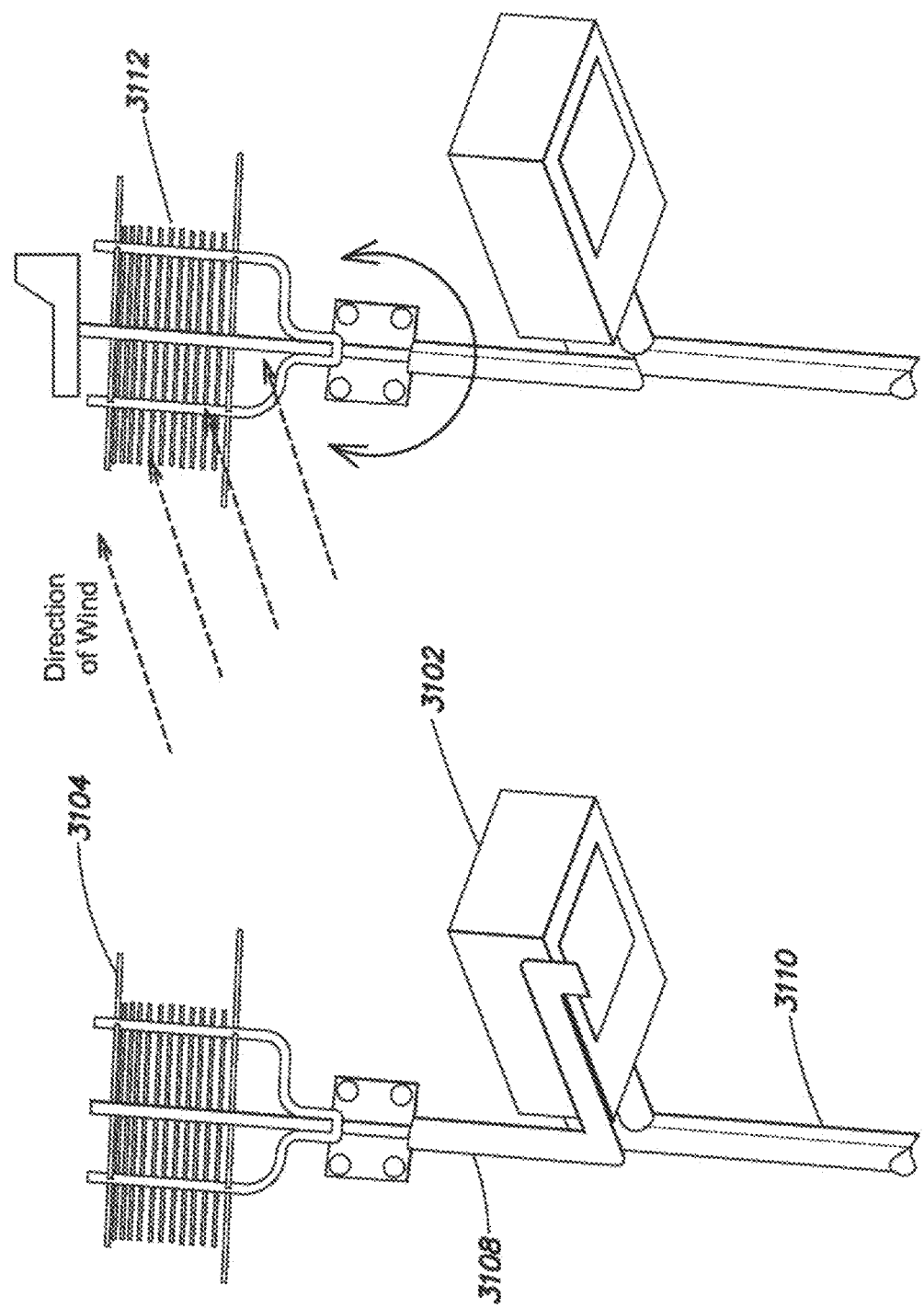
FIG. 31 depicts a thermal design for pole-mount fixture.

Referring to FIG. 31, a thermal design for a pole-mount fixture 3102 is depicted. Getting heat out of a sealed outdoor fixture may be a challenge. Integrating a heat pipe system 3108 where a radiator 3104 is attached to the fixture pole 3110 and the thermal transfer material flows through the fixture mounting socket may enable radiation of heat energy from the LED light bars. The radiator 3104 may be self-orienting into prevailing winds, such as a weathervane-style radiator 3112.

Similarly, an LED retrofit light module may be employed for outdoor luminaires that may incorporate a specific pattern of drilled-out holes 1008, as shown in FIG. 10, in the existing luminaire housing. This design may provide convective airflow to the retrofit module, thereby increasing dissipation of excessive heat.

In addition to the above design, the outdoor luminaires may also be combined with an integrated evaporative cooling element fed by rainwater or condensation, an integral solar-powered thermoelectric cooler to increase net fixture efficacy, and a heat sink that may be positioned automatically at an optimal angle to prevailing winds in order to maximize thermal dissipation.

Figure 32:
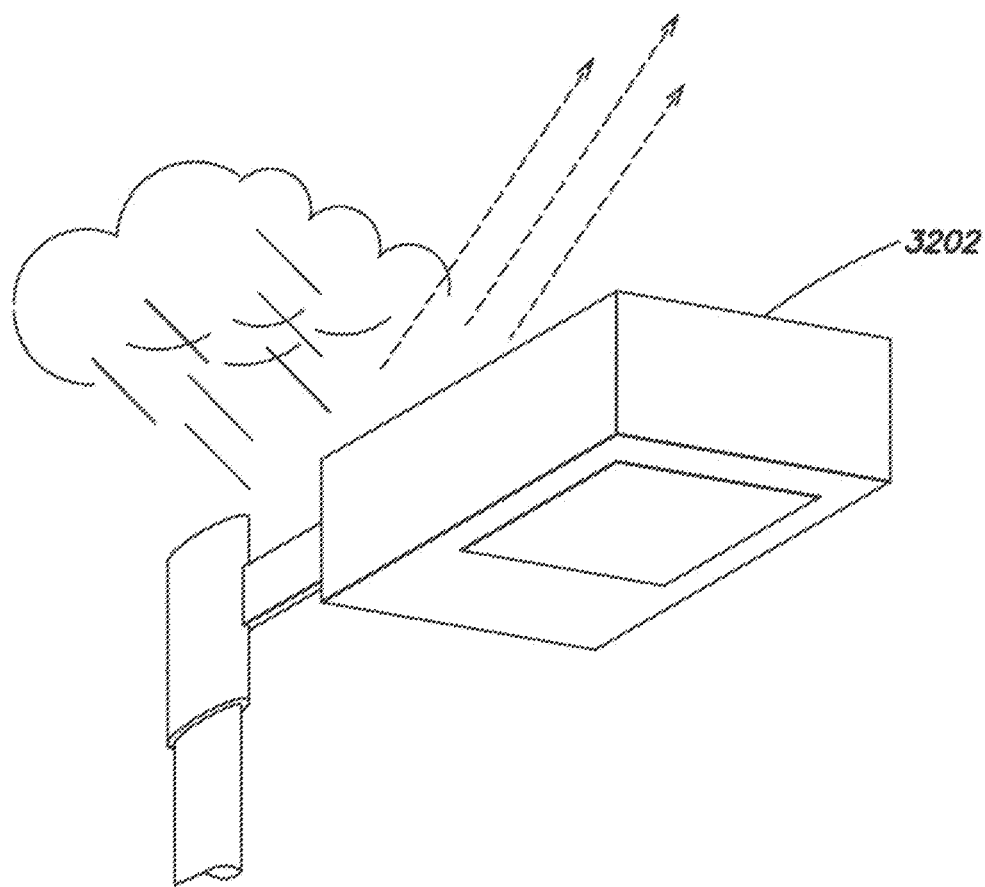
FIG. 32 depicts a thermal design featuring evaporative cooling.

Referring to FIG. 32, a thermal design for an LE) lighting fixture may feature evaporative cooling. The LED lighting fixture 3202 may store water inside the fixture housing in an embedded water reservoir to take advantage of evaporative cooling for thermal control purposes. The water may be atmospheric water, such as captured rain water, condensation, and the like. Water may evaporate from the reservoir, thus cooling the fixture. The fixture may include an evaporative cooling element in fluid communication with the water reservoir that absorbs heat from the LED light bar and causes the evaporative cooling of the fixture.

In another embodiment, the luminaire may be provided with a heat converter to convert waste heat into electrical power. This may result in boosting net fixture efficacy.

Figure 33:
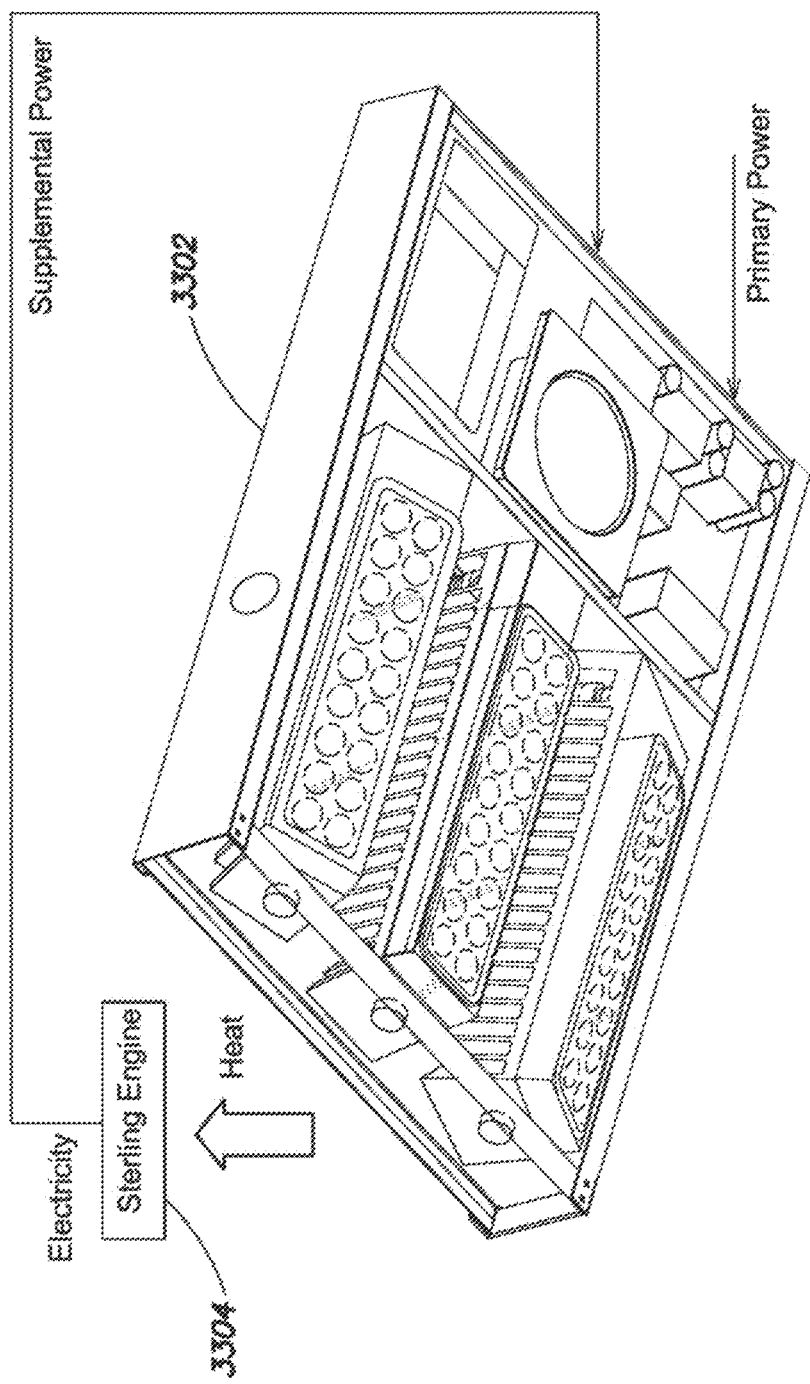
FIG. 33 depicts a fixture with waste heat harvesting.

Referring to FIG. 33, a fixture 3302 with waste heat harvesting to increase net fixture efficacy is depicted. Waste heat may be reclaimed from the fixture using a Sterling engine 3304 or other device to convert the waste heat into supplementary electricity. Further, the fixture 3302 may include a waste heat recovery facility disposed within the housing for converting waste heat from the LED light bar to electrical power. The fixture may include a circuit for directing the electrical power generated from the waste heat to a power input for the lighting fixture.

Figure 11:
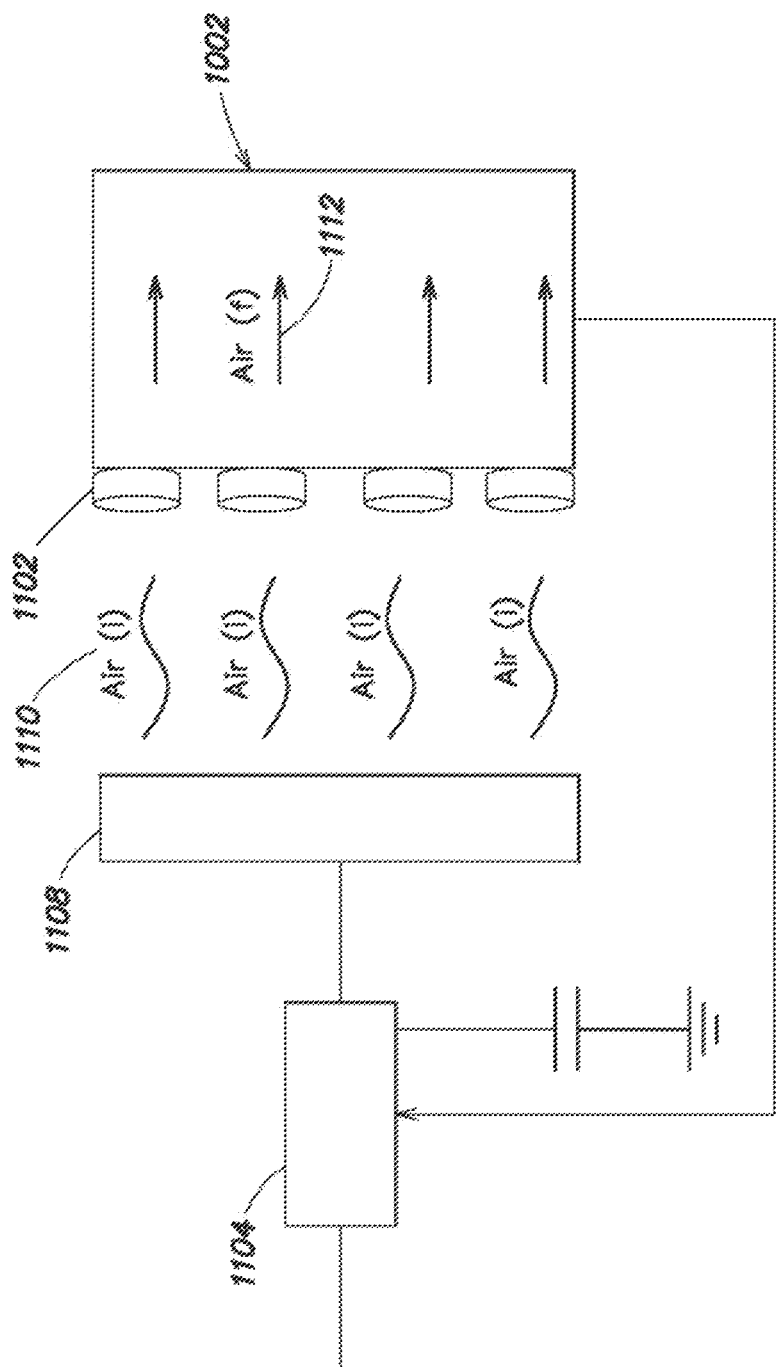
FIG. 11 depicts a passive electrostatic forced air cooling mechanism for thermal management in lighting systems, in accordance with an embodiment of the present invention.

In yet other embodiments, a passive electrostatic forced air cooling may be used FIG. 11 depicts an electrostatic field being used for cooling purposes in a lighting system. The figure represents a heat sink 1002 provided with number of air ducts or holes 1102. The arrangement includes an electrical conductor with power supplies 1104 associated with an ionization element 1108. When a current is passed through the electrical conductor the ionization element (e.g. a thin metallic strip) may get charged, thereby ionizing the air surrounding it, represented by Air (i) 1110. The ionized air streams may be carried towards the air ducts or holes 1102, and further inside the heat sink 1002. The launch of the ionized air currents inside the heat sink results in an increased or forced air flow, represented by Air (f) 1112. As a result of an increased air flow through the heat sink, the net rate of dissipation of heat may be significantly increased.

Figure 34:
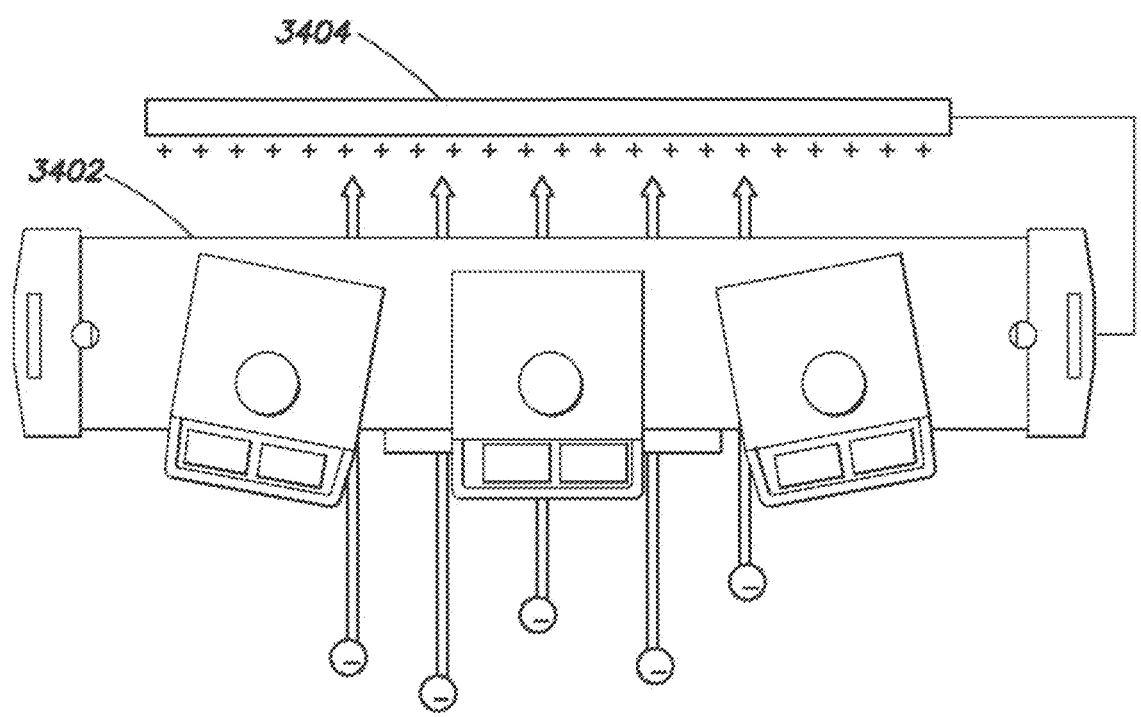
FIG. 34 depicts a thermal design for a lighting fixture featuring passive electrostatic cooling.

Referring to FIG. 34, a thermal design for a lighting fixture 3402 may feature integrated passive electrostatic cooling using air ionizing technology 3404 to induce air flow past the heat sink fins with no moving parts. An electrostatic element may be disposed on a surface of the fixture 3402, wherein the element 3404 is charged by drawing power from the lighting fixture, and wherein the electrostatic element 3404 attracts charged air particles, causing an airflow of charged air particles through the lighting fixture 3402.

With regard to optical designs, a luminaire with a variable-adjustable secondary optics may be provided.

In an embodiment, a variable beam spread may be obtained by motion of an optical assembly corresponding to the LED plane. In other words, the optical assembly may be individually rotatable or adjustable with respect to the LED light modules 604.

In another embodiment, a variable center position by rotation of holographic deflector may be obtained.

In other embodiment, a variable asymmetric beam by rotation of holographic or volumetric diffuser may be obtained.

Lighting systems are easy to use when they are easily replaceable by the users. To meet this objective, a luminaire with user-replaceable optical components may be provided.

In an aspect of the present invention, an LED light bar or light module 604 with a secondary or tertiary optic assembly which is user replaceable in a tool less manner may be provided.

Figure 43:
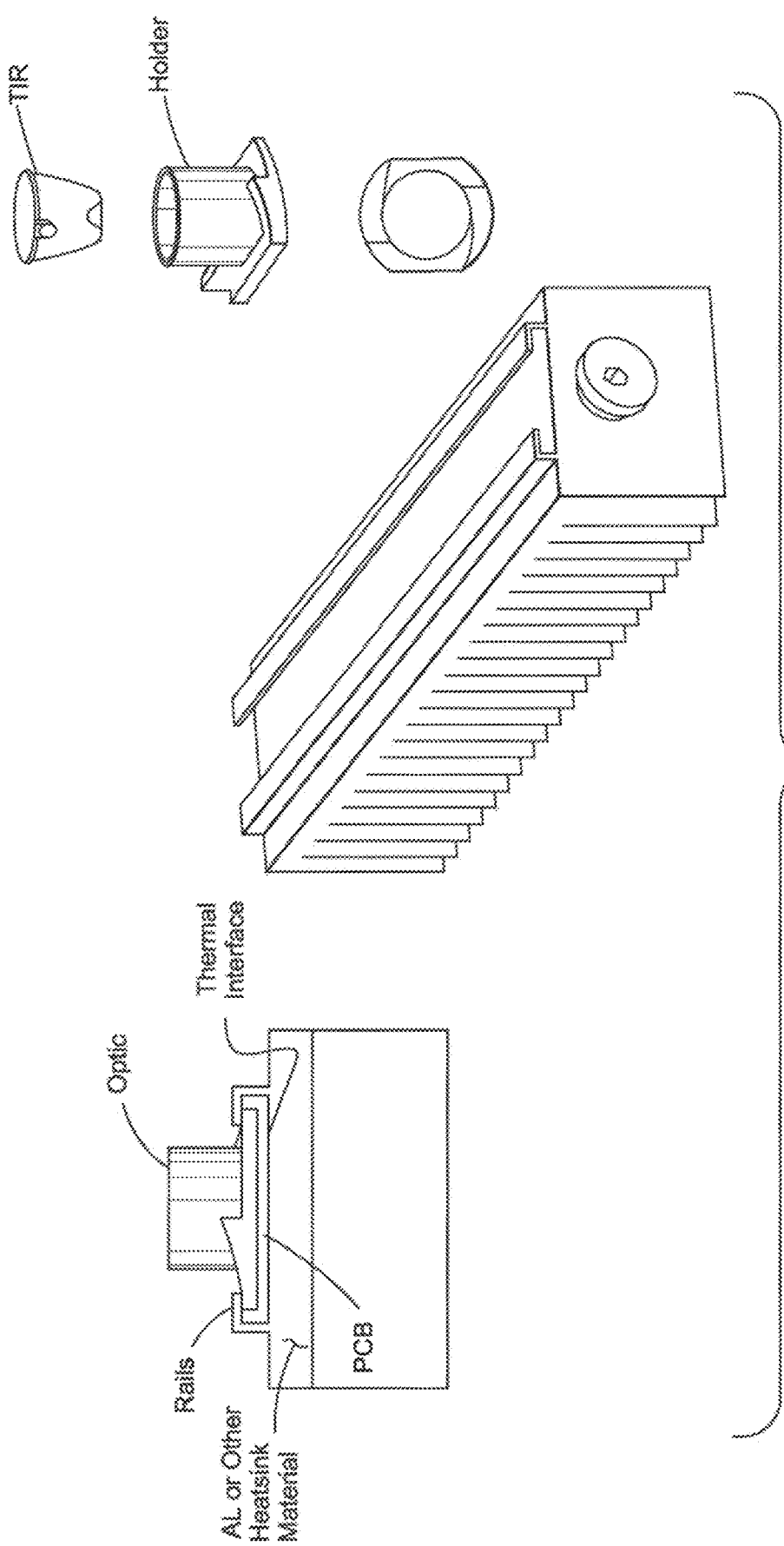
FIG. 43 depicts a quarter-turn mechanism for holding optics.

Alternately, and referring to FIG. 43, a luminaire may be provided with a self-located optic based on an LED's lens ring. This optic may be associated with the LED by means of a quarter-turn mechanism. The optic may be provided with a plurality of ramp like structures that may be molded in to the surface of the optic. The ramp structures mate to pre-existing bars on either side of the LED. The bars may be extruded into the main body of the heat sink or molded into the housing of the LED. Once the holder for the TIR optics in dropped into place along the molded ramps of the lighting fixture, the optics holder is rotated and the ramps push down and lock it into place. The downward pressure exerted by the locking enables a good thermal path without the use of fasteners.

Figure 12:
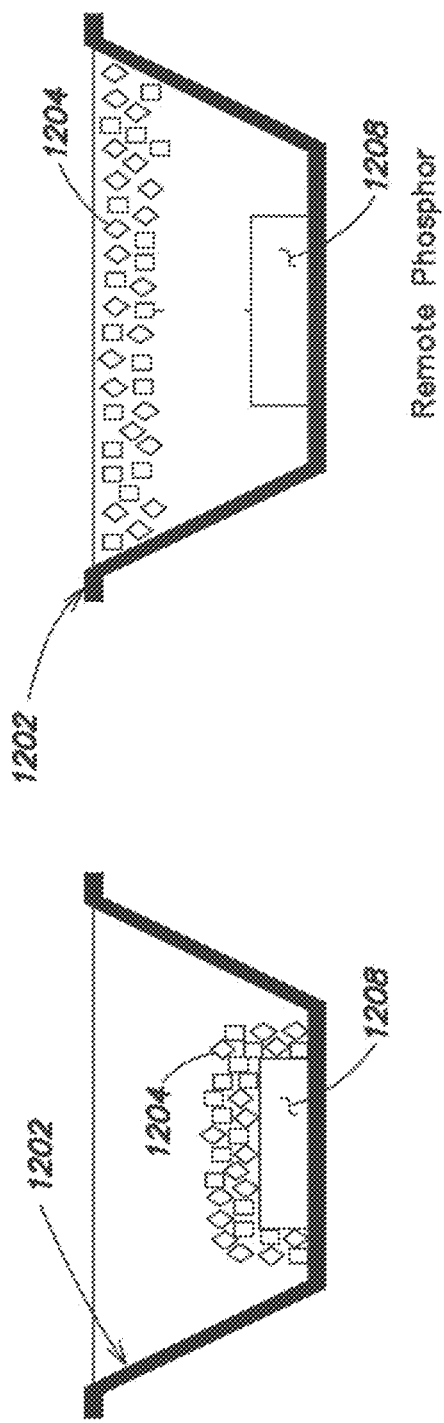
FIG. 12 depicts a remote phosphor over a reflector cup, in accordance with an embodiment of the present invention.

Referring to FIG. 12 conventional LED lighting systems disclosed placing phosphor particles in close proximity to the LED chips inside the reflector cup. This method was found to negatively affect the overall luminous efficacy and lumen maintenance of the phosphor LED lighting systems. A technique of 'remote phosphor' paved the path for improved performance of lighting systems, wherein the phosphor particles 1204 were placed at a distance from the LED chips 1208, thereby introducing remote distribution inside a reflector cup 1202. In an aspect of the present invention, the remote phosphor may be integrated into holographic diffuser, volumetric diffuser, and/or waveguide in order to provide non-Lambertian shaping of beam from phosphor emitting surface.

Figure 41A:
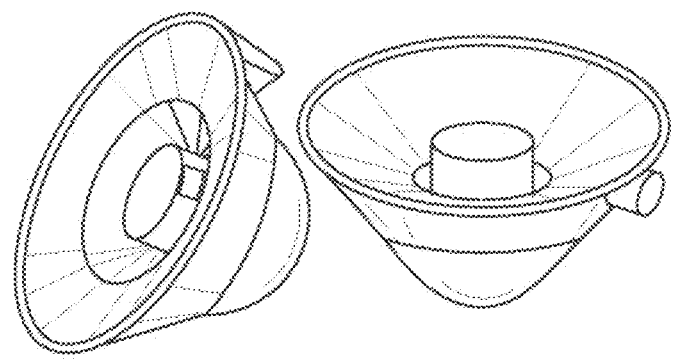
FIGS. 41A and 41B depict TIR optics.
Figure 41B:
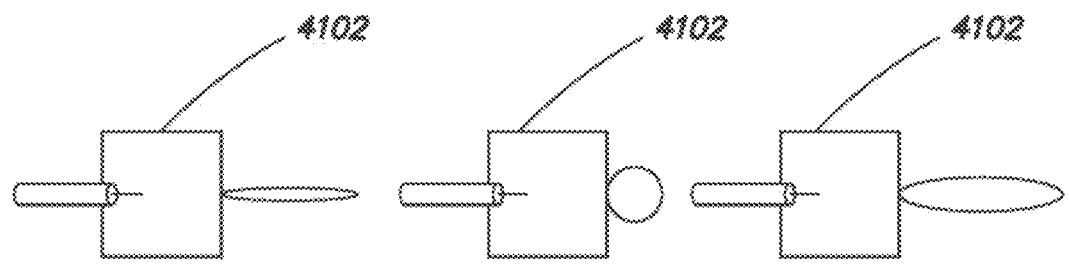
Figure 42A:
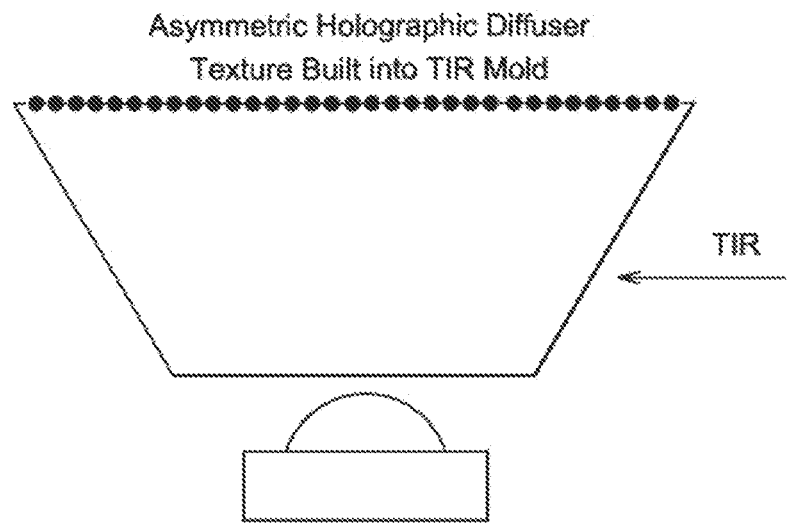
FIGS. 42A and 42B depict TIR plus holographic optics.
Figure 42B:
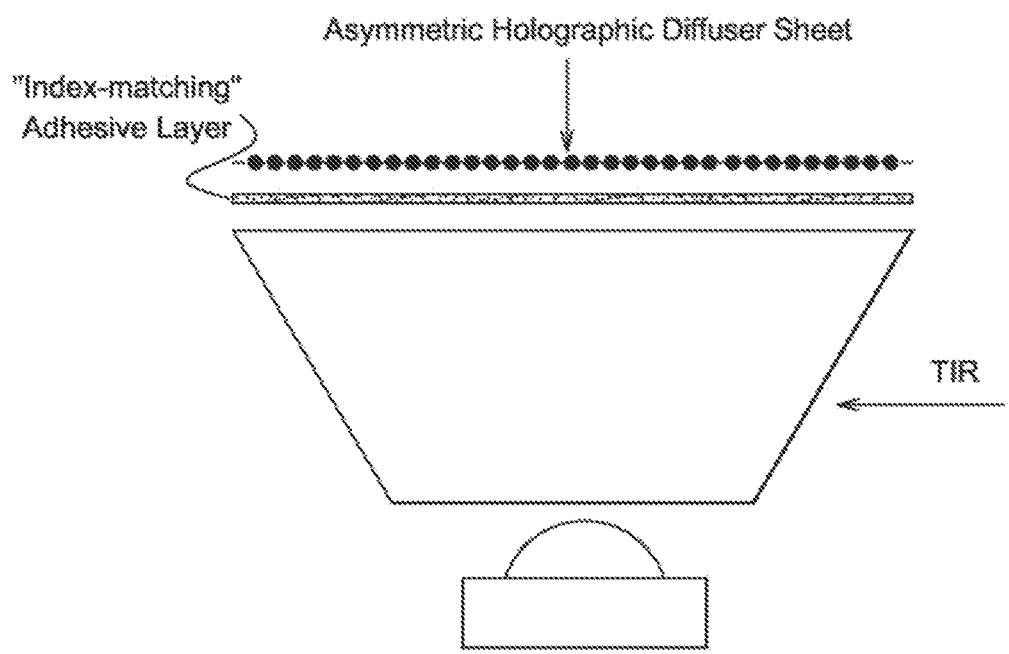

In an aspect of the present invention, total internal reflection and holographic diffuser may be integrated into a top surface, or bonded by means of index-matching material, in order to reduce the number of refractive boundaries by 2. Referring to FIG. 41A, TIR (Total Internal Reflection) optics may be solid molded parts, commonly used to "beam-shape" LED light output. Referring to FIG. 41B, holographic diffusers 4102, also known as light shaping diffusers, may be micro-textured sheets that can shape incoming light in asymmetric ways. For example, a laser dot may be reshaped into a stripe, or an LED circular beam may be reshaped into an ellipse. Typically, a plastic sheet, either flexible or rigid, may be printed with a special surface texture. Referring to FIGS. 42A & B, TIR optics may be combined with holographic diffusers to obtain non-standard beam patterns. A drawback of combining separate TIR and holography is an extra layer of optical loss. Either molding the holographic texture directly into the surface of the TIR lens, or by adhering a holographic diffuser sheet to the TIR optic using a so-called "index matching" material may avoid the extra optical loss.

In an embodiment, LED luminaires may be designed with tight symmetric beam angles designed for low profile holographic beam shaping.

In another embodiment, a retrofit and customized kit or module for existing fixtures such as high intensity discharge lamps (HIDs) may be provided that may include partial up-light capabilities provided by a subset of LEDs, a reflector, and/or a diffuser element.

In another embodiment, luminaires with a non-uniform louver grid to uniformly map ft-cd into environment may also be disclosed.

In an embodiment, luminaires with a non-uniform drive current of each LED may be provided to ensure uniform illumination at different subtended output angles.

In yet other embodiments, the luminaire may be supported by a cover lens for the optical assembly with electrostatic repulsion of dust for rough environments.

Figure 13:
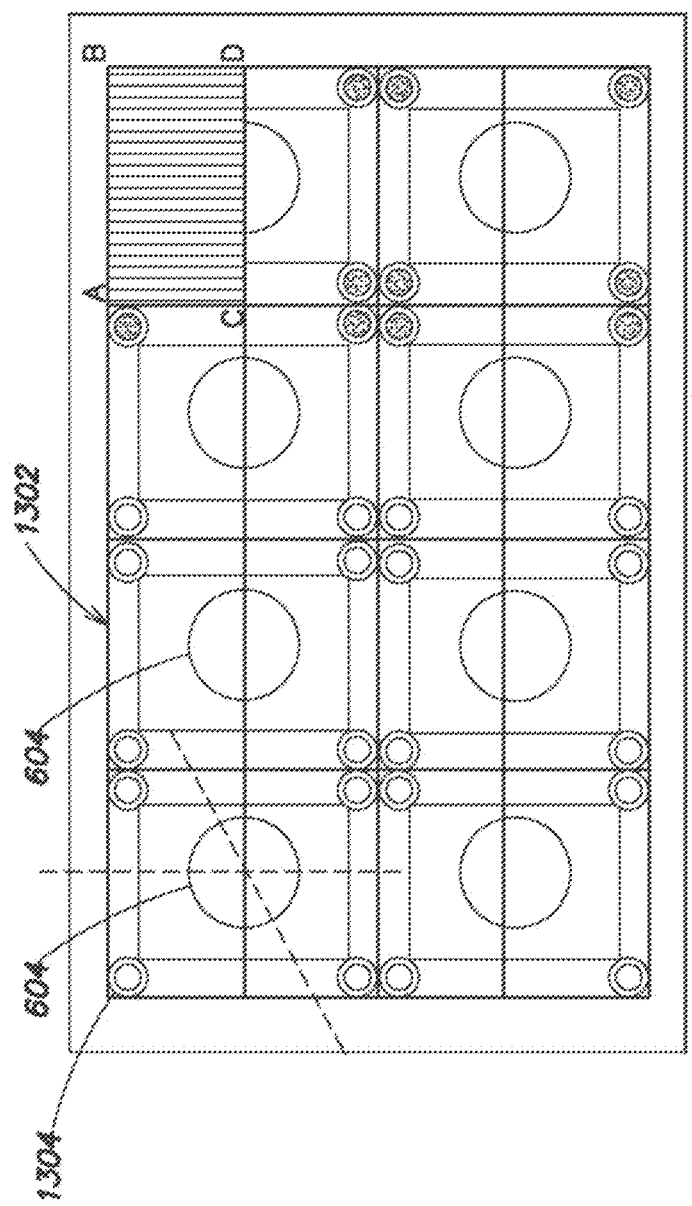
FIG. 13 depicts an exemplary design of a mask template for lighting systems, in accordance with an embodiment of the present invention.

Apart from the above disclosed optical features, the following improvements may be made to the overall design of the lighting systems. As shown in FIG. 13, an extra lens or perhaps just a "mask" template 1302 with slots (slot "ABCD" shaded in 'grey') cut at the half width max may be provided with the light stacks in order to help during initial aiming of the light bars. The more defined lines of light on the floor or stacks would help to determine the exact location of the light and the cutoffs.

Similarly, simple laser pointer accessories 1304 which could be simply attached (with clips or magnets) to the light bars in order to show the beam center or edges may be attached to the light bars. The laser pointers 1304 may also be used to help determine whether the fixture is level since lasers could help with centering or positioning of fixture center to center from last.

In another embodiment, a bubble indicator may be introduced to determine fixture level.

Figure 35A:
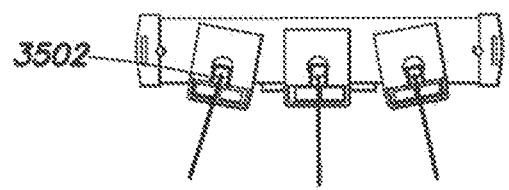
FIGS. 35A-35C depict variations of a fixture aiming apparatus.
Figure 35B:
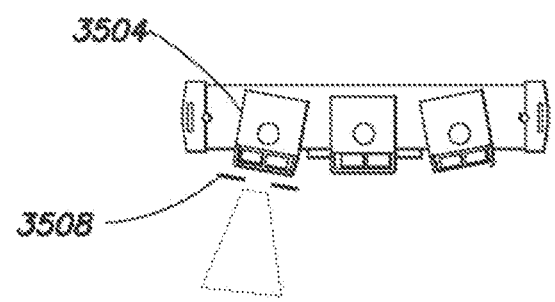
Figure 35C:
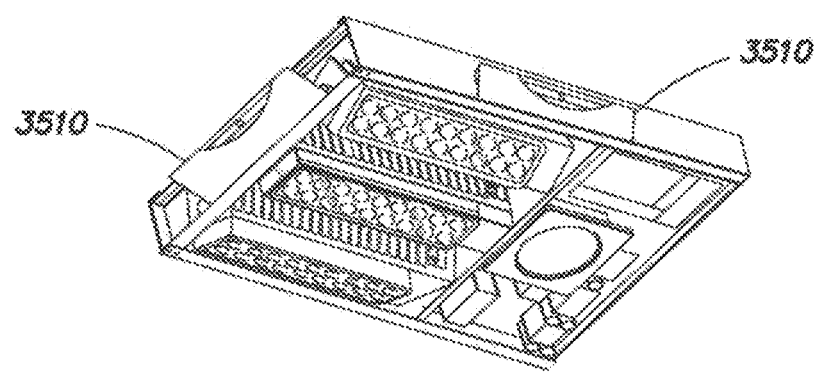

Referring to FIGS. 35A, 35B, & 35C, variations of a fixture aiming apparatus are depicted. Properly positioning a fixture, such as in order to evenly distribute light, or place extra light where desired, during installation may be challenging. In order to facilitate positioning, a laser pointer accessory 3502 may snap onto the LED light bar 3504 and indicate where the LED light bar 3504 is aimed, as shown in FIG. 35A. Alternatively, a mask accessory 3508 may snap onto the LED light bar 3504 and sharpen the edges of the emitted light beam to more clearly indicate a region of illumination, as shown in FIG. 35B. In another embodiment, the fixture may include an integrated or snap-on level indicator 3510, such as the bubble level shown in FIG. 35C.

Figure 18A:
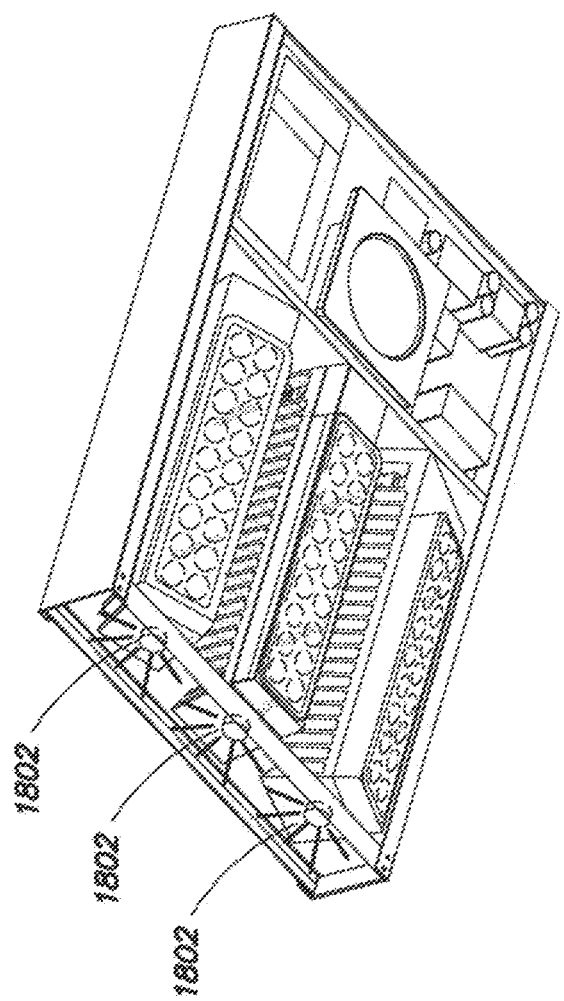
FIGS. 18A-18C depict a fixture with angular adjustment indicators and spring-loaded detents.
Figure 18B:
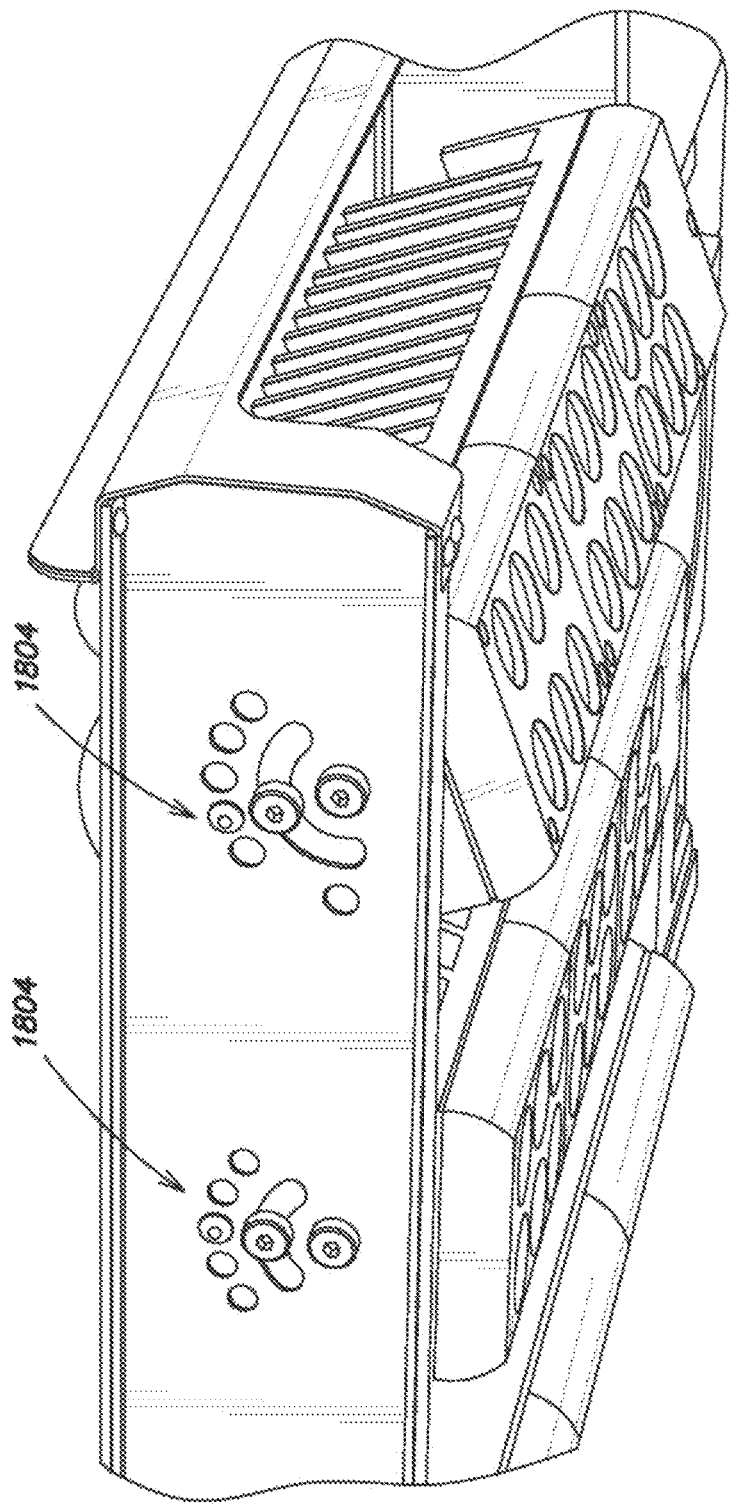
Figure 18C:
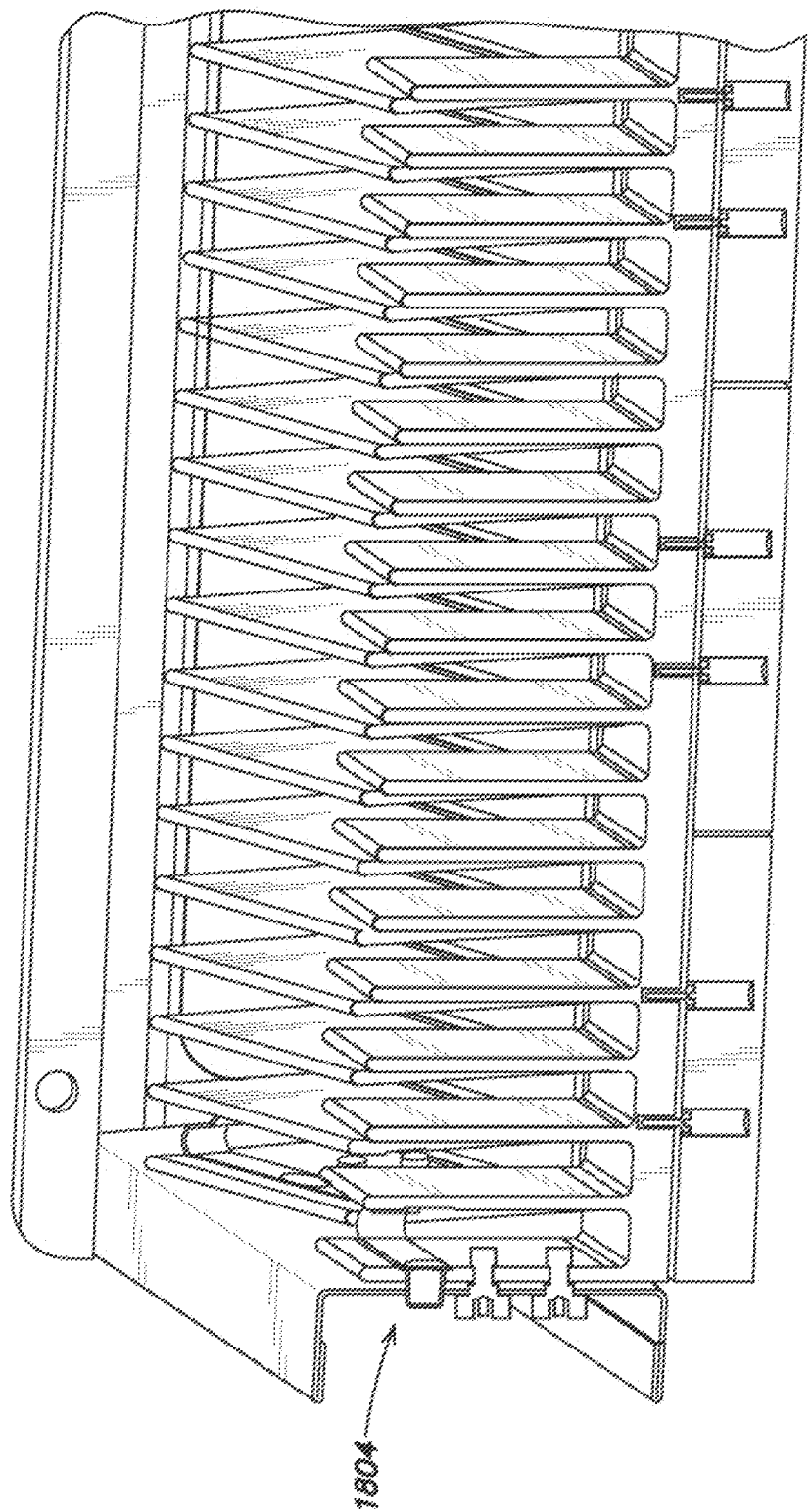

Referring to FIGS. 18A-18C, an angle adjustment indicator 1802, such as a detent 1804 or other indicator may be useful for modular lighting systems for pre-setting angular adjustments for multiple fixtures once the optimal adjustments have been determined. The light bars or the fixture housing may be provided with a visual scale of degrees, numbers, spring loaded detents 1804, and some other similar features which may designate the angular adjustments of the light bar. Once an angle may be selected, it may be locked into place.

Alternately, for determination of angle of illumination for the light bar, a calculator may be employed based on several factors such as ceiling or wall height, fixture spacing, ambient temperature, and some other factors. This angle calculator may be localized or may be online to be accessed through a network. The calculator may include provisions for obtaining printed copies of the various light bar angles corresponding to the factors, which may be later used to make an appropriate selection by the users.

Additional features may include integrating 'blinking' LEDs in the lighting systems to show network connectivity and/or light bar status.

In an embodiment, a downward aimed status LED may be used.

In other embodiments, light bars may themselves blink to display the status information. For example, in a manufacturing plant, a light bar may blink continuously to indicate an emergency situation, or may blink after a certain period (say 10 seconds) to indicate loading operation in process.

In yet other embodiments, lighting systems connected through a wireless network 142 may also utilize a handheld device such as a PDA or smart-phone to display the light bar status information.

Lighting systems in a network 142, as explained in conjunction with FIG. 1B earlier, may also be associated with cooperative sensor networking. In this scenario, there may not be a centralized light management unit, but the control and management would be propagated through the network 142, preferably a mesh network. Accordingly, the control or response signals from the sensors may be transmitted through the mesh network, and lighting fixtures may respond to these signals according to a predefined rule. As mentioned earlier, there may be a directory of such predefined rules stored in a fixture memory, or these rules may be stored inside various modules of management systems 134.

Figure 36:
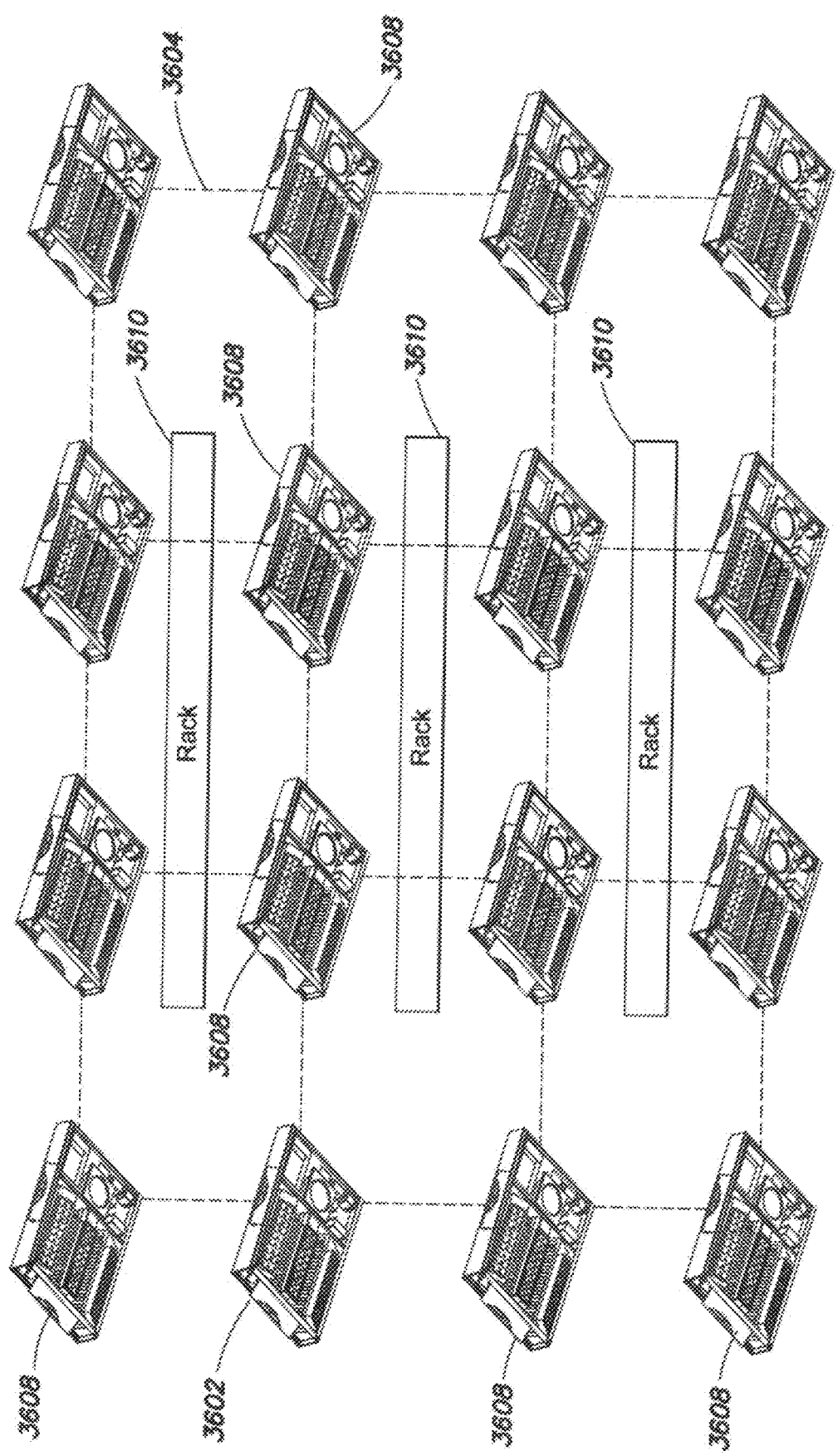
FIG. 36 depicts cooperative sensor networking.

Referring to FIG. 36, in an embodiment of cooperative sensor networking, networked lighting fixtures and sensors with no centralized control device are depicted communicating with one another via a mesh network 3604 topology. The mesh network 3604 may be wireless or carried on a powerline. The fixtures may include a mesh network connection, integrated sensor(s), and an internal rule database. Sensor data may be shared from fixture-to-fixture via the mesh network, and the fixtures may independently act on sensor data based on the rules stored in a fixture memory. As in FIG. 36, a plurality of networked lighting fixtures is disposed in an area organized by aisles with intervening racks 3610. The circled fixture 3602 may sense occupancy via an occupancy sensor. The sensor signal may then be broadcast to the entire mesh network 3604. The neighboring fixtures 3608 receiving the sensor signal see that it is from their aisle and they turn on in response to the signal. Therefore, at least one sensor is integrated in at least one of the plurality of lighting fixtures, wherein each of the plurality of lighting fixtures are configured to receive a sensor data signal from one of the plurality of lighting fixtures and transmit a sensor data signal to at least one other of the plurality of lighting fixtures. The lighting fixtures are further configured to receive a sensor data signal transmitted by one of the other lighting fixtures and transmit a repeated sensor data signal to at least one other of the plurality of lighting fixtures. When a sensor data signal is received by a lighting fixture, a built-in processor processes the sensor data signal and transmits a control command to the lighting fixture in accordance with at least one rule stored in a memory of the processor.

As discussed earlier, the lighting management systems may utilize agreed upon parameters (such as lighting parameters 202, energy demand parameters 212, and utility energy demand parameters 302) for managing lighting systems including any of the lighting fixtures described herein as well as lighting fixtures not described herein. Consider a stage being illuminated by numerous lights equipped with sensors 120. Any change in the pattern of utilization of these lights may be detected by the sensors 120 and reported to the management systems 134. The management system 134 may automatically configure the lights based on a set of agreed upon parameters or rules. For example, the rate of thermal dissipation may be increased by increasing air flow in case increase in voltage is reported due to a light fuse. Therefore, in this case the agreed upon parameter is the increase in voltage.

In another embodiment, luminaires may broadcast unique identifiers (ID) as part of normal beam. Users or commissioners may use handheld devices that decode IDs and may communicate this to management systems 134. Alternately, the commissioner may select a ft-cd level and traverse facility or lighting system such that the luminaires and light management systems may automatically adjust output to match desired levels.

Examples of some handheld commissioning tools may include PDA, handheld mobile phones, smart-phones, purpose built hardware commissioning tools (e.g., Zapi), and some other types of tools.

For the installation and commissioning process, software commissioning tools may also be utilized. In an embodiment, the software commissioning tool may be a web-based or application client. In another embodiment, the commissioning tool may be run through a server for the management systems 134. The server may be distributed or remotely located.

With regard to network connectivity, various embodiments and solutions may be disclosed that may also benefit the installation and commissioning process. Larger areas and environments that may require a number of lighting units may sometimes leave the operators carrying out the commissioning process perplexed. In view of this, solutions to automatically build or construct a 'connectivity map' of the entire environment or facility (e.g., warehouse facility) may be provided. These solutions may be either in the form of software or designing tools that may help the users in building a logical yet simple map or graph of the facility in which fixtures may be depicted as nodes. The overlapping or contiguous beam patterns of the two fixtures may be depicted by an edge connecting them. On the same note, different symbols and codes may be used for constructing these 'connectivity maps.'

In an embodiment, the connectivity map may be automatically generated from a combination of mesh routing and Received Signal Strength Indication (RSSI) data. The RSSI may provide a measurement of the power present in a received radio signal. Preferably implemented in a wireless network, the RSSI data will indicate the strength of the signal. On a graph, a solid line (composed of RSSI measured values) will indicate a strong signal and a flashing or spliced line may indicate a weak signal. This information would aid the installation and commissioning process by indicating which nodes in the facility correspond to strongest or weakest signals.

Figure 37:
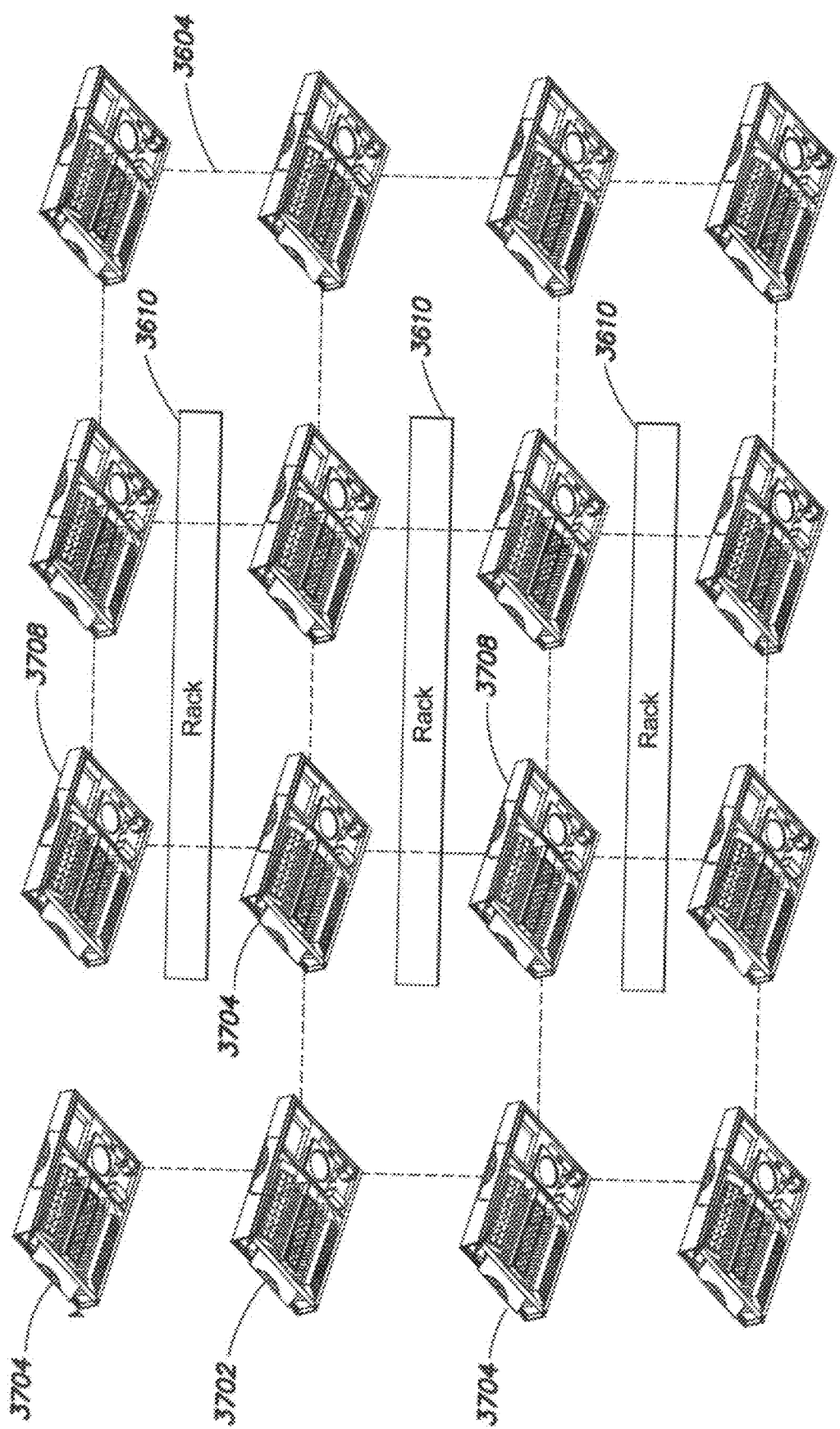
FIG. 37 depicts automated commissioning via a mesh network.

Referring to FIG. 37, which depicts automated commissioning via a mesh network 3604, being able to automatically build a "map" of an installation may shorten commissioning time. Automated commissioning may use characteristics of the fixture-to-fixture mesh network 3604, such as the hop count from one node (lighting fixture) to another, and the RSSI or signal strength for any particular hop to construct the network topology. Fixture placement may be automatically deduced using the performance characteristics of the mesh network 3604. As shown in FIG. 37, the first step in automated commissioning may begin with a fixture, such as the circled fixture 3702, querying the mesh network 3604 for neighboring fixtures by sending out a query signal. In the second step, hop counts to neighboring fixtures are determined—the rectangle fixtures 3704, 3708 may be reached in a single wireless hop, so they are potentially neighbors. In the third step, the fixtures with the greatest signal strength are determined—the shaded rectangles 3704 have the highest RSSI (signal strength), so they are the circled fixture's 3702 closest neighbors. To continue building the network topology, the three steps are repeated. Thus, automated commissioning via a mesh network 3604 includes integrating at least one sensor in at least one of the plurality of lighting fixtures, wherein each of the plurality of lighting fixtures are configured to receive a sensor data signal from one of the plurality of lighting fixtures and transmit a sensor data signal to at least one other of the plurality of lighting fixtures and further configured to receive a sensor data signal transmitted by one of the other lighting fixtures and transmit a repeated sensor data signal to at least one other of the plurality of lighting fixtures, collecting performance data relating to the network of lighting fixtures, wherein the performance data are at least one of sensor data signal strength and the hop count of a sensor data signal from one lighting fixture to another, and generating a representation of the network of lighting fixtures based upon the lighting fixture placement and the network performance data. The representation may be used to construct a rule database stored on at least one lighting fixture or in a centralized network controller. The representation may be used to automatically assign lighting fixtures to zones. The representation may be used to automatically determine from which lighting fixtures' sensors the fixtures without sensors should receive sensor data signals.

Figure 38:
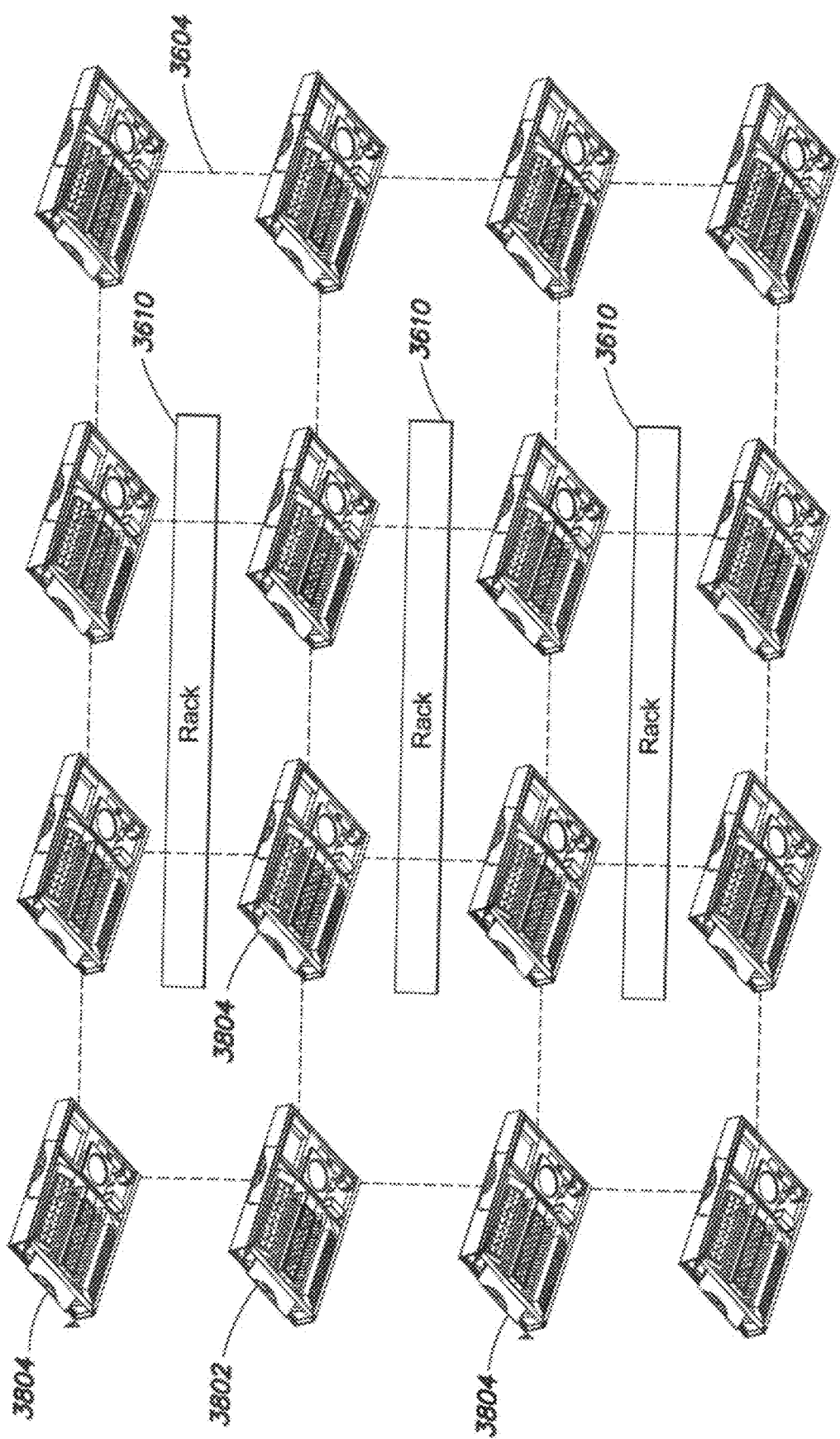
FIG. 38 depicts automated commissioning via neighbor detection.

Referring to FIG. 38, automated commissioning via neighbor detection is depicted. Being able to automatically build a "map" of an installation of lighting fixtures shortens commissioning time. If fixtures can emit unique identifying signals, such as via IR beacon, RF module, or just blinking light bars in a special pattern, and also detect signals from other fixtures, a connectivity map may be iteratively built up by repeated use of these features. Automated commissioning via neighbor detection is enabled by lighting fixtures with the ability to emit unique identifying signal and ability to detect same from other fixtures, used to automatically generate topological "map" of an installation of lighting fixtures. As shown in FIG. 38, the first step in automated commissioning may begin with a fixture, such as the fixture 3802, transmitting an identifying signal. In the second step, the rectangles 3804 detect the fixture's 3802 identifying signal, so they know they are neighbors of the fixture 3802. To continue building the network topology, the two steps are repeated. Thus, a method of automatically mapping a network of lighting fixtures may include integrating at least one sensor in at least one of the plurality of lighting fixtures, wherein each of the plurality of lighting fixtures are configured to receive a sensor data signal from one of the plurality of lighting fixtures and transmit a sensor data signal to at least one other of the plurality of lighting fixtures and further configured to receive a sensor data signal transmitted by one of the other lighting fixtures and transmit a repeated sensor data signal to at least one other of the plurality of lighting fixtures, wherein the sensor data signal comprises a unique identifying signal, and generating a representation of the network of lighting fixtures based upon the detection of transmitted unique identifying signals by at least one neighboring lighting fixture of the transmitting lighting fixture. The representation may be used to construct a rule database stored on at least one lighting fixture or in a centralized network controller. The representation may be used to automatically assign lighting fixtures to zones. The representation may be used to automatically determine from which lighting fixtures' sensors the fixtures without sensors should receive sensor data signals.

In an embodiment, the connectivity map may be presented to the users through a configuration tool. Alternately, the map may be used to construct rule data stored in the fixtures or in a central light management module 148.

Various relationships between sensors and fixtures; fixtures and fixtures; and sensors and sensors may be represented on the connectivity map with the help of plurality of overlays and additional layers.

In other embodiments, maps may also include wide angle light sensors and network corresponding to each lighting fixture. Information regarding the neighbors for each fixture may be utilized to construct the map.

In accordance with other embodiments, connectivity maps may be manually built by illuminating each fixture in sequence and instructing the user to manually select neighboring fixtures. A connectivity map is a diagram showing nodes (LED lighting fixtures, in this case) and edges (links to neighboring fixtures, in this case) which may enable automatically mapping out the LED lighting fixtures in a space. For example, from a series of light fixtures, the fixture with the lowest MAC address, MAC address which is a globally unique network address used to identify network nodes (fixtures), may be illuminated first followed by a manual selection of neighboring fixtures using a laser or remote at a sensor embedded in the fixture.

Each fixture and/or sensor can be assigned to one or more "zones" pre-installation, then fixtures and sensors in the same zone work together.

In another embodiment, each lighting fixture and/or sensor may be assigned to one or more zones prior to installation and commissioning. Subsequently, all the fixtures and sensors in a specific zone may work. In addition, all the fixtures may be controlled together. Though the fixtures may belong to one or more zones, they may act based on multiple inputs corresponding to various zones. For example, a fixture may be responsible for providing illumination in zone A (e.g. a loading section of a warehouse) as well as warning signals in case of emergency in zone B (e.g. a storage section of a warehouse.) Therefore, it may receive and act upon two different inputs (increasing the illumination for zone A and initiating LED (red light) blinking in case of fire for zone B) simultaneously. The various ways in which fixtures and sensors may be categorized into zones and controlled may be achieved by various methods such as use of manual/physical means (DIP switches) and use of bench configuration processes. Bench configuration processes are the configuration steps which may be undertaken prior to installing LED lighting fixtures "on the workbench", as it were, versus while hanging in the air. In other embodiments, the categorization may be an interactive zone configuration, similar to a real world.

In an embodiment, the zones may be defined based on types of fixtures. For example, in a playground floodlight fixtures may be assigned one zone and background lights another.

In another embodiment, zones may be defined based on fixture location. Considering the playground example again, the fixtures on the field may belong to zone A (also categorized as hot zone) and the fixtures in the audience arena may be classified in zone B (soft zone.)

In other embodiments, zones may be categorized based on electrical circuit. For example, corresponding to ring circuits, radial circuits, series and parallel circuits, and some other types of circuits, different zones of lighting may be formed.

In yet other embodiment, zones may be defined based on architectural drawings and electrical plots. In some cases, these zones may be categorized based on the arrangement of fixtures illustrated in the 'connectivity map.'

Figure 39:
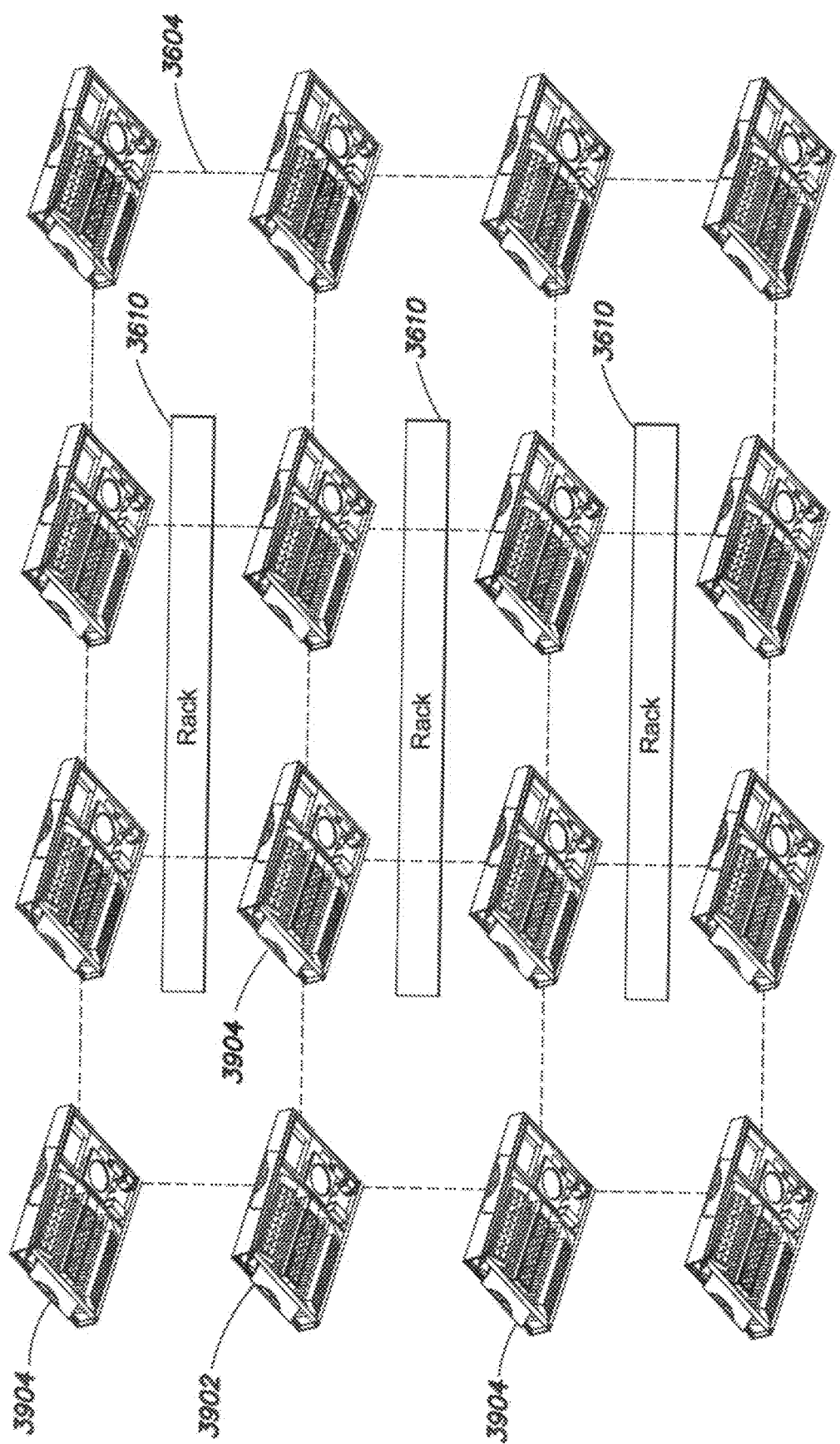
FIG. 39 depicts automated commissioning via an interactive procedure.

Referring to FIG. 39, automated commissioning via an interactive procedure is depicted. Being able to automatically build a map of an installation of lighting fixtures may shorten commissioning time. In a more manual version of the process for commissioning, a user may interactively select neighbors of each fixture using some remote selection mechanism, such as a laser pointer with a detector on the fixture or LED light bar, a remote control with an IR detector on the fixture or LED light bar, and the like, with the neighbor information then used to automatically build a network topology. As shown in FIG. 39, the first step in commissioning may begin with a user identifying a fixture's, such as the fixture's 3902, neighbors. In the second step, the user may step through a list of all detected fixtures in the network 3604 until the fixture 3902 is selected. In the third step, the user may then manually select the fixtures 3904 as neighbors. To continue building the network topology, the three steps are repeated. Thus, a method of mapping a network of lighting fixtures may include integrating at least one sensor in at least one of the plurality of lighting fixtures, wherein each of the plurality of lighting fixtures are configured to receive a sensor data signal from one of the plurality of lighting fixtures or an outside source and transmit a sensor data signal to at least one other of the plurality of lighting fixtures and further configured to receive a sensor data signal transmitted by one of the other lighting fixtures and transmit a repeated sensor data signal to at least one other of the plurality of lighting fixtures, selecting neighbors of each lighting fixture by detecting a sensor data signal transmitted to at least one lighting fixture from an outside source, wherein the sensor data signal comprises neighbor information, and generating a representation of the network of lighting fixtures based upon the detection of transmitted sensor data signals from the outside source. The representation may be used to construct a rule database stored on at least one lighting fixture or in a centralized network controller. The representation may be used to automatically assign lighting fixtures to zones. The representation may be used to automatically determine from which lighting fixtures' sensors the fixtures without sensors should receive sensor data signals.

Similarly, decrease in the light output resulting from failure of a single fixture or a part of fixture may be avoided in a network with use of cooperative failure compensation. When a fixture fails in a network, this may be detected or sensed by the neighboring fixtures either through sensors located onboard or by notification received over the network 142. As a result, the remaining fixtures may increase their light levels to maintain the desired light on surfaces. This application may be highly relevant and useful for the environments such as theater stages, performance grounds, manufacturing units, mining holes, and similar other areas where receiving constant light output may be pertinent.

Figure 40A:
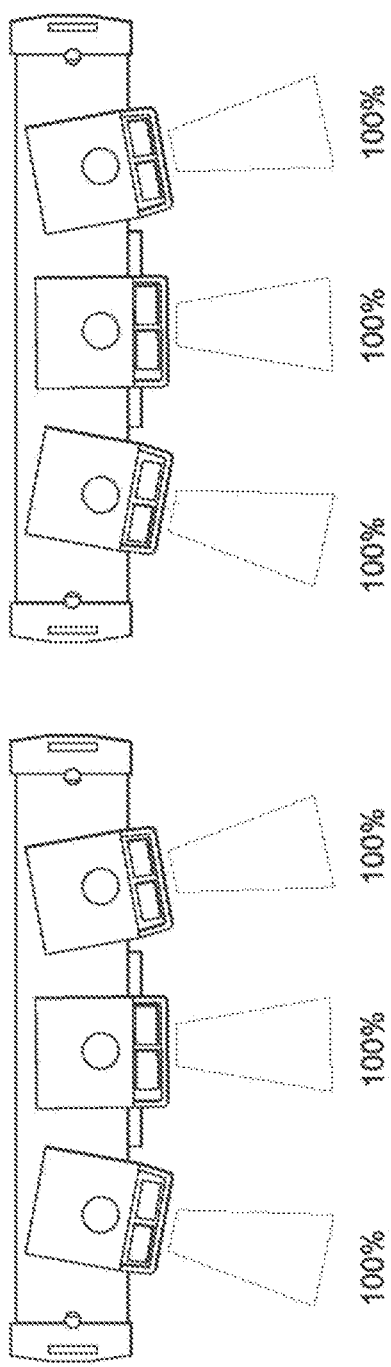
FIGS. 40A and 40B depict cooperative failure compensation.
Figure 40B:
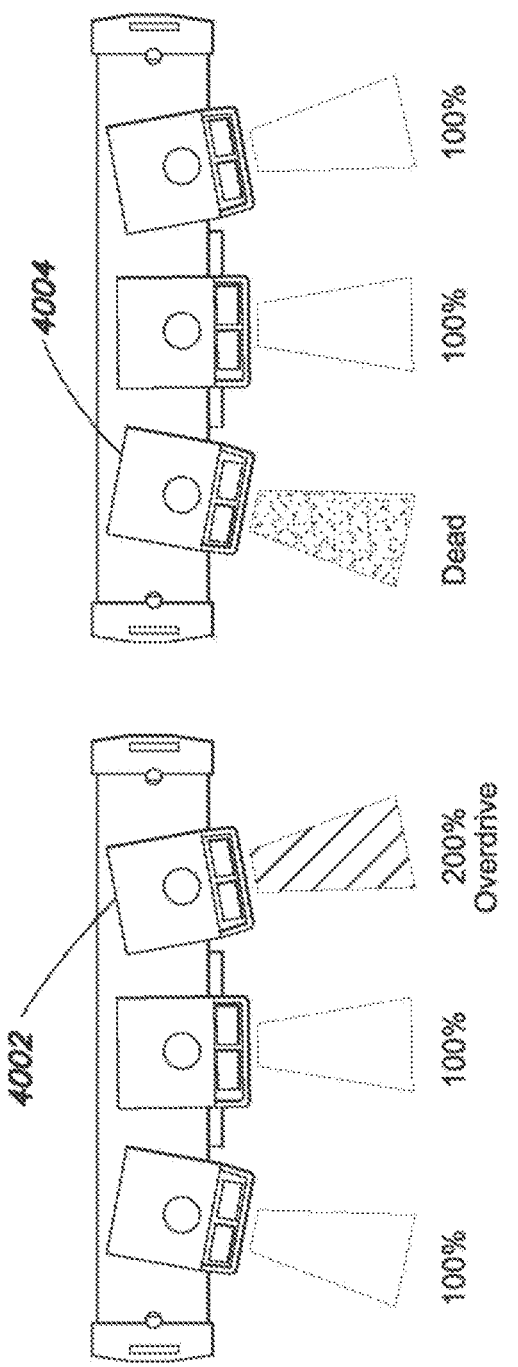

Referring to FIGS. 40A & B, cooperative failure compensation is depicted. Neighboring fixtures may have overlapping beam patterns. Once a connectivity map identifying the position of each fixture is obtained, such as by any of the methods described herein, the network may compensate for partial failure (i.e. a dead light bar) by temporarily overdriving a neighboring fixture, as identified on the connectivity map. LED light bar failures may be identified via light sensors, onboard error detection, and the like. Neighboring fixtures can temporarily increase their light output to at least partially compensate for this loss of light. In FIG. 40A, all of the LED light bars are operating at 100% However, in FIG. 40B, one of the LED light bars 4004 is dead. A neighboring fixture 4002, as determined based on a connectivity map, may be overdriven to compensate for the failure. When one fixture or part of a fixture fails, neighboring fixtures detect this (via sensing onboard or via notification over network) and increase their light level to maintain desired light on surfaces. An associated PMM can intelligently detect the presence of a dead light bar by sequencing through output channels and detecting power consumption at each step.

Similar to the aspect of intelligent commissioning of lighting systems, another improvement in the design of modular lighting systems may include advanced dimming and sensing capabilities. For example, luminaires may be dimmed based on command input from multiple sources In an embodiment, the commands from the multiple sources may be combined into a single command value by the light management systems 118 or power management systems 112 inside the luminaire.

In an embodiment, the combined command values may be stored in a remote database or inside the fixture as decision weights. Similarly, different decision profiles may be created and supported based on certain operating conditions. For example, for an operating condition 'full-throttle', commands from sources A, B, and C are always combined together to initiate an action from the management systems. This action may be stored as a rule or decision inside the fixture or in a remote memory.

Referring to FIGS. 19A and B, a fixture with individual light bar dimming is depicted to achieve fine-grain control over spatial light distribution. FIG. 19A depicts a fixture made up of light bars 1902 each illuminating a different portion of an environment, where the light bars can be individually dimmed to change the distribution of light, or beam pattern, in the environment. FIG. 19B depicts dimming of two of the three LED light bars 1904 without dimming the third LED light bar 1902. Dimming may be via multiple independent drivers where each light bar has its own driver. Dimming may be via a single driver where the LED light bars are connected serially, and a controllable shunt across each bar allows for individual control. A method for altering an aggregate beam pattern may include mounting a plurality of light emitting diode (LED) light bars within a housing, wherein at least one of the plurality of LED light bars is a variable intensity LED light bar. The method may further include electrically connecting a driver circuit to a variable light intensity LED light bar for controlling a variable load applied to the LED light bar, wherein the luminous output of the LED light bar is varied in response to a change in the load. At least one of the plurality of light bars may include a rotational drive constructed and arranged to rotate the at least one LED light bar along at least one rotational axis independent of the orientation of the housing, or the LED light bar may be freely rotatable.

Conventional lighting systems employing traditional occupancy sensors may have unacceptable error rates. Therefore, a multi-observer mesh of sensors may be created to meet advanced sensing capabilities. This consequently may establish a voting procedure to increase recognition accuracy. For example, in highly active zones such as a highway, there is a negligible room for errors. Therefore, in such a scenario, the environment 100 will be provided by a mesh of sensors situated at various locations that may or may not report the same incident or change. The management and control systems in this case will utilize the information received from all the sensors and may determine the number of 'like' instances. As a result, the final decision or action will be based on the number of votes or instances reported.

In other embodiments, luminaire runtime may be monitored by the lighting management systems to estimate/calculate 'end-of-lives' for the luminaires. This information may be presented to the user as a notification for initiating suitable action. The alerts may also be issued at pre-determined intervals (e.g. 10 hours) to estimate end-of-life.

In an embodiment, a set of rules may be defined for initiating alerts. These rules may be stored in rules databases in the management systems 134. For example, in the above case alert may be issued to notify 'end-of-life' of the luminaire or variable voltage input.

In another embodiment, alert procedures may be defined. For example, in some cases, a simple visual alert in the form of blinking LED notifying low battery condition for storage device may be sufficient. In some other cases, such as emergency (fire) LED blinking followed by alarm throughout the premises may be required to notify the users. In yet other cases, the alert may be initially transmitted to an operator interface, who will subsequently relay the information to a zone manager. These are only exemplary instances, and more may be defined based on the requirements of the environment and the system. Whatever be the case, a definite process may be designed. This process may be embedded as a set of mutual guidelines or internal rules in the lighting systems 102.

Similarly, various alert system gateways may be engaged for issuing notifications such as e-mail interface, web-based interface (instant messaging, twitter, etc.), pager interface, cell phone interface, audio, visual, and some other types of interfaces.

When ambient light is detected in an environment, luminaire brightness may be reduced in that environment in order to reduce system power consumption while maintaining desired light levels. The ambient light may be detected by means of sensors in wireless remote unit, to be placed directly into operating environment.

Alternately, the ambient sensors may be integrated into the luminaires such that they have an 'aimable or reachable' mount aligned with windows, skylights, and other utilities in the environment 100.

Smart PMMs may have an onboard non-linear mapping of ambient reading into implied "true" ambient values, generated by initial calibration or pre-loaded. For various reasons, the readings coming from standard light sensor modules may not correspond linearly with actual light in the environment, so having the ability to correct for this non-linearity onboard the PMM using ambient light sensors may allow for more accurate readings.

Therefore, it may be observed that the lighting systems may be controlled based on various factors such as business rules, user controls and commands, zone rules, third-party commands, sensor inputs, electricity price levels as functions of time, daylight levels, and some other factors.

By analyzing past patterns of sensor data, light management systems may make predictive decisions that can reduce overall energy consumption or optimize some process. For example, if a system observes that a particular warehouse aisle is accessed very infrequently, the ambient lighting level of that aisle may be lowered in order to save costs.

The above sensor data may be compiled for use by a lighting control system (for example, in order to reduce costs or increase safety) or exported for use by some other system (such as a warehouse inventory management system, parking garage management system, security system, and so on.)

The prediction or forecasting may be performed by lighting prediction and management module 152 to determine better layouts for plants. The forecasting may be cyclical or seasonal in nature or both. The system may compile data with a purpose to rearrange and find optimal layouts for warehousing (such as stacks and fixtures.) In addition, based on the SKUs and inventory levels, new locations may be suggested for SKU placement.

In addition to the above mentioned features, there may be certain additional characteristics that may be incorporated in the designs of modular lighting systems. The following embodiments describe various representations where light may be utilized as a utility.

Figure 15:
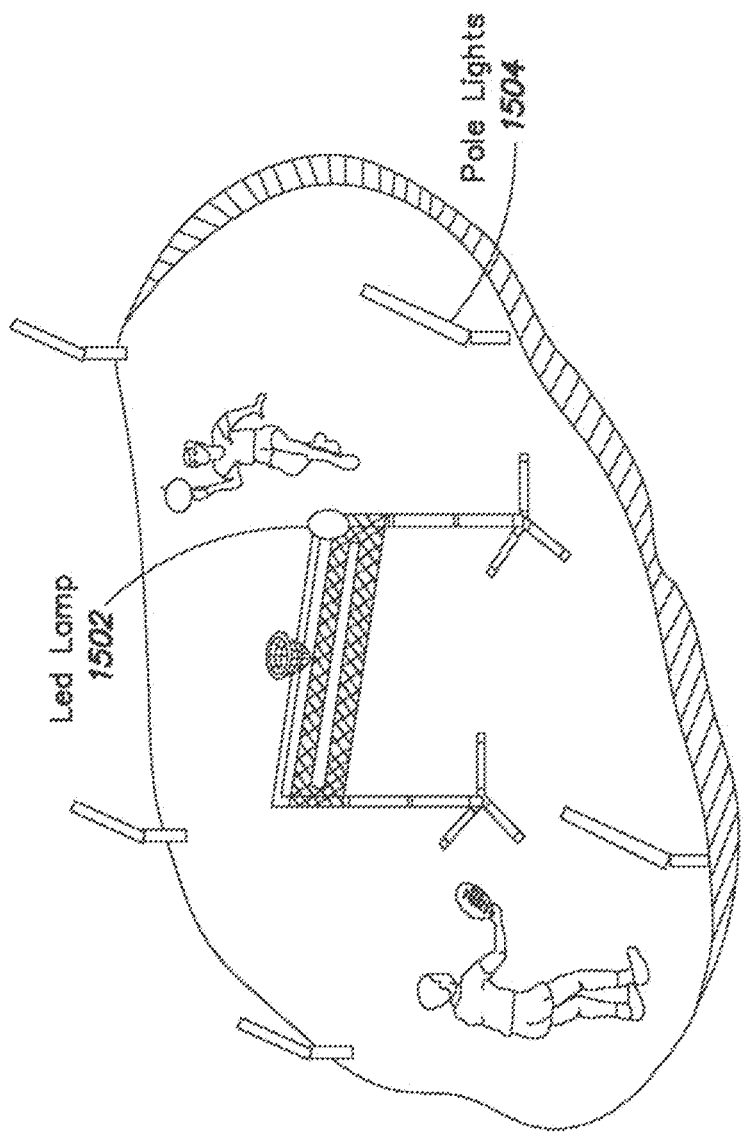
FIG. 15 depicts an advanced dimming characteristic of outdoor lighting systems, in accordance with an embodiment of the present invention.

In accordance with an embodiment of the present invention, an integrated RTC/Astro clock with the power management module of the lighting systems to provide intelligent dusk-dawn dimming may be disclosed. The power management unit may be associated with a real-time clock. This may be specifically useful for outdoor areas. Referring to FIG. 15, an outdoor facility such as a badminton court 1500 may be illustrated. LED lamps 1502 and pole lights 1504 may be equipped with sensors 120. As soon as the sensors 120 detect a decrease in the intensity of ambient light (due to evening or night vision or change in weather conditions), the lights 1502 and 1504 may be instantly illuminated.

Figure 16:
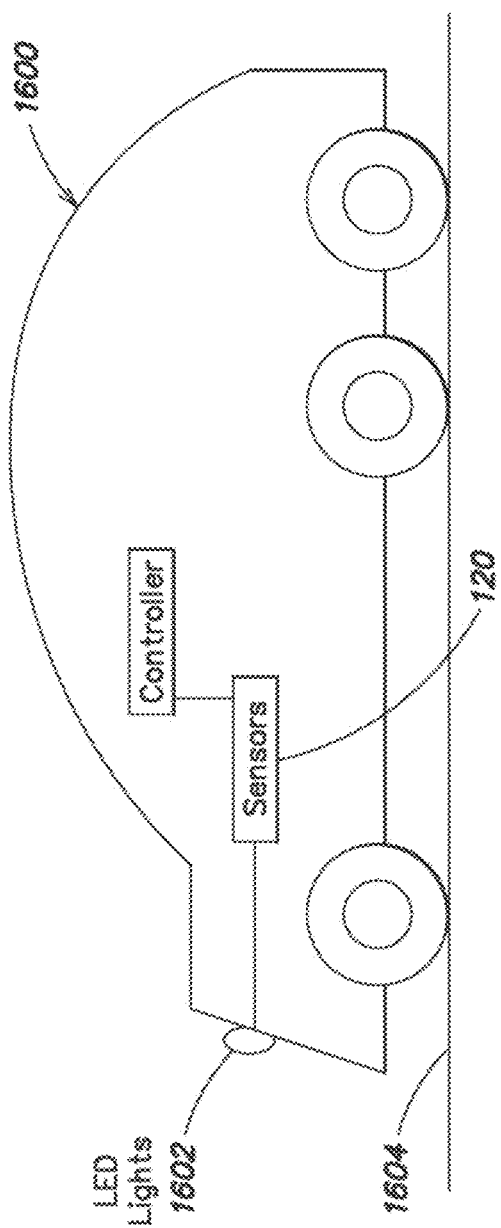
FIG. 16 depicts an intelligent sensing mechanism for traffic information management, in accordance with an embodiment of the present invention.

Intelligent sensing may be useful in other outdoor environments including roads and highways 1604 as well. Referring to FIG. 16, wireless sensors 120 may be embedded into the luminaires 1602 associated with the vehicles 1600 and wireless ID (such as cell ID, Bluetooth or WiFi ID) associated with the passing vehicles 1600 may be logged for advertising purposes.

In another embodiment, a vehicle sensor 120 may be embedded into the luminaire 1602 to compile traffic information (obstructions, jams, etc.)

Figure 44:
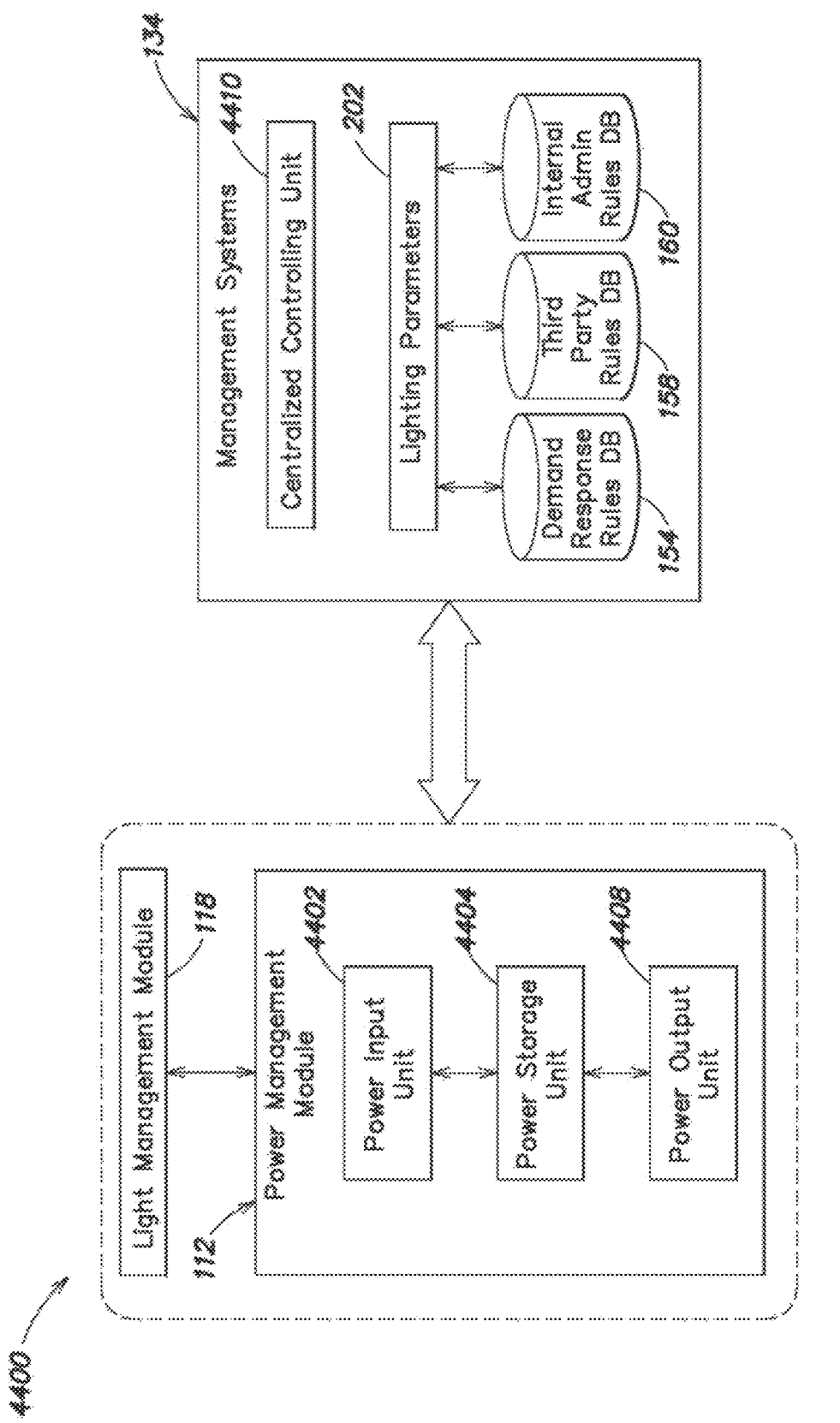
FIG. 44 depicts a schematic diagram comprising a power management module and light management systems.

FIG. 44 depicts alternate embodiments of a power management module 112 and management systems 134. In the embodiments of FIG. 44, a power management module 112 may be connected with management systems 134 for automated, controlled and intelligent operations of lighting fixtures. Although the power management module 112 may be configured to form a remote connection with the light management module 118, in the embodiment of FIG. 44, the light management module 118 may be integrated with the power management module 112 as a single assembled unit 4400. Similarly, various other designs and integrations of the depicted units may be possible without limiting the spirit and scope of the present invention.

The power management module 112 of the embodiment of FIG. 44 may further include a power input unit 4402, a power storage unit 4404 and a power output unit 4408. The power input unit 4402 may be configured to receive power from an external energy source. The external energy source may include but may not be limited to conventional energy sources or renewable energy sources. The conventional energy sources may include without limitation energy supplied from a flywheel, dynamo and converted into electric current, energy supplied from an electric generator operable based on various thermodynamic cycles and utilizing conventional fuels such as but not limited to gasoline, diesel, compressed natural gas and the like; hydroelectric energy, chemical energy stored in batteries and the like. Renewable energy sources may include solar energy, wind energy and the like. The energy sources mentioned in the present disclosure of the invention are merely exemplary and various energy sources other than those mentioned herein may be utilized to supply power to the power input unit 4402 without limiting the spirit and scope of the present invention.

The power management module 112 as described herein may also be referred to as a power management unit, PMM, PMU, smart power management module or smart PMU. These terms are generally meant to be interchangeable herein except as would be understood based on context.

The power storage unit 4404 may store all or a portion of the energy supplied from an external source such as those listed above. The power storage unit 4404 may include batteries of various types such as but not limited to fuel cells; flow batteries such as zinc-bromine flow battery, vanadium redox battery; lead-acid battery; lithium ion battery; nickel-cadmium battery; polymer based battery; ultracapacitors and the like. Similarly, the power storage unit 4404 may also be configured to store energy supplied from various other conventional or non-conventional sources as mentioned above in the present disclosure. In case of solar powered storage units, the power storage unit 4404 may also include a solar panel configured to receive solar energy that may be stored in the power storage unit 4404 during sunny hours and utilized later during weak light hours such as in the evenings or other weak light areas or periods. The power storage unit 4404 may also include a stopper arrangement (not shown in the figure) to restrict the flow of energy from the external source after a predetermined period of time. The restrictive arrangement may automatically detect the status of the battery and may accordingly stop the flow of energy when required. For example, the flow of energy may be controlled based on the current battery status such as when the battery is full. Further, the flow of energy may also be stopped in certain time periods such as when the external power supply is expensive. In such a scenario, the energy may be supplied to an extent so that the current lighting requirements may be fulfilled, and delaying further supply of energy to a later time when the power supply is not expensive.

Similarly, various other operations for controlling the flow of energy may be performed by using the stopper arrangement. The stopper arrangement for controlling the flow of energy may be manually operated by a user or may be designed to operate automatically using an automated controller or microprocessor.

In accordance with various embodiments of the present invention, the power output unit 4408 may be configured to discharge or utilize a portion of the energy stored in the power storage unit 4404. The power output unit 4408 may supply energy from the storage unit 4404 to one or more lighting fixtures that house one or more LEDs. The power output unit 4408 may be automatically controlled to recognize and sense environmental contexts for supplying energy in an optimized fashion. For example, the supply of energy may be stopped if the environmental context shows absence of persons in the area. Similarly, the supply of energy from the power output unit 4408 may be reduced or dimmed if the requirement is found to be lesser. This aids in energy savings, thereby making optimal utilization of the stored energy.

In embodiments, the light management module 118 connected with the power management module 112 may be configured to regulate aspects of the light source(s) in the lighting fixtures that house LEDs for illumination purposes. For example, the light management module 118 may regulate intensity, color temperature, beam angle, lens control, or other aspects of the light sources or light production. In accordance with various embodiments of the present invention, the light management module 118 may trigger the power management module 112 to regulate the supply of power from the power storage unit 4404 to the lighting fixtures. For example, the light management module 118 may decide to switch off the lights in a parking area in the absence of persons or vehicles in the parking area. The light management module 118 may then inform the power management module 112 regarding switching off the lights in the parking area, which may then disconnect the supply of power from the power storage unit 4404 for a predefined period of time.

The power management module 112 and the light management module 118 as discussed above and depicted in FIG. 44 may be connected with the management systems 134 that provide an automated tool to manage stored power efficiently, thereby minimizing power consumption. Further, the management systems 134 may also control the operations of the light management module 118 and the power management module 112 based on contextual and environmental information as sensed by various devices that may indicate information pertaining to the environment or usage contexts. Such devices may include without limitations sensors, cameras, meters, RFID devices and the like.

The management systems 134 may include a centralized controlling unit 4410 that may further include microprocessors for automatically controlling several operations of the power management module 112 and the light management module 118. The management systems 134 may also include databases for storing lighting rules or parameters that may be defined by a user, a third party supplying power to the lighting fixtures, or a selling authority supplying lighting fixtures to the user. The lighting parameters or rules are set by mutual agreement between the third party and the user. The lighting fixtures may be configured based on the set rules or parameters. For example, the rate of allowable thermal dissipation associated with a light may be increased (e.g. by increasing air flow) in response to a detected increase in voltage exceeding a voltage threshold. Therefore, in this case the agreed upon parameter is the voltage threshold. Similarly various other rules and parameters may be defined within the scope of the present invention. The rules and parameters have been described in conjunction with FIGS. 1 and 45 in detail.

In the embodiment of FIG. 44, the databases as mentioned above may be controlled and managed by the centralized controlling unit 4410, herein after referred to as simply controlling unit 4410 merely for the descriptive and illustrative purposes without limiting the spirit and scope of the present invention.

The controlling unit 4410 may form a part of the management systems 134 or may form a separate unit that may interface with the power management unit 112 and the light management module 118. Further, the controlling unit 4410 may also be integrated with the power management module 112 and the light management module 118 in accordance with alternative embodiments of the present invention. In such a scenario, the databases may be maintained in memory that may be integrated either in the light management module 118 or the power management module 112 or the within the lighting fixtures. The databases may also be maintained by the third party at their end from where the controlling unit 4410 may directly receive information for implementing instructions according to the environmental and contextual patterns based on the received signal related to the stored parameters or rules. In an alternative embodiment of the present invention, the rules and the parameters may be manually input in a receiving unit connected with the controlling unit 4410. However various monitoring devices for the auditing purposes may be utilized to confirm if the manually input rules and parameters are in confirmation with the mutually agreed terms between the third party and the user.

The controlling unit 4410 may be configured to enable the power management module 112 as a smart unit that may be adaptively controlled based on environmental requirements as specified by parameters stored in the databases. Various modes of interface including but not limited to wired or wireless connection may be employed to form a connection between the power management unit 112, light management unit 118 and the controlling unit 4410.

Figure 45:
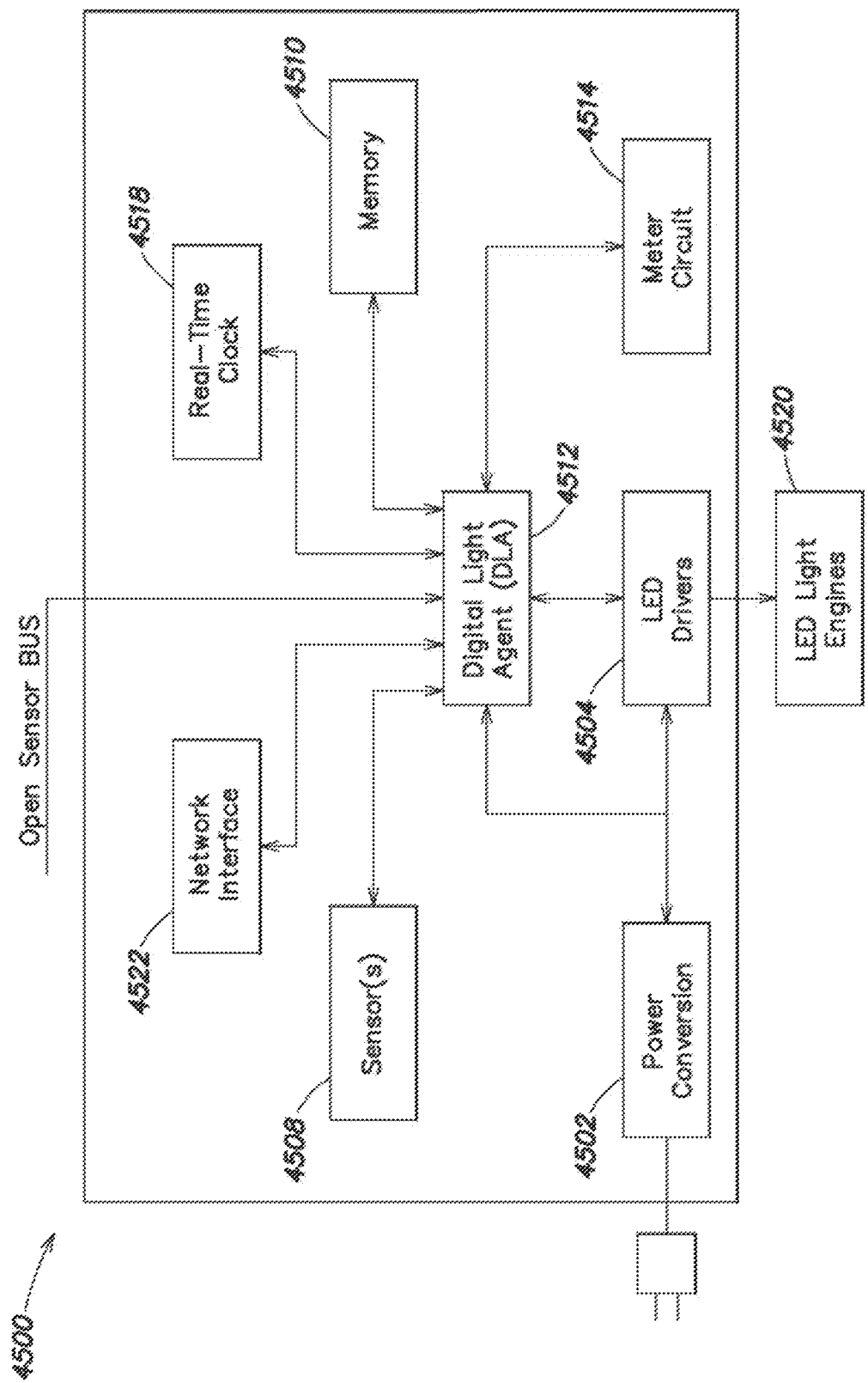
FIG. 45 depicts a schematic diagram of a smart power and light management architecture.

In light of the above description, FIG. 45 illustrates a smart power and light management architecture 4500 connected with various regulatory interfaces and devices that may enable automated and intelligent control of the power management module 112, and the like. In embodiments, the smart power and light management architecture 4500 may control and adjust intensity and illumination of one or more lighting fixtures that houses a plurality of LEDs for producing light. The adaptive adjustment of light in the lighting fixtures such as the lighting fixture 104 may be controlled based on environmental and contextual patterns. The environmental and contextual patterns may include without limitation light usage, weather conditions, presence of light users, energy status of the storage unit and the like. For example, in an exemplary scenario of a parking area, the intensity of light may be adaptively and automatically controlled or lights switched off when the parking area is detected to be empty.

The smart power and light management architecture 4500 may include a power conversion circuit 4502 for retrieving power from an external energy source and supplying the power to various elements operating within the architecture. The power conversion circuitry may be directly connected with LED drivers 4504 that facilitate balancing and monitoring power consumption, hereinafter referred to as load. The LED drivers 4504 may further include various input and output current or voltage sensing devices that sense the flow of current or supplied voltage across input and output terminals for regulating the power supply. The LED drivers 4504 may further be coupled with input and output protection devices such as fuses that may cut off the supply of current at the input and output terminals of the power circuitry upon detection of an overflow of current beyond a threshold level by sensing devices.

The architecture may also include sensors 4508 that may be disposed at various locations such as within the lighting fixtures, within the environment like parking area, vehicle and the like or integrated with the controlling units or management systems 134 and the like. The sensors 4508 may include occupancy sensors, ambience light sensors, Radio Frequency Identification Devices (RFID) operable against RFID tags, sensing cameras, metering devices and the like. Further, the sensors 4508 may operate based on various physical, environmental or chemical parameters such as but not limited to temperature, pressure, lighting, touch, smell, voice, perception and the like. Similarly, various other devices that operate on behavior metrics or biometric measurements such as finger impressions, thumb impressions, walking style, handshake and the like may be utilized to facilitate sensing of environmental or contextual patterns.

The depicted architecture may also include databases for storing lighting rules or parameters in memory 4510 that may be defined by a user or a third party supplying power to the lighting fixtures or selling authority supplying lighting fixtures to the user. The lighting parameters or rules may be set by mutual agreement between the third party and the user. The lighting fixtures may be configured based on the set rules or parameters. For example, the rate of thermal dissipation may be increased by increasing air flow in case an increase in the temperature of the fixture is reported falling beyond the levels specified within the rules. Similarly various other rules and parameters may be defined within the scope of the present invention.

In embodiments, the databases for storing rules and parameters may include demand response rules database 154, third party rules database 158 and internal admin rules database 160. The demand response rules database 154 may be configured to store information that aids in directing the light management module 148 to check alternate energy storage. Alternately, the demand response rules database 154 may direct the light management module 148 to turn the lights 'OFF' or fade away (dim the lights) based on the requirements. The third party rules database 158 may be a repository of rules or logic that may help in controlling and managing the operations and rights related to the third party. In addition, the third party rules may be the rules that may lay out the acceptable way of managing the 'selling rights' and the 'third party rights.' The selling rights may be associated with the building management and the third party rights may be associated with the third party entering into the contract. For example, the internal administrator may limit the third party rights to management of ambient lighting systems solely. Similar to the third party rules database 158, the internal administration rules database 160 may include rules and logic that may define activities performed by an internal administrator. For example, the internal administration rules database 160 may define rules for a manager of the warehouse to regulate the lighting systems 102 in a certain specified way. The databases as mentioned above may be controlled and managed by a centralized unit such as a digital light agent (DLA) 4512 as depicted in the FIG. 45.

The smart power and light management architecture 4500 may be associated with a meter circuit 4514. The meter circuit 4514 may be utilized for monitoring consumption of power by a user. The meter circuit 4514 may facilitate tracking of power consumption and monitoring and checks if the respective users consume power based on the set and mutually agreed parameters or not. An entire record of the power usage may be recorded in the memory 4510 which may be retrieved by an authorized personal. If the record metered by the meter circuit 4514 is found to go against the agreed set parameters, the user may be levied a penalty as decided mutually. Further, meter circuit 4514 may facilitate the preparation of billing reports for users based on their respective consumption and usage of power.

The power management unit may be associated with a real-time clock. The real-time clock 4518 may be integrated within the architecture as depicted in the FIG. 45 to facilitate meter circuit 4514 in preparing billing reports by counting time periods of power consumption by the users. The real time clock 4518 may generate an output as a unit of time counted on the basis of power consumption in real-time. This may facilitate in preparing billing reports as soon as the power is consumed. Further, the real-time clock 4518 may facilitate tracking time-based operational modes that reflect a periodic contextual or environmental pattern based on a historic analysis of power usage in the defined application areas. For example, the real-time clock 4518 may monitor the time when a user enters a warehouse and record it in the memory 4510 under historic data. The real-time clock 4518 may then accordingly operate LED light engines 4520 at a fixed time as retrieved from the historic data.

Various elements and devices connected within the architecture may be controlled automatically by the DLA 4512. The DLA 4512 may act as a controlling unit that automates operations of the devices connected within the architecture based on the stored rules and parameters affected by the environmental and contextual patterns. Various elements of the architecture may be connected through a network interface 4522. The network interface may form a wired or a wireless connection among various devices connected within the architecture. The architecture may also be provided with or be accessible through a user interface (not shown in the figure) that may facilitate applying manual adjustments to the automated functioning of the devices contained within the architecture. For, example, an authorized personnel may manually modify the stored parameters based on the requirements or change the compliance using the user interface.

In accordance with other embodiments of the present invention, the user interface may provide separate capabilities for a user end and a third party respectively. Each flavor of the interface may be provided with a regulatory mechanism to authorize the limited manual operations based on the necessities of the user and the third party. For example, in an embodiment, the third party may be provided more discretion to operate the architectural devices through the user interface as compared to the user.

The smart and intelligent architecture 4500 as illustrated in FIG. 45 that may be controlled by the DLA 4512 may also automatically decide the rate of power consumption or utilization based on the stored parameters or rules and accordingly may control the flow of current through the power conversion circuitry 4502. The DLA 4512 may monitor contextual or environmental patterns and accordingly trigger the power management module 112 to adaptively control the flow of current. For example, DLA 4512 may receive signals from the sensors 4508 that are configured to provide information regarding environment or context to the DLA 4512.

Figure 46:
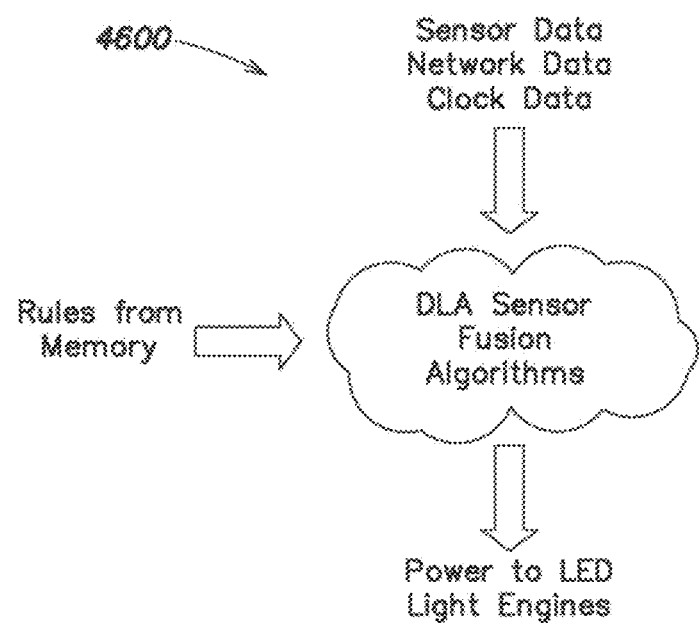
FIG. 46 depicts a flow diagram of certain smart tasks that may be performed by the digital light agent facility of the invention.

FIG. 46 provides a block diagram illustrating smart tasks performed by the DLA 4512. The DLA 4512 may receive data signals from the sensors 4508 that include network data, sensor data and the like. The DLA 4512 may also receive clock data from the sensors fitted within real-time clock 4518 that provide information related to timing counts for various lighting usages or environmental information that is a function of time. The DLA 4512 performs a compliance check for the stored parameters and rules to confirm if the automated operation is within the discretion of mutually decided conditions. For example, the DLA. 4512 may receive signals from the sensors 4508 that indicate huge crowd in the parking area. The DLA 4512 may determine the requirement of an additional consumption of power for energizing more LED light engines 4520 to illuminate the parking area. However, the rules and parameters may indicate that power consumption for lighting the parking area should not be more than a set value stored in the database that may be maintained in the memory 4510. The DLA 4512 may adaptively control the supply of additional power to the LED light engines 4520 in the parking area to provide sufficient light while staying within the power consumption set value. One adaptive control operation may be to cycle power to a portion of the various LED light engines 4520. Another adaptive control operation may be to provide lower voltage, thereby reducing the light output of a portion of the LEDs. This may be in response to localized sensing of activity in the parking area.

In another exemplary embodiment, the DLA 4512 may also reduce the power consumption by adaptively reducing the supply of power. Similarly, in yet another embodiment of the present invention, the DLA 4512 may identify peak hours when the lighting is expensive based on information collected by the real-time clock 4518. The DLA 4512 may accordingly switch off one or more LED light engines 4520 to reduce consumption of power for cost saving purposes In embodiments, the DLA 4512 may also receive information regarding physical conditions of the environment such as temperature of a particular device of the LED light engines 4520, pressure within tubing and ducting of the fixture or frame of the LED light engines, rate of heat dissipation within the LED light engines and the like. The DLA 4512 may accordingly decide if the sensed physical conditions are within the discretion set by the rules and parameters and may adaptively control the flow of current through the LED light engines 4520. For example, in an illustrative scenario, a temperature sensor may detect overheating of the ducting associated with the frame of the LED light engines 4520 due to reduced heat dissipation. The DLA 4512 may send a command to the power management module 112 to increase the rate of heat dissipation by allowing more heat radiating fins or forced convective or conductive arrangements to operate. The DLA 4512 may disconnect supply of power to the respective LED light engines 4520 in case the rate of heat dissipation is not found to be within the controlled operational states as defined by the rules and parameters even after increasing the rate of heat dissipation. This helps in limiting power supplies delivered to the LED light engines 4520 or other devices based on an internal algorithm run by the DLA. 4512.

In embodiments, the power management unit may adaptively dim the plurality of LED light bars. The DLA 4512 may intelligently adjust dimming behavior of the LED light engines 4520 to match environmental or contextual requirements. For example, the DLA 4512 may automatically learn based on the data received from the sensors 4508 such as the occupancy sensors about working hours of the workers in an aisle. The DLA 4512 may use the data obtained from the sensors 4508 to adaptively control lighting in the aisle. For example, the DLA 4512 may trigger the LED drivers 4504 to switch off the LED light engines 4520 when the working hours are finished and no worker is available in the aisle. The related timelines may be managed by the real-time clock 4518 that aids in maintaining a database containing historic data of lighting usage.

The DLA 4512 may intelligently control operations of the meter circuit 4514 to measure, store and report power usage to the users or to the third party. The DLA 4512 may measure energy usage of the LED light bars for metering power associated with the power management unit. The power usage may be instantaneous or accumulated over a period of time. The power usage measurements may be conducted by the meter circuit 4514 that is fitted into fixtures of the LED light engines 4520 and that may operate in accordance with various mechanisms for logging power measurements into the memory 4510. The logging of power measurements may be performed in a separate memory that may be attached within the fixture itself. The power measures may in some cases directly be transmitted and relayed to the DLA 4512 through the network interface 4522. Power measurements may be performed by the meter circuit 4514 in a number of ways such as a pure hardware measurement in which all kinds of measurements are performed in realistic values, a mixed hardware/software measurement in which some predictions to measurements are calculated in addition to the realistic measurements, and fully software based in which measurements relying on predictions are made based on the internal states of the devices associated with the fixture and the LED light engines 4520.

The DLA 4512 acting as a controlling unit may further control operations related to monitoring, storage and reporting of sensor data especially but not limited to occupancy sensors. The sensors 4508 that are disposed within the fixture of the LED light engines 4520 and various other locations of the environment may have built in memories to store logged data sensed by the respective sensors 4508. However, the sensors may also transmit data to the memory 4510 for storage and logging purposes. The data relevant to the lighting power management may be received from the sensors. Thereafter, the received data may be logged with a power management unit that may be configured for powering the LED light bars. The operations performed by the sensors 4508 have been described herein at least in conjunction with FIGS. 1 and 45 in detail. The logged data may be utilized for energy auditing purposes to confirm the power consumption is within the compliance set by the stored parameters and the rules. The logged data may be utilized by the DLA 4512 for temperature sensing such as for monitoring and regulating heat, ventilation and air conditional operations. The logged data may further facilitate controlling access to authorized personnel only (e.g. by RFID detection means).

The DLA 4512 may also intelligently reference real-time clock 4518 that may be integrated with the DLA 4512 to change behavior based on a time of the day. The DLA 4512 may further control systems that have real-time clock components such as components integrated in a vehicle or the like systems. This may aid the DLA 4512 to regulate and monitor performance of the LED light engines 4520 based on distinct operating hours such as business hours when light are usually at 100% output, lean hours when lights are usually at 25% output or off hours when lights are usually at zero output.

Additionally, the DLA 4512 may assist the smart architecture 4500 to measure and predict lifetime of the LED light engines 4520 based on the run-hours and the usage of the LED light engines 4520. The DLA 4512 may enable prediction and measurements by applying measurement and lifetime prediction algorithms over the data retrieved regarding the usage patterns In accordance with an embodiment of the present invention, the DLA 4512 may be configured to send lifetime prediction output and usage patterns to the users or the third party through emails enabled by the network interface 4522 such as an email may be sent to the user when the lifetime prediction indicates the left life of 80%. The algorithms for lifetime predictions and measurements may be applied to the LED light engines 4520, power management modules or the like devices. The algorithms may be run on the DLA 4512 itself or any other devices within the architecture 4500.

The DLA 4512 may act as a centralized controller to detect failure of a lighting fixture or any other device. The DLA 4512 may alert the user or maintenance personal regarding failure who may then take required steps to compensate the effect of the failure such as by using other nearby fixtures. For example, the nearby fixtures may be overdriven when failures are detected in order to maintain high light levels under dead fixtures. This may be referred to as cooperative failure compensation.

The DLA 4512 may further act as a centralized controller that may perform the task of input power arbitration. The input power arbitration may be performed globally inside a facility or on a power circuit-by-circuit basis as required. The intelligent power arbitration facilitates making automated decisions to select the power source or combinations of the power sources to be used for supplying power to the fixtures.

Therefore, the DLA 4512 may perform a set of automated functions intelligently such as but not limited to receiving, analyzing the sensor data, network data or clock data. These input data may be received by a state machine integrated within the DLA 4512 that analyzes the input data based on various fusion algorithms and accordingly commands the LED drivers 4504 to manage load across the LED light engines 4520 for adaptive control. The state machine or the DLA 4512 may be configured to be mapped with the stored rules and parameters that are decided on mutual agreement between the third party and the user. In accordance with various embodiments of the present invention, the DLA 4512 may further be configured to report the data inputs as well as the output after analysis to the user in the form of a printed report or through emails and the like.

Figure 47:
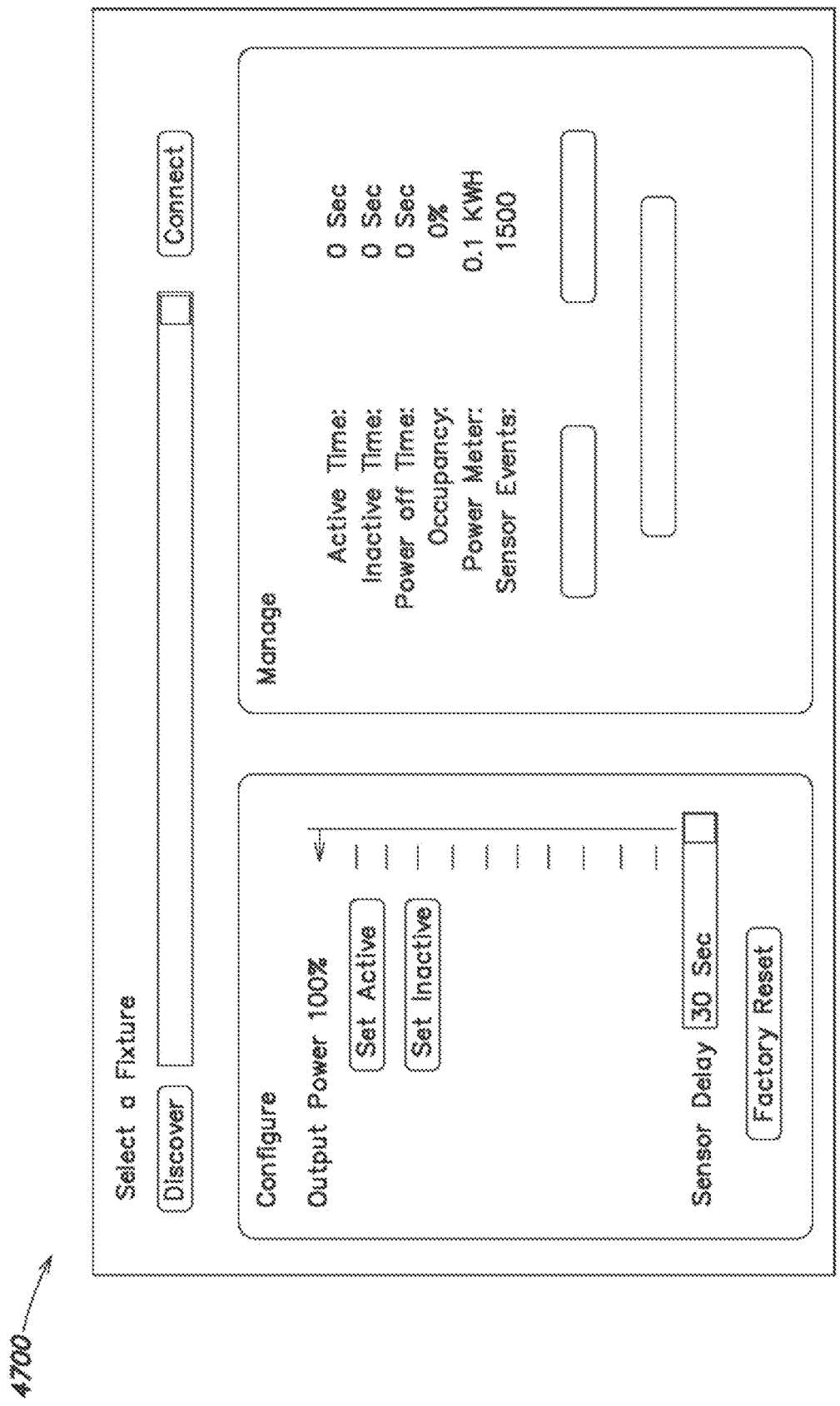
FIG. 47 depicts a DLA or controlling unit user interface control panel

FIG. 47 illustrates a control panel 4700 that may act as a user interface for setting various states of operations performed by the DLA 4512 or a controlling unit. The control panel 4600 may include interfaces that facilitate configuring of the states and managing of the states. A user may set the states of the operations by making modifications within the configuration interface. This may include setting various power output levels ranging from zero output to full output (100%). The user may further set sensor delays that may indicate a time period within which signals from the sensors should be monitored and relayed to the DLA 4512. The managing interface may display various states of operations based on the configurations made in the configuration interface by the user for a specific scenario such as for a specific lighting fixture. For example, the user may set the power output standards from the configuration interface and view the power consumed by a specific fixture after setting the power output in the management interface. The states of operations may be reset by the user or the third party. The user may also download data logged by the sensors, meter circuits and the like devices. Various other displayed tabs or options may be provided on the control panel 4700 without limiting the spirit and scope of the present invention.

Figure 48:
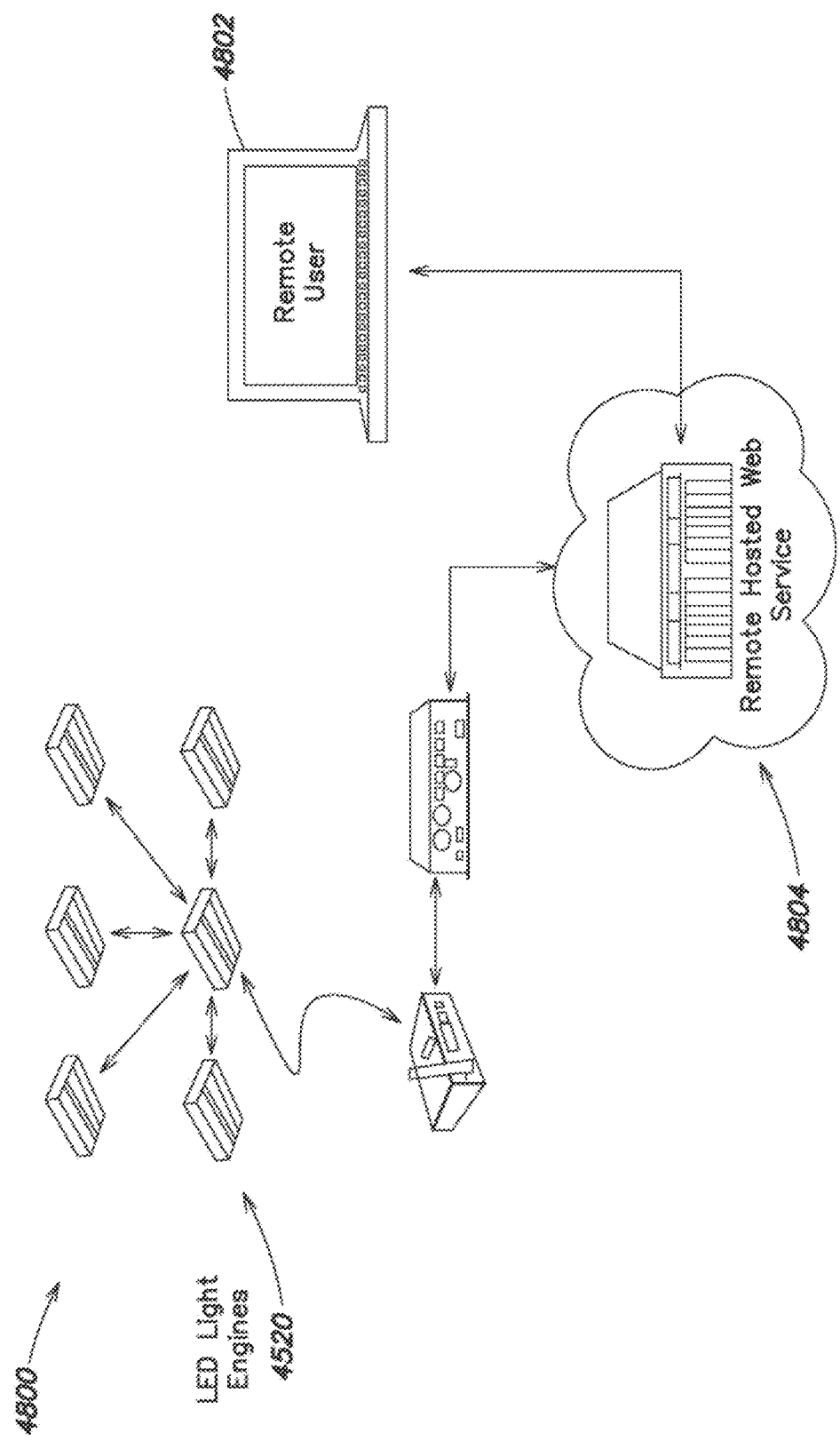
FIG. 48 depicts remote control for operating a DLA or Smart PMU.

FIG. 48 illustrates a remotely controlled service for operating LED light engines 4520. The remotely controlled service may include a centralized controller with remote 'cloud' interface. The remotely controlled service may include a remote hosted web service 4804 accessible by a user 4802 at a distant location for managing or regulating or monitoring operation of the LED light engines 4520. The remote hosted web service may enable a wired or wireless connection through a network interface 4522 that enables remote communication between the remote user 4802 and the LED light engines 4520. For example, the remote user 4802 may adaptively adjust intensity of light, download logged data associated with sensors or meter circuit, identify data regarding lifetime predictions, control operations based on data received from a real-time clock and the like situated at a distant location. In an embodiment, the remote hosted web service 4804 may be managed by the third party.

The remote hosted web service 4804 may be enabled through the Internet and the remote user 4802 may access the service through a web-browser. The remote hosted web service 4804 may include an administrative server that may be managed by the third party to control operations performed remote users. In an embodiment of the present invention, the remote user 4802 may be allowed to view the control panel as depicted in FIG. 47 through which the user may perform various operations related to configurations and management as discussed in conjunction with FIG. 47 in detail. The remote hosted web service 4804 may enable a purely automated and wireless control of entire architecture 4500 that may be implemented in a global environment.

Figure 49:
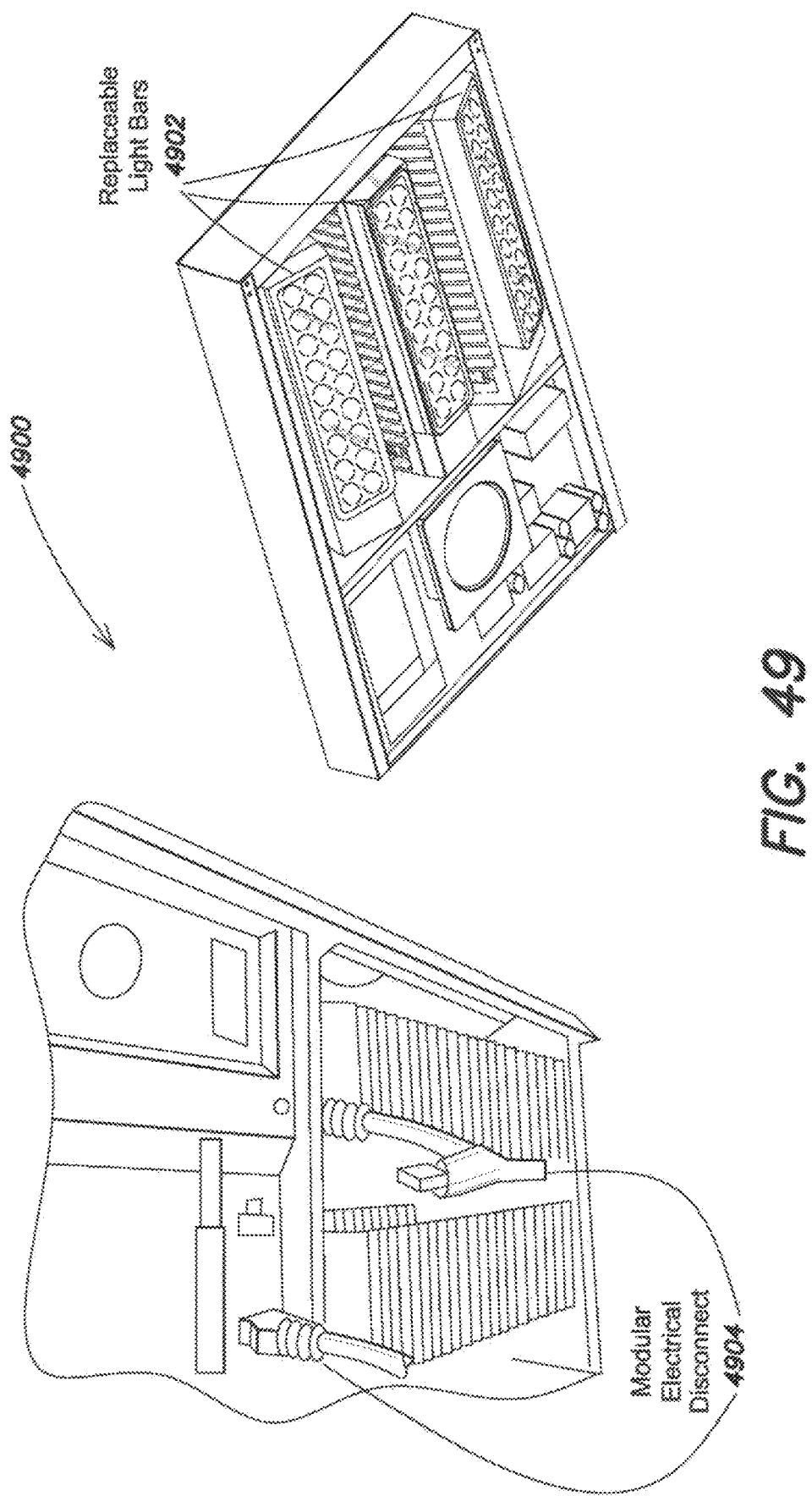
FIG. 49 depicts a modular lighting system with replaceable parts.

FIG. 49 depicts a replaceable lighting system 4900. The system 4900 may include a plurality of light bars 4902 each of which may be replaced individually. The plurality of light bars 4902 may be associated with modular electric disconnects 4904. In embodiments, this electric disconnects 4904 may be provided with a view to safety and system servicing requirements. This electric disconnects 4904 may be a wire, a switch, a handle, or the like.

In embodiments, the electric disconnects 4904 may support temporary or permanent disconnection. Further, the electric disconnects 4904 may include associated accessories such as lugs, ground terminals, metal plates, disconnect enclosures, and the like. The disconnect enclosures or housings may be constructed from metal, wood, polymers, or any other suitable material.

Figure 50:
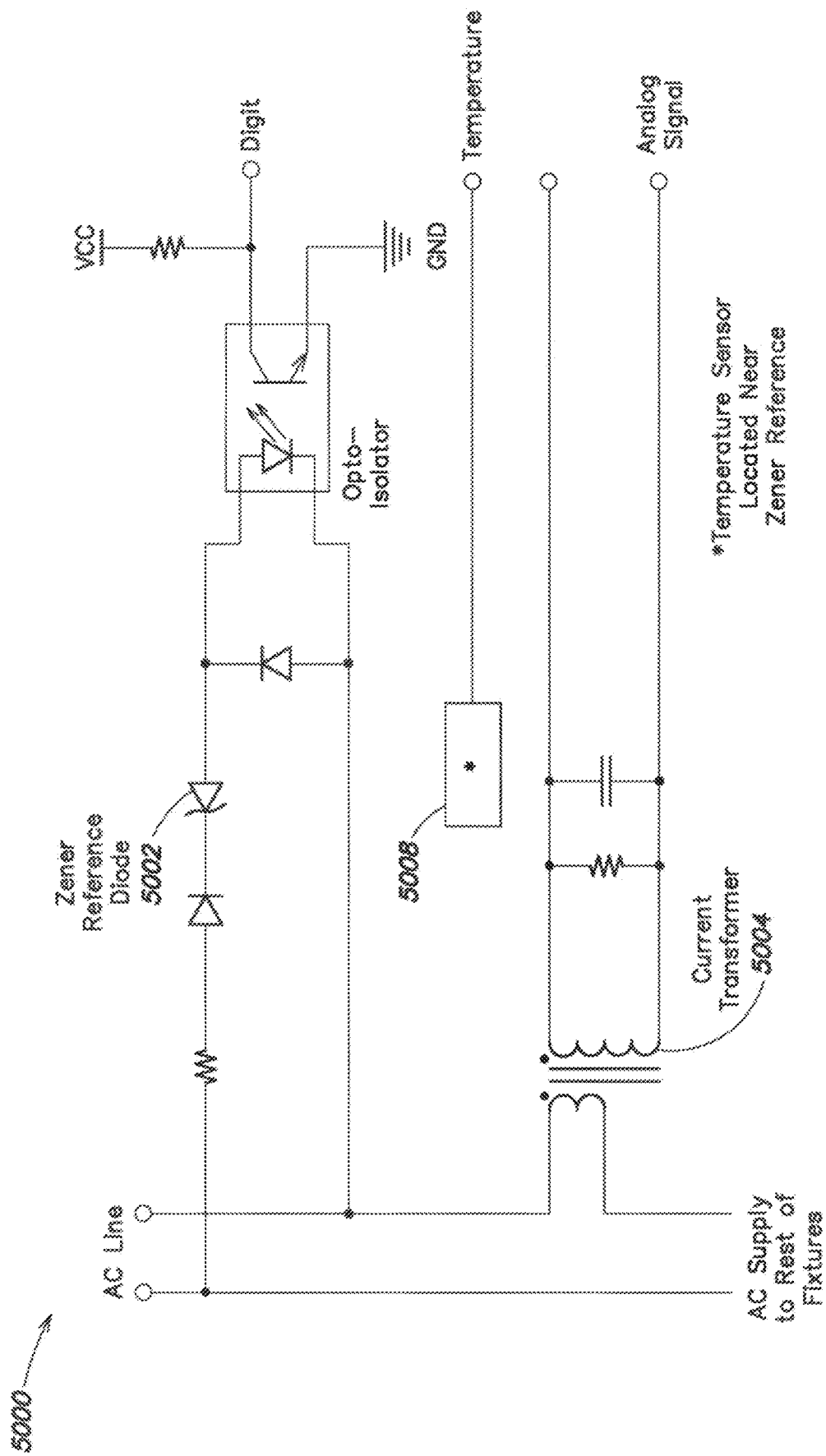
FIG. 50 depicts an exemplary power management circuit design for measurement of power and lighting.

FIG. 50 depicts an exemplary power management circuit design for measurement of power and lighting. The circuit of FIG. 50 may be useable for at least a portion of the measurement and verification module 170 that may be responsible for logging and verifying the measurements received from sensors. The circuit design of FIG. 50 may facilitate an efficient and accurate measurement of power consumption, thereby enabling smart management of energy loads by the consumers. In addition, the described design may result in low cost power management.

The power management circuit design may include an optoisolator or Zener diode configuration 5002, transformer(s), sensors, and microprocessors.

In embodiments, the opto-isolator and a Zener diode in electrical communication with one another and an AC power line. The Zener diode configuration 5002 may be designed such as to exhibit a greatly reduced breakdown voltage, thereby permitting the current to flow backwards (during reverse-bias) for a given voltage. For example, the Zener reference voltage VZRef may be less than the minimum AC line input voltage. This configuration may also facilitate low cost isolated AC voltage sensing. In other embodiments, the configuration may be designed on the basis of digital pulse width, i.e., the amount of time spent by the AC voltage above a chosen Zener voltage.

A current transformer 5004 may be in electrical communication with the AC power line and may provide an isolated current measurement. For example, if current in the given circuit exceeds a threshold value, the current transformer 5004 may produce a signal (e.g. a voltage) that is accurate and proportional to the current in the given circuit for connection to measuring and recording instruments for logging purposes.

Further, a temperature sensor 5008 may be located in proximity to the Zener diode 5002. The temperature sensor 5008 may measure temperature of the system and communicates the temperature to a temperature compensation system. For example, the temperature sensor may be located on the external surface of a fixture. This sensor may allow measurement of temperature difference, and thereby facilitate compensation for any high temperature coefficients of high voltage Zener diodes.

In embodiments, the temperature sensor 5008 may be a contact or non-contact temperature sensor.

The entire circuit design may be combined with a processor. The processor may decode the AC voltage pulses by measuring the digital pulse width, which is indicative of the amount of time the AC voltage spends above a Zener reference voltage. The processor thereby determines an instantaneous AC voltage. Further, the processor may combine the instantaneous AC voltage with the analog current measurement to provide instantaneous power consumption. The microprocessor chip may be customized on the basis of the programming desired for a given level of output. For example, for a given set of lighting fixtures, the above disclosed circuit design may be implemented so as to measure or decode AC voltage pulses in the circuit. Measurements from a temperature sensor may be utilized to apply temperature compensation. This may be subsequently used to determine the instantaneous AC voltage passing through the circuit. Hence, for the determined level of AC voltage and the analog current signals, the power consumption for the fixture may be determined.

In an embodiment, remote adjustment of DLA program may be based on internally monitored usage analysis.

In an embodiment, a configuration tool for modular lighting may be provided. The configuration tool may store LED light bar input data in the memory of a computer. The tool may also receive input on a parameter associated with a lighting area. Thereafter, the tool may receive input on a desired lighting characteristic for the lighting area. Further, the configuration tool may select an LED light bar, an optical profile for the LED light bars, an LED light bar fixture frame, and an angular setting for the LED light bars based on the input.

In an embodiment, a software tool may be provided for remote fixture configuration and analysis.

In an embodiment, the lighting fixture may be associated with a thermal design featuring passive electrostatic cooling feature. The lighting fixture may include a light emitting diode (LED) light bar mounted within a housing. Further, the lighting fixture may include an electrostatic element disposed on a surface of the housing. The electrostatic element is charged by drawing power from the lighting fixture. Further, the electrostatic element may attract charged air particles, causing surface airflow of charged air particles through the lighting fixture.

In another embodiment of the invention, a thermal design for surface-mount fixture may be provided. The fixture may include light emitting diode (LED) light bars mounted within a housing. Further, the fixture may include a thermal interface pad disposed along an upper surface of the housing in contact with a mounting surface. The thermal interface pad may enable transfer of heat energy from the LED light bars to the mounting surface.

In a nutshell, various embodiments of the present invention may provide modular designs of the lighting systems with features that may be useful for power and lighting management in a variety of environments such as warehouse, manufacturing facility, parking garages, street lighting, prisons, gymnasiums, indoor pools, stadiums, bridges, tunnels, and some other types of environments.

The invention claimed is:

1. A system for automated operation of at least one lighting fixture, the system comprising:
   (A) a smart power and light management apparatus to regulate a supply of electrical power to the at least one lighting fixture, the smart power and light management apparatus including:
      (A1) a power conversion unit to receive the electrical power from an external energy source,
      (A2) an LED driver, operably coupled to the power input unit, to supply energy to the at least one lighting fixture,
      (A3) meter circuitry, operably coupled to the power conversion unit and the LED driver, to sense (i) the electrical power received by the power conversion unit and (ii) the energy supplied to the at least one lighting fixture,
      (A4) a memory, operably coupled to the meter circuitry, to store a set of rules for regulating the supply of electrical power to the at least one lighting fixture; and
      (A5) a network interface, to facilitate wireless communication of data between the smart power and light management apparatus and a plurality of apparatuses in a wireless network having a mesh topology,
   wherein the network interface:
      receives a first data signal transmitted by one of the plurality of apparatuses in the wireless mesh network;
      transmits a second data signal to at least one other of the plurality of apparatuses in the wireless mesh network; and
      transmits a repeated first data signal to the at least one other of the plurality of apparatuses in the wireless mesh network; and
   wherein the system includes at least a first zone, a second zone, and a third zone, wherein the first zone, the second zone, and the third zone are determined based on data received from the plurality of apparatuses in the wireless mesh network, wherein at least one lighting fixture is located in a first zone of the system, wherein the one of the plurality of apparatuses in the wireless mesh network is located in a second zone of the system, and wherein the at least one other of the plurality of apparatuses in the wireless mesh network is located in a third zone of the system.

2. The system of claim 1, wherein the set of rules for regulating the supply of electrical power to the at least one lighting fixture are modified based on data related to the first zone.

3. The system of claim 2, wherein the first data signal is based on data related to the second zone.

4. The system of claim 3, wherein the second data signal is based on data related to the third zone.

5. The system of claim 4, wherein the repeated first data signal is based on data related to the third zone.

* * * * *